(12) United States Patent
Ross et al.

(10) Patent No.: US 12,020,432 B2
(45) Date of Patent: Jun. 25, 2024

(54) TISSUE PHASIC CLASSIFICATION MAPPING SYSTEM AND METHOD

(71) Applicant: THE REGENTS OF THE UNIVERSITY OF MICHIGAN, Ann Arbor, MI (US)

(72) Inventors: Brian D. Ross, Ann Arbor, MI (US); Craig Galban, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/698,376

(22) Filed: Sep. 7, 2017

(65) Prior Publication Data

US 2018/0068446 A1    Mar. 8, 2018

Related U.S. Application Data

(63) Continuation of application No. 13/539,254, filed on Jun. 29, 2012, now Pat. No. 9,773,311.
(Continued)

(51) Int. Cl.
G06T 7/00 (2017.01)
G06T 7/136 (2017.01)

(52) U.S. Cl.
CPC ............ *G06T 7/0016* (2013.01); *G06T 7/136* (2017.01); *G06T 2207/10081* (2013.01); *G06T 2207/30061* (2013.01)

(58) Field of Classification Search
CPC .................................................... G06T 7/0016
See application file for complete search history.

(56) References Cited

U.S. PATENT DOCUMENTS

| 6,163,152 A | 12/2000 | Bernstein et al. |
| 6,381,296 B1 | 4/2002 | Nishiura |

(Continued)

FOREIGN PATENT DOCUMENTS

| WO | WO-2001/056466 A2 | 8/2001 |
| WO | WO-2002/061457 A2 | 8/2002 |

(Continued)

OTHER PUBLICATIONS

V. Gobunova et al., "Weight Preserving Image Registration for Monitoring Disease Progression in Lung CT", MICCAI 2008: Medical Image Computing and Computer-Assisted Intervention—MICCAI 2008 pp. 863-870 (Year: 2008).*

(Continued)

*Primary Examiner* — Gandhi Thirugnanam
(74) *Attorney, Agent, or Firm* — MARSHALL, GERSTEIN & BORUN LLP

(57) ABSTRACT

A voxel-based technique is provided for performing quantitative imaging and analysis of tissue image data. Serial image data is collected for tissue of interest at different states of the issue. The collected image data may be deformably registered, after which the registered image data is analyzed on a voxel-by-voxel basis, thereby retaining spatial information for the analysis. Various thresholds are applied to the registered tissue data to identify a tissue condition or state, such as classifying chronic obstructive pulmonary disease by disease phenotype in lung tissue, for example.

19 Claims, 24 Drawing Sheets
(21 of 24 Drawing Sheet(s) Filed in Color)

Related U.S. Application Data

(60) Provisional application No. 61/559,498, filed on Nov. 14, 2011, provisional application No. 61/502,805, filed on Jun. 29, 2011.

(56) References Cited

U.S. PATENT DOCUMENTS

| | | | |
|---|---|---|---|
| 6,567,684 | B1 | 5/2003 | Chenevert et al. |
| 6,579,240 | B2 | 6/2003 | Bjaerum et al. |
| 6,845,342 | B1 | 1/2005 | Basser et al. |
| 6,901,277 | B2 | 5/2005 | Kaufman et al. |
| 6,969,991 | B2 | 11/2005 | Bammer et al. |
| 7,078,897 | B2 | 7/2006 | Yablonskiy et al. |
| 7,897,792 | B2 | 3/2011 | Iikura et al. |
| 7,949,164 | B2 | 5/2011 | Degani et al. |
| 8,185,186 | B2 | 5/2012 | Ross et al. |
| 9,053,534 | B2 * | 6/2015 | Ross ............. G06T 7/0016 |
| 9,773,311 | B2 * | 9/2017 | Ross ............. G06T 7/136 |
| 2003/0018245 | A1 | 1/2003 | Kaufman et al. |
| 2003/0065260 | A1 | 4/2003 | Cheng et al. |
| 2004/0254444 | A1 | 12/2004 | Bittner |
| 2005/0105788 | A1 | 5/2005 | Turek et al. |
| 2005/0147285 | A1 * | 7/2005 | Tago ............. G06T 7/254 382/130 |
| 2007/0036410 | A1 * | 2/2007 | Ida ............. G06T 7/30 382/128 |
| 2007/0053560 | A1 * | 3/2007 | Miller ............. G06T 7/0012 382/128 |
| 2007/0060799 | A1 | 3/2007 | Lyon et al. |
| 2007/0081704 | A1 | 4/2007 | Pan et al. |
| 2008/0021301 | A1 | 1/2008 | Gonzalez et al. |
| 2008/0219530 | A1 * | 9/2008 | Levanon ............. A61B 5/02007 702/19 |
| 2009/0035218 | A1 | 2/2009 | Ross et al. |
| 2009/0234237 | A1 | 2/2009 | Ross et al. |
| 2009/0058417 | A1 | 3/2009 | Yanasak et al. |
| 2009/0232378 | A1 * | 9/2009 | Nakamura ............. G06T 7/337 382/131 |
| 2010/0088339 | A1 | 4/2010 | Rietzel et al. |
| 2010/0160764 | A1 | 6/2010 | Steinberg et al. |
| 2010/0172556 | A1 | 7/2010 | Cohen et al. |
| 2010/0249099 | A1 | 9/2010 | Rewcastle et al. |
| 2010/0254584 | A1 | 10/2010 | Gulsun et al. |
| 2011/0009405 | A1 | 1/2011 | Rewcastle et al. |
| 2011/0053907 | A1 | 3/2011 | Rewcastle et al. |
| 2011/0066024 | A1 | 3/2011 | Shih et al. |
| 2011/0077503 | A1 | 3/2011 | Bonilha et al. |
| 2011/0187367 | A1 | 8/2011 | Feiweier et al. |
| 2011/0280457 | A1 * | 11/2011 | Nielsen ............. G06T 7/0012 382/128 |
| 2012/0288173 | A1 * | 11/2012 | Rai ............. G06T 7/20 382/128 |
| 2012/0316422 | A1 | 12/2012 | Ross et al. |
| 2013/0004043 | A1 * | 1/2013 | Ross ............. G06T 7/0016 382/128 |
| 2013/0004044 | A1 * | 1/2013 | Ross ............. G06T 7/136 382/128 |
| 2013/0129168 | A1 | 5/2013 | Ross |
| 2013/0308849 | A1 * | 11/2013 | Fei ............. G06T 7/0012 382/131 |
| 2015/0332454 | A1 * | 11/2015 | Yin ............. G06V 10/42 382/131 |
| 2016/0328850 | A1 * | 11/2016 | Yin ............. G16H 30/40 |

FOREIGN PATENT DOCUMENTS

| | | |
|---|---|---|
| WO | WO-2008/122056 A2 | 10/2008 |
| WO | WO-2008/154741 A1 | 12/2008 |
| WO | WO-2010/116124 A1 | 10/2010 |
| WO | WO-2011/137370 A2 | 11/2011 |
| WO | WO-2013/006506 A1 | 1/2013 |
| WO | WO-2013/078370 A1 | 5/2013 |
| WO | WO-2013/166416 A1 | 11/2013 |

OTHER PUBLICATIONS

Bagrodia et al., Mechanisms of intrinsic and acquired resistance to kinase-targeted therapies, Pigment Cell Melanoma Res., 25(6):819-31 (2012).

Baines et al., Inhibition of Ras for cancer treatment: the search continues, Future Med. Chem., 3(14):1787-808 (2011).

Bammer et al., Analysis and generalized correction of the effect of spatial gradient field distortions in diffusion weighted imaging, Magn. Res. Med, 50:560-9 (2003).

Bammer et al., Assessment of spatial gradient field distortion in diffusion-weighted imaging, ISMRM Proceedings (2002).

Besl et al., A method for registration of 3-D shapes, IEEE Trans. Pattern Analysis and Machine Intelligence, 14(2):239-56 (1992).

Bing et al., Voxel-by-voxel functional diffusion mapping for early evaluation of breast cancer treatment, Information Processing in Medical Imaging, pp. 276-287 (2009).

Bookstein et al., Principal Warps: Thin-plate splines and the decomposition of deformations, IEEE Transactions on Pattern Analysis and Machine Intelligence, 11(6):567-85 (1989).

Breen et al., Three-dimensional method for comparing in vivo interventional MR images of thermally ablated tissue with tissue response, J. Magn. Reson. Imaging, 18(1):90-102 (2003).

Brix et al., Microcirculation and microvasculature in breast tumors: pharmacokinetics analysis of dynamic MR image series, Mag. Reson. Med., 52:420-9 (2004).

Brix et al., Pharmacokinetic parameters in CNS Gd-DTPA enhanced MR imaging, J. Comput Assist. Tomogr., 15:621-8 (1991).

Bubley et al., Eligibility and response guidelines for phase II clinical trials in androgen-independent prostate cancer: recommendations from the Prostate-Specific Antigen Working Group, J. Clin. Oncol., 17(11):3461-7 (1999).

Bulinski et al., Overexpression of MAP4 inhibits organelle motility and trafficking in vivo, J. Cell Sci., 110(Pt. 4):3055-64 (1997).

Cao et al., Survival prediction in high-grade gliomas by MRI perfusion before and during early stage of RT, Int. J. Radiat. Oncol. Biol. Phys., 64:876-85 (2006).

Carracedo et al., Inhibition of mTORC1 leads to MAPK pathway activation through a PI3K-dependent feedback loop in human cancer, J. Clin Invest., 118(9):3065-74 (2008).

Castellano et al., RAS Interaction with PI3K: More Than Just Another Effector Pathway, Genes Cancer, 2(3):261-74 (2011).

Chan et al., Survival and failure patterns of high-grade gliomas after three-dimensional conformal radiotherapy, J. Clin. Oncol., 20:1635-42 (2002).

Chenevert et al., Diffusion coefficient measurement using a temperature-controlled fluid for quality control in multicenter studies, J. Magn. Reson. Imaging, 34(4):983-7 (2011).

Chenevert et al., Diffusion magnetic resonance imaging: an early surrogate marker of therapeutic efficacy in brain tumors, J. Natl. Cancer Inst., 92(24):2029-36 (2000).

Chenevert et al., Diffusion MRI: a new strategy for assessment of cancer therapeutic efficacy, Mol. Imaging, 1(4):336-43 (2002).

Chenevert et al., Icewater for quality control of diffusion measurements in multi-center trials, in Proceedings of the 19th Annual Meeting of ISMRM, Montreal, Quebec, Canada, p. 912 (2011).

Chenevert et al., Monitoring early response of experimental brain tumors to therapy using diffusion magnetic resonance imaging, Clin. Cancer Res., 3(9):1457-66 (1997).

Collignon et al., 3D multi-modality medical image registration using feature space clustering, Lecture Notes in Computer Science, 905:195-204 (1995).

Degani, Mapping pathophysiological features of breast tumors by MRI at high spatial resolution, Nat. Med., 3:780-2 (1997).

Dhermain et al., Advanced MRI and PET imaging for assessment of treatment response in patients with gliomas, The Lancet Neurology, 9(9):906-20 (2010).

Early Breast Cancer Trialists Collaborative Group, Polychemotherapy for early breast cancer: an overview of the randomised trials, The Lancet, 352:930-42 (1998).

(56) References Cited

OTHER PUBLICATIONS

Eda et al., The relations between expiratory chest CT using helical CT and pulmonary function tests in emphysema, Am. J. Respir. Crit Care Med., 155(4):1290-4 (1997).
Ellingson et al., Volumetric analysis of functional diffusion maps is a predictive imaging biomarker for cytotoxic and anti-angiogenic treatments in malignant gliomas, J. Neuro-Oncol., 102(1):95-103 (2010).
Engelman et al., Effective use of PI3K and MEK inhibitors to treat mutant Kras G12D and PIK3CA H1047R murine lung cancers, Nat. Med., 14(12):1351-6 (2008).
Evelhoch et al., Applications of magnetic resonance in model systems: cancer therapeutics, Neoplasia, 2(1-2):152-65 (2000).
Eyal et al., Model-based and model-free parametric analysis of breast dynamic-contrast-enhanced MRI, NMR Biomed., 22:40-53 (2007).
Falchook et al., Activity of the oral MEK inhibitor trametinib in patients with advanced melanoma: a phase 1 dose-escalation trial, Lancet Oncol., 13(8):782-9 (2012).
Fogelman et al., Positron emission tomography and bone metastases, Semin. Nucl. Med., 35(2):135-42 (2005).
Galban et al., A feasibility study of parametric response map analysis of diffusion-weighted magnetic resonance imaging scans of head and neck cancer patients for providing early detection of therapeutic efficacy, Translational Oncol., 2:184-90 (2009).
Galban et al., Prospective analysis of parametric response map-derived MRI biomarkers: identification of early and distinct glioma response patterns not predicted by standard radiographic assessment, Clin. Cancer Res., 17(14):4751-60 (2011).
Galban et al., The parametric response map is an imaging biomarker for early cancer treatment outcome, Nature Medicine, 15(5):572-6 (2009).
Galbraith et al., Reproducibility of dynamic contrast-enhanced MRI in human muscle and tumours: comparison of quantitative and semi-quantitative analysis, NMR Biomed., 15:132-42 (2002).
Galons et al., Early increases in breast tumor xenograft water mobility in response to paclitaxel therapy detected by non-invasive diffusion magnetic resonance imaging, Neoplasia, 1(2):113-7 (1999).
Gevenois et al., Comparison of computed density and macroscopic morphometry in pulmonary emphysema, Am. J. Respir. Crit. Care Med., 152(2):653-7 (1995).
Gevenois et al., Comparison of computed density and microscopic morphometry in pulmonary emphysema, Am. J. Respir. Crit. Care Med., 154(1):187-92 (1996).
Gorbunova et al., Early detection of emphysema progression, Med. Image Comput. Comput. Assist. Interv., 13(Pt. 2):193-200 (2010).
Gorbunova et al., Weight preserving image registration for monitoring disease progression in lung CT, Medical Image Computing and Computer-Assisted Intervention A MICCAI 2008, pp. 863-870 (2008).
Green et al., Multi-scale rigid registration to detect damage in micro-CT images of progressively loaded bones, 2011 8th IEEE International Symposium on Biomedical Imaging: From Nano to Micro, IEEE, pp. 1231-1234 (2011).
Hall et al., Therapeutic efficacy of DTI-015 using diffusion magnetic resonance imaging as an early surrogate marker, Clin. Cancer Res., 10(23):7852-9 (2004).
Hamaoka et al., Bone imaging in metastatic breast cancer, J. Clin. Oncol., 22(14):2942-53 (2004).
Hamstra et al., Evaluation of the functional diffusion map as an early biomarker of time-to-progression and overall survival in high-grade glioma, Proc. Natl. Acad. Sci. USA, 102(46):16759-64 (2005).
Hamstra et al., Functional diffusion map as an early imaging biomarker for high-grade glioma: correlation with conventional radiologic response and overall survival, J. Clin. Oncol., 26(20):3387-94 (2008).
Hamstra et al., The use of 19F spectroscopy and diffusion-weighted MRI to evaluate differences in gene-dependent enzyme prodrug therapies, Mol. Ther., 10(5):916-28 (2004).

Hatzivassiliou et al., RAF inhibitors prime wild-type RAF to activate the MAPK pathway and enhance growth, Nature, 464(7287):431-5 (2010).
Hayward et al., Assessment of response to therapy in advanced breast cancer (an amendment), Br. J. Cancer, 38(1):201 (1978).
Hayward et al., Assessment of response to therapy in advanced breast cancer, Br. J. Cancer, 35(3):292-8 (1977).
Helen et al., Segmentation of pulmonary parenchyma in CT lung images based on 2D Otsu optimized by PSO, Emerging Trends in Electrical and Computer Technology, 2011 International Conference on IEEE, pp. 536-541 (2011).
Hoffmann, Pharmacokinetic mapping of the breast: a new method for dynamic MR mammography, Magn. Reson. Med., 33:506-14 (1995).
Hogg et al., The nature of small-airway obstruction in chronic obstructive pulmonary disease, N. Engl. J. Med., 350(26):2645-53 (2004).
Hu et al., Automatic lung segmentation for accurate quantitation of volumetric X-ray CT images, IEEE Trans. Med. Imaging, 20(6):490-8 (2001).
Hylton, Dynamic contrast-enhanced magnetic resonance imaging as an imaging biomarker, J. Clin. Oncol., 24:3293-8 (2006).
Infante et al., Safety, pharmacokinetic, pharmacodynamic, and efficacy data for the oral MEK inhibitor trametinib: a phase 1 dose-escalation trial, Lancet Oncol., 13(8):773-81 (2012).
International Preliminary Report on Patentability, corresponding international application No. PCT/US12/45144, dated Jan. 7, 2014.
International Search Report and Written Opinion from PCT/US2012/045144 dated Oct. 4, 2012.
Jacobs et al., Registration and warping of magnetic resonance images to histological sections, Med. Phys., 26(8):1568-78 (1999).
Janke et al., Use of spherical harmonic deconvolution methods to compensate for nonlinear gradient effects on MRI images, Magn. Reson. Med., 52(1):115-22 (2004).
Jemal et al., Cancer statistics, 2010, CA Cancer J. Clin., 60(5):277-300 (2010).
Jennings et al., Early response of prostate carcinoma xenografts to docetaxel chemotherapy monitored with diffusion MRI, Neoplasia, 4(3):255-62 (2002).
Jordan et al., Dynamic contrast-enhanced and diffusion MRI show rapid and dramatic changes in tumor microenvironment in response to inhibition of HIF-1alpha using PX-478, Neoplasia, 7(5):475-85 (2005).
Kalikin et al., In vivo visualization of metastatic prostate cancer and quantitation of disease progression in immunocompromised mice, Cancer Biol. Ther., 2(6):656-60 (2003).
Karreth et al., C-Raf inhibits MAPK activation and transformation by B-Raf(V600E), Mol. Cell, 36(3):477-86 (2009).
Kiesling et al., "Contrast agents and applications to assess tumor angiogenesis in vivo by magnetic resonance imaging," Curr. Med. Chem., 14:77-91 (2007).
Kim et al., Correction of local deformations in fMRI by 3D non-linear warping in map-slice-to-volume approach, Proc. Intl. Soc. Mag. Reson. Med., 8:1765 (2000).
Kim et al., CT metrics of airway disease and emphysema in severe COPD, Chest., 136(2):396-404 (2009).
Kim et al., Mutual information for automated unwarping of rat brain autoradiographs, Neuroimage, 5(1):31-40 (1997).
Kim et al., Phase II study of the MEK1/MEK2 inhibitor Trametinib in patients with metastatic BRAF-mutant cutaneous melanoma previously treated with or without a BRAF inhibitor, J. Clin. Oncol., 31(4):482-9 (2013).
Kubo et al., Expiratory and inspiratory chest computed tomography and pulmonary function tests in cigarette smokers, Eur. Respir. J., 13(2):252-6 (1999).
Latour et al., Time-dependent diffusion of water in a biological model system, Proc. Natl. Acad. Sci. USA, 91(4):1229-33 (1994).
Laun et al., How background noise shifts eigenvectors and increases eigenvalues in DTI, Magma, 22(3):151-8 (2009).
Lazebnik et al., Volume registration using needle paths and point landmarks for evaluation of interventional MRI treatments, IEEE Trans. Med. Imaging, 22(5):653-60 (2003).

(56) References Cited

OTHER PUBLICATIONS

Lee et al., A feasibility study evaluating the functional diffusion map as a predictive imaging biomarker for detection of treatment response in a patient with metastic prostate cancer to the bone, Neoplasia, 9(12):1003-11 (2007).
Lee et al., Dynamic imaging of emerging resistance during cancer therapy, Cancer Res., 66(9):4687-92 (2006).
Lee et al., Prospective early response imaging biomarker for neoadjuvant breast cancer chemotherapy, Clin. Cancer Res., 13(2 Pt. 1):443-50 (2007).
Leung et al., Automatic quantification of changes in bone in serial MR images of joints, IEEE Transactions on Medical Imaging, 25(12):1617-26 (2006).
Li et al., Pulmonary CT image registration and warping for tracking tissue deformation during the respiratory cycle through 3D consistent image registration, Med. Phys., 35(12):5575-83 (2008).
Lorusso et al., Phase I and pharmacodynamic study of the oral MEK inhibitor CI-1040 in patients with advanced malignancies, J. Clin. Oncol., 23(23):5281-93 (2005).
Low et al., Novel breathing motion model for radiotherapy, Int. J. Radiat. Oncol. Biol. Phys., 63(3):921-9 (2005).
Lyng et al., Measurement of cell density and necrotic fraction in human melanoma xenografts by diffusion weighted magnetic resonance imaging, Magn. Reson. Med., 43(6):828-36 (2000).
Ma et al., "Asymmetric dipolar cycloaddition reactions: a practical, convergent synthesis of chiral pyrrolidines," Tetrahedron: asymmetry, 8(6):883-8 (1997).
Ma et al., "Voxel-by-voxel functional diffusion mapping for early evaluation of breast cancer treatment", In Information Processing in Medical Imaging, 21:276-87 (2009).
Macdonald et al., Response criteria for phase II studies of supratentorial malignant glioma, J. Clin. Oncol., 8(7):1277-80 (1990).
Magnetic Resonance Imaging, two pages, Churchill Livingstone's Dictionary of Nursing (2006).
Matsuoka et al., "Quantitative assessment of peripheral airway obstruction on paired expiratory/inspiratory thin-section computed tomography in chronic obstructive pulmonary disease with emphysema", J. Comput. Assist. Tomogr., 31(3):384-9 (2007).
Matsuoka et al., Quantitative assessment of air trapping in chronic obstructive pulmonary disease using inspiratory and expiratory volumetric MDCT, AJR Am. J. Roentgenol., 190(3):762-9 (2008).
Mattiello et al., The b matrix in diffusion tensor echo-planar imaging, Magn. Reson. Med., 37(2):292-300 (1997).
McCubrey et al., Emerging Raf inhibitors, Expert Opin. Emerg. Drugs, 14(4):633-48 (2009).
Mehta et al., Monitoring radiographic brain tumor progression, Toxins (Basel), 3(3):191-200 (2011).
Meyer et al., A methodology for registration of a histological slide and in vivo MRI volume based on optimizing mutual information, Mol. Imaging, 5(1):16-23 (2006).
Meyer et al., Demonstration of accuracy and clinical versatility of mutual information for automatic multimodality image fusion using affine and thin-plate spline warped geometric deformations, Med. Image Anal., 1(3):195-206 (1997).
Mirzoeva et al., Basal subtype and MAPK/ERK kinase (MEK)-phosphoinositide 3-kinase feedback signaling determine susceptibility of breast cancer cells to MEK inhibition, Cancer Res., 69(2):565-72 (2009).
Moffat et al., Diffusion imaging for evaluation of tumor therapies in preclinical animal models, MAGMA, 17(3-6):249-59 (2004).
Moffat et al., Diffusion MR imaging in adult neoplasia, CUP, Cambridge: Physiological MR in Clinical Neuroscience, (2004).
Moffat et al., Functional diffusion map: a noninvasive MRI biomarker for early stratification of clinical brain tumor response, Proc. Natl. Acad. Sci. USA, 102(15):5524-9 (2005).
Moffat et al., The functional diffusion map: an imaging biomarker for the early prediction of cancer treatment outcome, Neoplasia, 8(4):259-67 (2006).
Montagut et al., Targeting the RAF-MEK-ERK pathway in cancer therapy, Cancer Lett., 283(2):125-34 (2009).

Muhlradt et al., Epothilone B stabilizes microtubuli of macrophages like taxol without showing taxol-like endotoxin activity, Cancer Res., 57(16):3344-6 (1997).
Murphy, et al., "Obstructive pulmonary funtion: Pateitn classification using 3D registration of inspiration and expiration CT images," In the Second International Workshop on Pulmonary Image Analysis, pp. 37-47 (2009).
Nakano et al., Computed tomographic measurements of airway dimensions and emphysema in smokers. Correlation with lung function, Am. J. Respir. Crit. Care Med., 162(3 Pt. 1):1102-8 (2000).
Nicolaou et al., Synthesis of epothilones A and B in solid and solution phase, Nature, 387(6630):268-72 (1997).
O'Connor et al., DCE-MRI biomarkers in the clinical evaluation of antiangiogenic and vascular disrupting agents, Br. J. Cancer, 96:189-95 (2007).
Ostergard et al., High resolution measurement of cerebral blood flow using intravascular tracer bolus passages, Part I: Mathematical approach and statistical analysis, Magn. Reson. Med., 36:715-25 (1996).
Ozcan et al., Characterization of imaging gradients in diffusion tensor imaging, J. Magn. Reson., 207(1):24-33 (2010).
Padhani et al., Diffusion-weighted magnetic resonance imaging as a cancer biomarker: consensus and recommendations, Neoplasia, 11(2):102-25 (2009).
Panda et al., Differential effects of vinblastine on polymerization and dynamics at opposite microtubule ends, J. Biol. Chem., 271(47):29807-12 (1996).
Panda et al., Stabilization of microtubule dynamics by estramustine by binding to a novel site in tubulin: a possible mechanistic basis for its antitumor action, Proc. Natl. Acad. Sci. USA, 94(20):10560-4 (1997).
Park et al., Registration methodology for histological sections and ex vivo imaging of human prostate, Academic Radiology, 15(8) (Aug. 2008).
Pelizzari et al., Three dimensional correlation of PET, CT and MRI images, J. Nucl. Med., 28(4):682-3 (1987).
Petrylak et al., Docetaxel and estramustine compared with mitoxantrone and prednisone for advanced refractory prostate cancer, N. Engl. J. Med., 351(15):1513-20 (2004).
Poulikakos et al., RAF inhibitors transactivate RAF dimers and ERK signalling in cells with wild-type BRAF, Nature, 464(7287):427-30 (2010).
Preusser et al., Current concepts and management of glioblastoma, Ann. Neurol., 70(1):9-21 (2011).
Regan et al., Genetic epidemiology of COPD (COPDGene) study design, COPD, 7(1):32-43 (2010).
Rehemtulla et al., Molecular imaging of gene expression and efficacy following adenoviral-mediated brain tumor gene therapy, Mol. Imaging, 1(1):43-55 (2002).
Reinhardt et al., "Registration-based estimates of local lung tissue expansion compared to xenon-CT measures of specific ventilation", Med Image Anal. p. 1-26 (2008).
Reinhardt et al., Registration-based estimates of local lung tissue expansion compared to xenon CT measures of specific ventilation, Med. Image Anal., 12(6):752-63 (2008).
Reinhardt et al., Registration-derived estimates of local lung expansion as surrogates for regional ventilation, Int. Process. Med. Imaging, 20:763-74 (2007).
Reischauer et al., Bone metastases from prostate cancer: assessing treatment response by using diffusion-weighted imaging and functional diffusion maps—initial observations, Radiology, 257(2):523-31 (2010).
Robson, Non-linear gradients on clinical MRI systems introduce systematic errors in ADC and DTI measurements, ISMRM Proceedings (2002).
Rodrigues et al., The C-neu mammary carcinoma in Oncomice; characterization and monitoring response to treatment with herceptin by magnetic resonance methods, MAGMA, 17(3-6):260-70 (2004).
Romeo et al., Magnet field profiling: analysis and correcting coil design, Magn. Reson. Med., 1(1):44-65 (1984).
Rosen et al., Perfusion imaging with NMR contrast agents, Magn. Reson. Med., 14:249-65 (1990).

(56) References Cited

OTHER PUBLICATIONS

Ross et al. Assessment of the functional diffusion map: an imaging biomarker for early stratification of glioma clinical response, 2006 ASCO Annual Meeting Journal of Clinical Oncology, 24(18s): 1518 (2006).
Ross et al., Contributions of cell kill and posttreatment tumor growth rates to the repopulation of intracerebral 9L tumors after chemotherapy: an MRI study, Proc. Natl. Acad. Sci. USA, 95(12):7012-7 (1998).
Ross et al., Evaluation of cancer therapy using diffusion magnetic resonance imaging, Mol. Cancer Ther., 2(6):581-7 (2003).
Ross et al., Magnetic resonance imaging in cancer research, Eur. J. Cancer, 38(16):2147-56 (2002).
Ross et al., The role of magnetic resonance in the evaluation of cancer therapeutics, Clin. Cancer Res., 5:3870s-1s (1999).
Roth et al., High-b-value diffusion-weighted MR imaging for pretreatment prediction and early monitoring of tumor response to therapy in mice, Radiology, 232(3):685-92 (2004).
Sawllani et al., Glioblastoma: a method for predicting response to antiangiogenic chemotherapy by using MR perfusion imaging-pilot study, Radiology, 255(2):622 (2010).
Sawyers, Imatinib GIST keeps finding new indications: successful treatment of dermatofibrosarcoma protuberans by targeted inhibition of the platelet-derived growth factor receptor, J. Clin. Oncol., 20(17):3568-9 (2002).
Schepkin et al., Proton and sodium MRI assessment of emerging tumor chemotherapeutic resistance, NMR Biomed., 19(8):1035-42 (2006).
Scher et al., Prostate cancer clinical trial end points: "RECIST"ing a step backwards, Clin. Cancer Res., 11(14):5223-32 (2005).
Scher et al., The association between measures of progression and survival in castrate-metastatic prostate cancer, Clin. Cancer Res., 13(5):1488-92 (2007).
Sebolt-Leopold et al., Targeting the mitogen-activated protein kinase cascade to treat cancer, Nat. Rev. Cancer, 4(12):937-47 (2004).
Sebolt-Leopold, Advances in the development of cancer therapeutics directed against the RAS-mitogen-activated protein kinase pathway, Clin. Cancer Res., 14(12):3651-6 (2008).
Shimizu et al., The clinical effect of the dual-targeting strategy involving PI3K/AKT/mTOR and RAS/MEK/ERK pathways in patients with advanced cancer, Clin. Cancer Res., 18(8):2316-25 (2012).
Sos et al., Identifying genotype-dependent efficacy of single and combined PI3K- and MAPK-pathway inhibition in cancer, Proc. Natl. Acad. Sci. USA, 106(43):18351-6 (2009).
Stegman et al., Diffusion MRI detects early events in the response of a glioma model to the yeast cytosine deaminase gene therapy strategy, Gene Ther., 7(12):1005-10 (2000).
Taichman et al., The evolving biology and treatment of prostate cancer, J. Clin. Invest., 117)9):2351-61 (2007).
Tannock et al., Docetaxel plus prednisone or mitoxantrone plus prednisone for advanced prostate cancer, N. Engl. J. Med., 351(15):1502-12 (2004).
Therasse et al., New guidelines to evaluate the response to treatment in solid tumors. European Organization for Research and Treatment of Cancer, National Cancer Institute of the United States, National Cancer Institute of Canada, J. Natl. Cancer Inst., 92(3):205-16 (2000).
Thomas et al., Phase I study of the safety, tolerability, pharmacokinetics and pharmacodynamics of PTK787/ZK 222584 administered twice daily in patients with advanced cancer, J. Clin. Oncol., 23:4162-71 (2005).
Tofts et al., Estimating kinetic parameters from dynamic contrast-enhanced T(1)-weighted MRI of a diffusable tracer: standardized quantities and symbols, J. Magn. Reson. Imaging, 10:223-32 (1999).
Tofts, Modeling tracer kinetics in dynamic Gd-DTPA MR imaging, J. Magn. Reson. Imaging, 7:91-101 (1997).
Tsien et al., Parametric response map as an imaging biomarker to distinguish progression from pseudoprogression in high-grade glioma, J. Clin. Oncol., 28(13):2293-9 (2010).
Vasquez et al., Nanomolar concentrations of nocodazole alter microtubule dynamic instability in vivo and in vitro, Mol. Biol. Cell, 8(6):973-85 (1997).
Vilanova et al., Diffusion-weighted whole-body MR screening, Eur. J. Radiology, 67(3):440-7 (2008).
Viola et al., Alignment by maximization of mutual information, in Proceedings of 5th Intl. Conf. on Computer Vision, MIT, IEEE Press 95CH35744:16-23 (1995).
Vladlena et al., "Weight Preserving Image Registration for Monitoring Disease Progression in Lung CT", Sep. 6, 2008, Medical Image Computing and Computer-Assisted Intervention MICCAI 2008; Lecture Notes in Computer Science, Springer, Berlin, Heidelberg, pp. 863-870.
Washko et al., Identification of early interstitial lung disease in smokers from the COPDGene Study, Acad. Radiol., 17(1):48-53 (2010).
Washko et al., Lung volumes and emphysema in smokers with interstitial lung abnormalities, N. Engl. J. Med., 364(10:897-906 (2011).
Watts et al., "Relationship Between Changes in BMD and Nonvertebral Fracture Incidence Associated with Risedronate: Reduction in risk of Nonvertebral Fracture is not Related to Change in BMD," J Bone Miner Res. 20:2097-104 (2005).
Wee et al., PI3K pathway activation mediates resistance to MEK inhibitors in KRAS mutant cancers, Cancer Res., 69(10):4286-93 (2009).
Wen et al., Updated response assessment criteria for high-grade gliomas: response assessment in neuro-oncology working group, J. Clin. Oncol., 28(11):1963-72 (2010).
Wilson et al., Radiofrequency thermal ablation: 3D MR histology correlation for localization of cell death in MR lesion images, in: Proceedings of Intl. Symp. Biomed. Imaging, pp. 1537-1540 (2004).
World Health Organization, WHO Handbook for Reporting Results of Cancer Treatment, World Health Organization Offset Publication, Atlanta (1979).
Wu et al., A method for calibrating diffusion gradients in diffusion tensor imaging, J. Comput. Assist. Tomogr., 31(6):984-93 (2007).
Xiong et al., A phase I surrogate endpoint study of SU68868 in patients with solid tumors, Invest. New Drugs, 22:459-66 (2004).
Yamashiro et al., Collapsibility of lung volume by paired inspiratory and expiratory CT scans: correlations with lung function and mean lung density, Acad. Radiol., 17(4):489-95 (2010).
Yim et al., Deformable lung registration between exhale and inhale CT scans using active cells in a combined gradient force approach, Med. Phys., 37(8):4307-17 (2010).
Yin et al., Mass preserving nonrigid registration of CT lung images using cubic B-spline, Med. Phys., 36(9):4213-22 (2009).
Yu et al., Response and determinants of cancer cell susceptibility to PI3K inhibitors: combined targeting of PI3K and Mek1 as an effective anticancer strategy, Cancer Biol. Ther., 7(2):307-15 (2008).
Zacharaki et al., ORBIT: A multiresolution framework for deformable registration of brain tumor images, IEEE Trans. Med. Imaging, 27(8):1003-17 (2008).
Zahra et al., Dynamic contrast-enhanced MRI as a predictor of tumour response to radiotherapy, Lancet Oncol., 8:63-74 (2007).
Zarow et al., A standardized method for brain-cutting suitable for both stereology and MRI-brain co-registration, J. Neurosci. Methods, 139(2):209-15 (2004).
Zhao et al., Early detection of treatment response by diffusion-weighted 1H-NMR spectroscopy in a murine tumour in vivo, Br. J. Cancer, 73(1):61-4 (1996).

\* cited by examiner

Left figure: Aqua points are user-identified or can be computer auto-generated.
Right figure: Predefined feature set that will model most lung deformation. For each lung: AQUA=first 7 features (manual select), PURPLE=next 7 features, YELLOW =14 more features, GREEN=final 28 features.

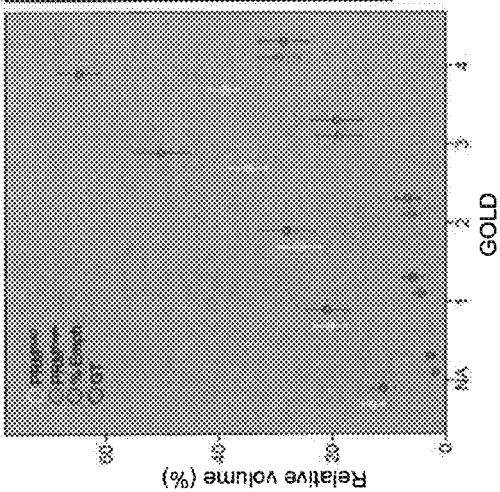

Figure 14 Comparison of PRM metrics to CT-based measures of emphysema and gas trapping. The plot presented demonstrates the unique ability of PRM to differentiate the contributions of fSAD and emphysema from gas trapping (GT) at varying GOLD status. GT is determined by summing all voxels with attenuation < −856 HU on the expiratory CT scan and dividing by the total lung volume. % Emphysema (% Emph) is determined by summing all voxels with attenuation < −950 HU on the inspiratory CT scan and dividing by the total lung volume. Data are presented as means and error as 95% confidence intervals.

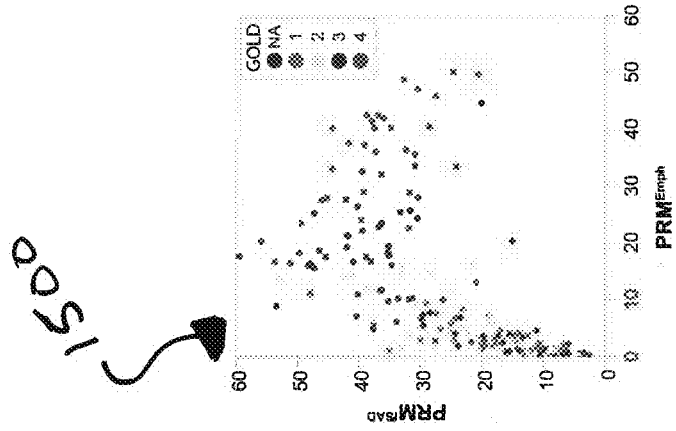

Figure 15: Contributions of fSAD and emphysema in COPDGene cohort. Presented is a plot of the relative volumes of fSAD (PRM$^{fSAD}$) and emphysema (PRM$^{Emph}$) for each of the 194 subjects studied with color-coding for GOLD status. A clear transition between the contribution of fSAD and emphysema is observed with increasing flow obstruction as determined by GOLD. Flow obstruction in individuals classified as having none to moderate COPD tend to result from fSAD and not emphysema. In contrast, more severe COPD is accompanied by both fSAD and emphysema. As in Fig. 2 of the main text, a trend is identified between PRM$^{fSAD}$ and PRM$^{Emph}$ suggesting a relationship between fSAD and emphysema.

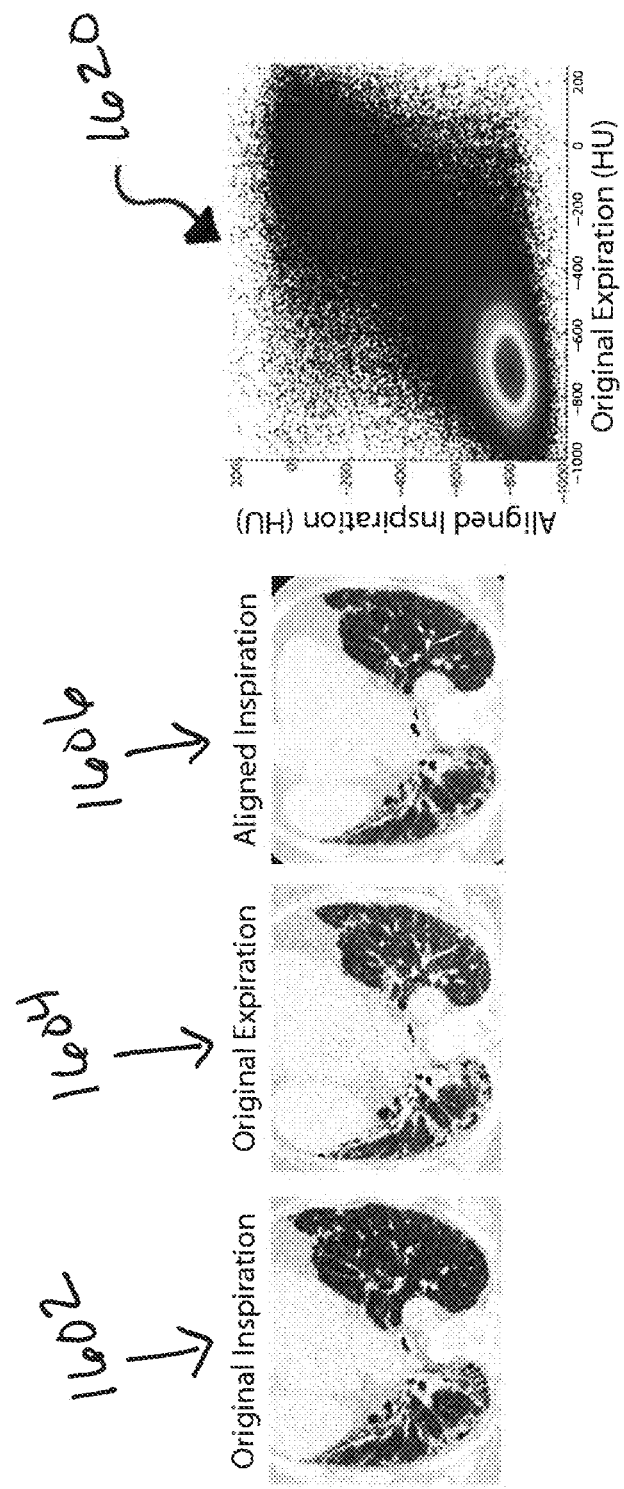

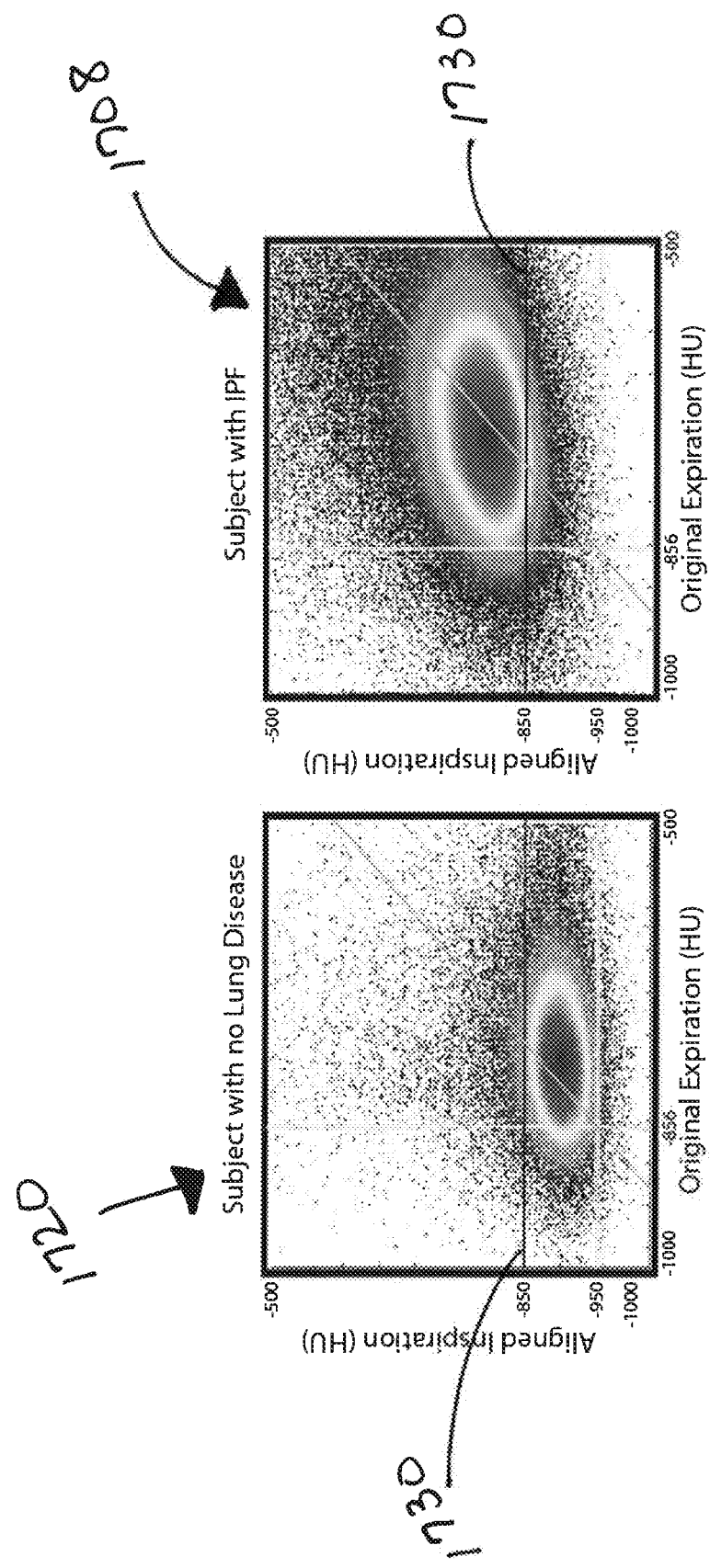

TISSUE PHASIC CLASSIFICATION MAPPING SYSTEM AND METHOD

CROSS-REFERENCE TO RELATED APPLICATIONS

This application is a continuation of U.S. application Ser. No. 13/539,254, entitled "Tissue Phasic Classification Mapping System and Method," filed Jun. 29, 2012, which claims priority to U.S. Provisional Application No. 61/559,498, entitled "Tissue Phenotype Classification Mapping System and Method," filed Nov. 14, 2011, and U.S. Provisional Application No. 61/502,805, entitled "Parametric Response Map as an Imaging Biomarker for Assessment of COPD Severity," filed Jun. 29, 2011, each of which are hereby incorporated herein in their entirety.

FIELD OF THE INVENTION

The present disclosure relates to novel and advantageous systems and methods for monitoring tissue regions and, more particularly, to systems and methods for detecting changes in tissue regions over a period of time, for example, during patient diagnosis or treatment.

BACKGROUND OF THE INVENTION

Chronic obstructive pulmonary disease (COPD) is a highly and increasingly prevalent disorder referring to a group of lung diseases that block airflow during exhalation and make it increasingly difficult to breathe. COPD can cause coughing that produces large amounts of mucus, wheezing, shortness of breath, chest tightness, and other symptoms. Emphysema and chronic asthmatic bronchitis are the two main conditions that make up COPD. Cigarette smoking is the leading cause of COPD. Most people who have COPD smoke or used to smoke. Long-term exposure to other lung irritants, such as air pollution, chemical fumes, or dust, also may contribute to COPD. In all cases, damage to lung airways may eventually interfere with the exchange of oxygen and carbon dioxide in the lungs, which can lead to serious bodily injury. COPD is identified by airway limitations that may arise from progressive emphysematous lung destruction, small airways disease or a combination of both. COPD is a heterogeneous disorder that arises from pathological processes including emphysematous lung tissue destruction, gross airway disease and functional small airway disease (fSAD) in varying combinations and severity within an individual patient. It is widely accepted that fSAD and emphysema are the two main components of COPD and that a spectrum of COPD phenotypes with varying contributions of these components exists in individual patients.

Numerous techniques have been used in attempting to measure COPD, including numerous imaging techniques. Computed tomography (CT) is a minimally invasive imaging technique that is capable of providing both high contrast and detailed resolution of the pulmonary system and that has been used to aid physicians in identifying structural abnormalities associated with COPD. Although CT is primarily used qualitatively (i.e., through visual inspection), research has been devoted to the application of quantitative CT, measured in Hounsfield Units (HU), for identifying underlying specific COPD phenotypes, with the hopes that such quantitative techniques would dictate an effective treatment strategy for the patient. Knowing the precise COPD phenotype for an individual patient, including the location, type, and severity of damage throughout the lungs would allow for the formulation of a tailored treatment regimen that accounts for the patient's specific disease state. Currently, the inability of medical professionals to accurately diagnose a patient's COPD phenotype inhibits such tailored and targeted treatment.

As indicated, a variety of CT-based metrics have been evaluated separately on inspiratory and expiratory CT scans or in combination. The most widely used technique is the lung relative volume of emphysema known as Low Attenuation Areas (LAA), which determines the sum of all image voxels with HU<−950 normalized to total inspiratory lung volume on a quantitative CT scan. This metric is easily calculated using standard imaging protocols making it readily measureable at clinical sites for evaluation. In addition, and most importantly, the LAA approach has been validated by pathology. However, this metric only identifies one extreme (i.e., emphysema) of the spectrum of underlying COPD phenotypes. Nevertheless, the validation of LAA has prompted researches to investigate the utility of inspiratory and expiratory CT scans, either analyzed individually as with LAA or in unison, to identify imaging biomarkers that provide for a more accurate correlate of COPD.

Various approaches have been evaluated for assessing COPD severity using serial CT images, which may be phasic or temporal. Previous studies have evaluated different methods for analyzing expiratory and inspiratory CT scans to provide information on air trapping in patients with COPD. The work of Matsuoka et at. (Matsuoka et al., "Quantitative Assessment of Air Trapping in Chronic Obstructive Pulmonary Disease Using Inspiratory and Expiratory Volumetric MDCT," *American Journal of Roentgenology*, 190, 762-769 (2008)) has shown that exclusion of emphysematous lung from their analysis improved the correlation of their metric, the relative volume change (860-950 HU), to pulmonary function tests (PFTs). Although a strong correlation to PFTs was clearly demonstrated, no direct comparison of the relative volume change (860-950 HU) was performed to LAA since the motivation of their work was to identify air trapping. In addition, this work, as well as other work, used non-registered data sets for deriving the CT-based metrics of COPD severity. These metrics are easily derived from standard CT protocols, but only provide a global measure of COPD severity lacking the ability to interpret spatial information within the CT scans.

To make up for this deficiency, researchers are engaged in applying advanced deformable image registration algorithms between thoracic CT images. Different approaches have been applied for analyzing registered data sets as a means for assessing COPD severity or disease progression. For example, Reinhardt et al. (Reinhardt et al., "Registration-Based Estimates of Local Lung Tissue Expansion Compared to Xenon CT Measures of Specific Ventilation," *Medical Image Analysis*, 12, 752-763 (2008)) have demonstrated in an animal model that the Jacobian, a measure of the specific volume change, obtained from two registered CT lung images at different phases correlates with lung function.

As a means for assessing emphysema progression, Gorbunova et al. (Gorbunova et al., "Early Detection of Emphysema Progression. Medical Image Computing and Computer-Assisted Intervention," *International Conference on Medical Image Computing and Computer-Assisted Intervention*, 13, 193-200 (2010); and Gorbunova et al., "Weight Preserving Image Registration for Monitoring Disease Progression in Lung CT," *International Conference on Medical Image Computing and Computer-Assisted Intervention*, 11, 863-870 (2008)) have demonstrated two approaches for analyzing registered longitudinal inspiratory CT data. The first method relies on identifying density differences in the longitudinal inspiration level in the two scans, while the second identifies local dissimilarities between longitudinal scans. Both approaches were found to correlate with emphysema progression as determined by LAA.

Although extensive research has been devoted to evaluate CT-based techniques for assessing COPD severity, no effective techniques have been developed for using CT-based imaging to identify COPD phenotypes beyond the emphysema metric. Accordingly, a need exists for a system and method for assessing COPD status that is able to classify local variations in lung function that provides global measures as well as local measures of COPD severity. A need also exists for a robust imaging-based biomarker that allows for visualization and quantification of COPD phenotypes.

BRIEF SUMMARY OF THE INVENTION

The present disclosure relates to techniques for assessing a variety of tissue characterizations using a phasic classification map (PCM) analysis of quantitative medical image data. In some embodiments, the techniques of the present disclosure use deformation registration of image data, comparing images taken at different tissue states, which may be analyzed over time from which a voxel-by-voxel, or pixel-by-pixel, image analysis is performed.

In one embodiment, the present disclosure is directed to a computer-implemented method of analyzing a sample region of a body to assess the state of the sample region. The method includes collecting, using a medical imaging device, a first image data set of the sample region while in a first phase state of movement, the first image data set comprising a first plurality of voxels each characterized by a signal value in the first image data set; and collecting, using the medical imaging device, a second image data set of the sample region while in a second phase state of movement, the second image data set comprising a second plurality of voxels each characterized by a signal value in the second image data set. The method further includes deformably registering via computer-executable instructions, the first image data set and the second image data set to produce a co-registered image data set that comprises a plurality of co-registered voxels, wherein each of the co-registered voxels includes the signal value of the co-registered voxel of the first image data set and the second image data set; and forming a classification mapping data set via computer-executable instructions using the co-registered image data set, wherein the mapping data set comprises the changes in signal values between co-registered voxels segmented by the first phase state and the second phase state. The method also includes performing a threshold analysis of the mapping data set to segment the mapping data set into at least one region indicating the presence of a condition and at least one region indicating the non-presence of the condition.

This embodiment may be extended to include the analysis of multi-phase data, instead of bi-phasic data, to indicate the presence of the pathology condition in a sample region. This embodiment may be extended to include temporal changes in tissue physiology and pathology by acquiring and analyzing multi-phasic imaging data serially over time to monitor disease status or disease response to therapy.

In one embodiment, the present disclosure is directed to an apparatus having a processor and a computer-readable medium that includes instructions that when executed by the processor cause the apparatus to collect, from a medical imaging device, a plurality of image data sets of a sample region, wherein each image data set comprises a plurality of voxels, each of which is characterized by a signal value; deformably register, in an image processing module of the apparatus, the plurality of image data sets to produce a co-registered image data set comprising a plurality of co-registered voxels, wherein each of the co-registered voxels includes the signal value from each of the plurality of image data sets; form, in a pathology diagnostic module of the apparatus, a classification mapping data set using the co-registered image data set, wherein the mapping data set comprises the changes in signal values between the co-registered voxels; and perform, in the pathology diagnostic module, a threshold analysis of the mapping data set to segment the mapping data into at least one region indicating the presence of a condition and at least one region indicating the non-presence of a condition.

In one embodiment, the present disclosure is directed to a computer-implemented method of analyzing a sample region that undergoes a change in tissue pathophysiology as a result of disease and/or therapy to determine the existence of a pathology condition. The method includes the following: collecting, using a medical imaging device, a first image data set comprising multi-phasic data of the sample region at a first time, the first image data comprising a first plurality of voxels each characterized by a signal value in the first image data set; collecting, using the medical imaging device, a second image data set comprising multi-phasic data of the sample region at a second time, the second image data comprising a second plurality of voxels each characterized by a signal value in the second image data set; deformably registering the first multi-phasic image data set and the second multi-phasic image data set to produce a co-registered image data set that comprises a plurality of co-registered voxels, wherein each of the co-registered voxels includes the signal value of the voxel associated with the first image data set, and the signal value of the voxel from the second image data set. The method also includes forming via computer-executable instructions, a classification mapping data set using the co-registered image data set, wherein the mapping data set comprises the changes in signal values between co-registered voxels segmented by the first time point and the second time point. The method also includes performing a threshold analysis of the mapping data to segment the mapping data into at least one region indicating the presence of the condition and at least one region indicating the non-presence of the condition.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

This patent or application file contains at least one drawing executed in color. Copies of this patent or patent application publication with color drawing(s) will be provided by the United States Patent and Trademark Office upon request and payment of the necessary fee.

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

FIG. 5 also provides maps of lung emphysema based on a −950 cutoff and unified PCM color-overlays, along with a corresponding scatter plot provided for representation of non-COPD and GOLD 4 subjects. FIG. 5 further illustrates individual color-coded PCM maps for each subject, as well as a table of the results from a univariate and multivariate general linear regression of LAA and blue to $FEV_1$.

FIG. 14 provides a graph comparing PRM metrics to CT-based measures of emphysema and gas trapping, in accordance with embodiments of the present disclosure.

FIG. 15 provides a graph showing contributions of fSAD and emphysema in the COPDGene Study cohort, in accordance with embodiments of the present disclosure.

FIG. 16 illustrates scanned images including PCM and an associated scatter plot, in accordance with embodiments of the present disclosure.

FIG. 17 is duplicate of FIG. 2 illustrating a PCM scatter plot of a subject with no lung disease and a PCM scatter plot of a subject with IPF, in accordance with embodiments of the present disclosure.

DETAILED DESCRIPTION

Figure 1:
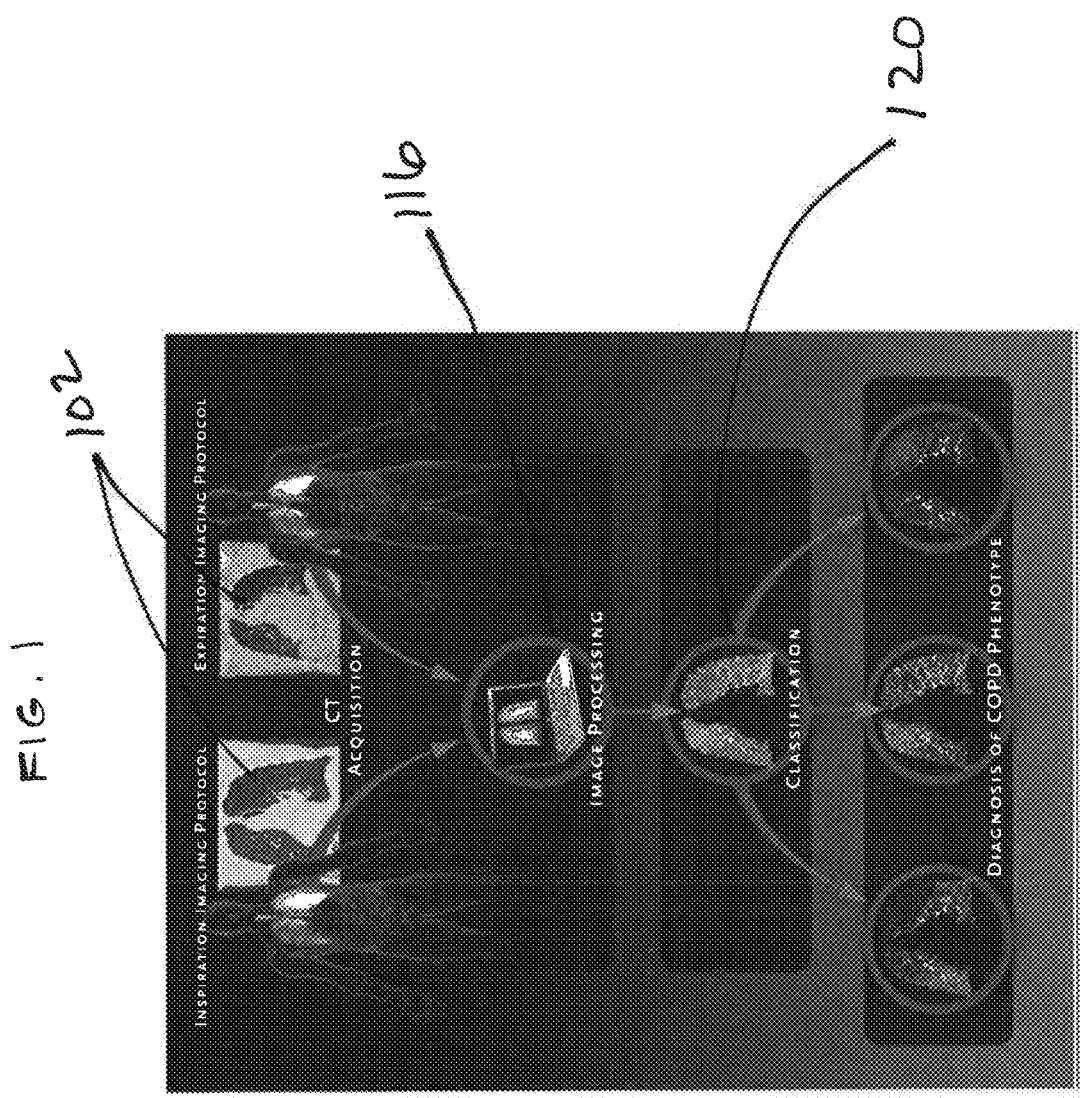
FIG. 1 is a schematic diagram of the PCM method, in accordance with embodiments of the present disclosure.

The present disclosure describes techniques for assessing a variety of tissue states using a phasic classification map (PCM) analysis of quantitative medical image data. In some embodiments, the techniques of the present disclosure use deformation registration of image data, comparing images taken at different tissue states, in some cases temporally, from which a voxel-by-voxel, or pixel-by-pixel, image analysis is performed. The medical imaging data may be from a variety of different sources, including, but not limited to magnetic resonance imaging (MRI), computed tomography (CT), two-dimensional planar X-Ray, positron emission tomography (PET), ultrasound (US), and single-photon emission computed tomography (SPECT). Within a given instrumentation source (i.e. MRI, CT, X-Ray, PET and SPECT) a variety of data can be generated. For example, MRI devices can generate diffusion, perfusion, permeability, normalized and spectroscopic images, which include molecules containing, for example, but not limited to, 1H, 13C, 23 Na, 31P, and 19F, hyperpolarized Helium, Xenon and/or 13C MRI, which can also be used to generate kinetic parameter maps. PET, SPECT and CT devices are also capable of generating static images as well as kinetic parameters by fitting temporally resolved imaging data to a pharmacokinetic model. Imaging data, irrespective of source and modality, can be presented as quantified (i.e., has physical units) or normalized (i.e., images are normalized to an external phantom or something of known and constant property or a defined signal within the image volume) maps so that images can be compared between patients as well as data acquired during different scanning sessions.

The techniques of the present disclosure are not limited to a particular type or kind of tissue region or motion. By way of example only, suitable tissue types include lung, prostate, breast, colon, rectum, bladder, ovaries, skin, liver, spine, bone, pancreas, cervix, lymph, thyroid, spleen, adrenal gland, salivary gland, sebaceous gland, testis, thymus gland, penis, uterus, trachea, skeletal muscle, smooth muscle, heart, etc. In some embodiments, the tissue region may be a whole body or large portion thereof (for example, a body segment such as a torso or limb; a body system such as the gastrointestinal system, endocrine system, etc.; or a whole organ comprising multiple tumors, such as whole liver) of a living human being. In some embodiments, the tissue region is a diseased tissue region. In some embodiments, the tissue region is an organ. In some embodiments, the tissue region is a tumor, for example, a malignant or benign tumor. In some embodiments, the tissue region is a breast tumor, a liver tumor, a bone lesion, and/or a head/neck tumor. In some embodiments the tissue is from a non-human animal. By way of example only, suitable movements may include respiratory and cardiac cycle movements, smooth and striated muscle contraction, joint and spinal positioning for assessment by Dynamic-Kinetic MRI and positional MRI, and induced propagated waves at varying frequencies in tissues or tumors assessed by magnetic resonance elastography.

In addition, the techniques are not limited to a particular type or kind of treatment. In some embodiments, the techniques may be used as part of a pharmaceutical treatment, a vaccine treatment, a chemotherapy based treatment, a radiation based treatment, a surgical treatment, and/or a homeopathic treatment and/or a combination of treatments. In other embodiments the techniques may be used for prognosis or diagnosis.

In some embodiments, the present application describes a voxel-by-voxel, or pixel-by-pixel, PCM (Phasic Classification Map) technique for assessing tissue states, such as COPD severity in lung tissue, or other tissue states of the lung that may be associated with other conditions or diseases. PCM may generally be considered a particular application of another voxel-based method, called the parametric response map (PRM). PRM was developed and shown to improve the sensitivity of diffusion-MRI data to aid in identifying early therapeutic response in glioma patients. PRM, when applied to diffusion-MRI data, had been validated as an early surrogate imaging biomarker for gliomas, head and neck cancer, breast cancer and metastatic prostate cancer to the bone, for example. In addition, PRM has been applied to temporal perfusion-MRI for assessing early therapeutic response and survival in brain cancer patients. PRM is found to improve the sensitivity of the diffusion and perfusion MRI data by classifying voxels based on the extent of change in the quantitative values over time. This approach provides not only spatial information and regional response in the cancer to treatment but is also a global measure that can be used as a decision making tool for the treatment management of cancer patients. The global measure is presented as the relative volume of tumor whose quantitative values have increased, decreased or remained unchanged with time. As used herein, PCM may be considered a particular application of PRM as applied to cyclic image data. Throughout this application, the technique of the present disclosure may be referred to as either PRM or PCM.

The techniques of the present disclosure are sensitive enough to detect varying tissue states, from a normal state through to a diagnosable pathology condition, for example. An example of the PCM technique proposed for assessing COPD is illustrated in FIG. 1. As shown, there are generally three steps in applying PCM using CT data prior to clinical diagnosis, including: image acquisition 102, co-registration and image processing 116, and classification of the voxels making up the processed image 120. Various classification schemes are contemplated and within the spirit and scope of the present disclosure. In some embodiments, the classification scheme can include color-coded voxels of the processed images that form the PCM. For example, in some cases, the classification system may include color coded voxels representing healthy lung parenchyma, that is normal lung tissue, the color green; color coding voxels representing tissue exhibiting functional small airways disease (fSAD), the color yellow; and color coding voxels representing emphysema, the color red. It will be understood that the color coding scheme could be any suitable color coding scheme and may employ any suitable or desirable colors. Further, in other embodiments, other systems for assigning a classification to individual voxels is possible, for example, instead of using colors, varying shades of gray may be used to denote different classifications; different geometric shapes could be used, for example open circles and closed circles, or any other suitable method for denoting differences between individual voxels on a parametric response map may be used.

In contrast to conventional CT-based quantitative measures, the techniques of the present disclosure may use deformable registration to align images of different phases of the respiratory cycle, specifically at inspiration and expiration. The technique identifies unique signatures of disease extent where local variations in lung function are classified based on a voxel-by-voxel comparison of lung density, as measured in Hounsfield Units (HU), from co-registered scans acquired during inspiratory and expiratory cycles to provide a global measure as well as a local measure of COPD severity. These local variations are determined by taking two or more images acquired at different phases of movement, which could be acquired over time intervals and performing deformable registration on the images, from which clinically meaningful data may be extracted and used in diagnostic and prognostic treatments. In some examples, numerous thresholds are applied to the different phase images, offering a 2, 3, 4 color (or more) set of images and corresponding metrics. The result is a technique by which PCM may be used as a prognostic imaging biomarker of disease, using conventional imaging protocols (CT, MRI, etc.) acquired at varying physiological states of the lung. While the difference in signal values of co-registered voxels is described herein as important and providing information that may be used in the PCM techniques described herein, it is also contemplated that in some embodiments it is not only the difference between signal values of voxels from serial images that may convey information, but the initial value or baseline value that may also convey meaningful information and may be incorporated into embodiments of the present disclosure.

While some examples provided here in disclose the collection of two images (specifically, one image taken at inspiration and one taken at expiration for the purposes of characterizing and assessing lung tissue), it is also contemplated and within the spirit and scope of the present disclosure, that multiple images may be collected and used to generate a PCM. For example, in an embodiment of the present disclosure, PCM may be used to classify and assess the state of cardiac tissue. Accordingly, multiple images, for example from two to fourteen images, or more, may be taken throughout a cardiac cycle and used to create a PCM to assess cardiac tissue.

By way of background, the Hounsfield unit (HU) scale is a linear transformation of the original linear attenuation coefficient measurement into one in which the radiodensity of distilled water at standard pressure and temperature (STP) is defined as zero Hounsfield Units (HU), while the radiodensity of air at STP is defined as −1000 HU. In a voxel with average linear attenuation coefficient $\mu_x$, the corresponding HU value is therefore given by: $HU=1000\times(\mu_x-\mu_{water}/\mu_{water})$, where $\mu_{water}$ is the linear attenuation coefficient of water. Thus, a change of one Hounsfield unit represents a change of 0.1% of the attenuation coefficient of water because the attenuation coefficient of air is nearly zero. The extent of the differences in voxel HU values between inhalation and exhalation relative to user-defined thresholds determines the classification of the individual voxels. Different classes of voxels may be represented on the PRM as different colors, in some embodiments.

The PCM system and techniques described and illustrated herein may be implemented in a special-purpose machine for image data analysis and tissue classification, where, for example, the tissue may be classified for the purposes of diagnosis, pathology diagnosis, response to treatment, or any other suitable purpose. The machine may include at least one processor, a memory having stored thereon instructions that may be executed by that processor, an input device (such as a keyboard and mouse), and a display for depicting image data for the tissue under examination and identified characteristics (pathologies, changes etc.) of that tissue. Further, the machine may include a network interface to allow for wired/wireless communication of data to and from the machine, e.g., between the machine, a separate machine, or a separate storage medium, such as a separate imaging system and/or medical administrating device or system. The engines described herein, as well as blocks and operations described herein, may be executed in hardware, firmware, software, or any combination of hardware, firmware, and/or software. When implemented in software, the software may be stored in any computer readable memory within or accessed by the machine, such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. When implemented in hardware, the hardware may comprise one or more of discrete components, an integrated circuit, an application-specific integrated circuit (ASIC), etc.

As applied to a CT based system, initially serial CT images may be collected at different times. For tissues that have different physiological states at different times or are cyclic, such as tissue that expands and contracts like the lung, liver, heart, skeletal muscle, smooth muscle etc., the CT images may be taken at different physiological states of the tissue, e.g., inhalation and exhalation of the lungs or systole and diastole of the heart. The image data may be collected from an external CT system in communication with a processor-based PCM system, e.g., connected through wired or wireless connections. In other examples, the PCM system is embedded with a medical imaging system, for example a CT system, MRI system, etc. An example computer system for executing the PCM techniques described herein is provided in FIG. 24 discussed further below.

Generally, the PCM system includes an image collector engine that receives and stores the medical images and a deformation registration engine that takes the images and performs a deformable registration of serial CT images. The deformation registration engine provides a set of tissue specific parameters for tailoring the engine to register images of that tissue, where these parameters may represent physical characteristics of the tissue (e.g., general shape, position, expected volume, changes between physiological states, swelling due to edema, in the case of muscle tissue deformation due to contraction or atrophy and or changes in tissue due to tissue strain and elasticity tests to assess distensibility). The image registration can be achieved using nonlinear deformable algorithms in some embodiments to provide for higher degrees of freedom needed to align the images together. In examples where tissue volume or position changes occur between serial medical images, deformation is performed as part of the registration, which includes scaling of at least one image data or portions thereof. Registration in an example implementation of PCM to lung tissue and using a CT medical imaging device is described below.

After registration, a voxel analysis engine examines the combined, registered image data from the registration engine, to perform a classification on the image data. The analysis engine, for example, determines signal change across medical images on a voxel-by-voxel basis for the image data. The size of the region-of-interest (ROI) may be determined manually, e.g., by contouring over the analyzed tissue, or may be generated automatically by the medical imaging system, or in other embodiments may be determined by a combination of manual and automatic techniques. In addition to determining signal changes within each voxel, the analysis engine can also identify the relative volumes of the signal changes and the location of the changed and the unchanged voxels. While conventional ways of measuring registered data sets can be used, e.g., the mean of the Jacobian or dissimilarity measures based on the histograms of the CT images where information from the measure is pooled throughout the lung into a single outcome measure, the measurements forfeit spatial information. Each individual voxel is a volume in 3D space that corresponds to a location in the tissue. Therefore, in some embodiments, the analysis engine retains the spatial information by classifying voxels into discrete groups that can be analyzed as a global metric but also allows for the ability to identify local phenomena of the individual PCM metrics by generating overlays of the PCM metrics on the original anatomical image.

In analyzing the image data to identify signal changes, the analysis engine applies one or more thresholds, or cutoffs, to segment the data by tissue characteristics, in addition to retaining the spatial information. In some examples, the threshold incorporates into the analysis engine low attenuation area (LAA) on the inspiratory CT scan, which is used as a measure of emphysema, and gas trapping (GT) on the expiratory CT scan. Yet, any number of cutoffs can be used to analyze and highlight different tissue effects (pathologies and/or physical states, for example). The thresholds may also be diagonal indicating mechanically functional tissue from static tissue. The use of these thresholds is particularly distinct in that they are accompanied by the spatial details that are also provided with the PCM system.

Figure 2:
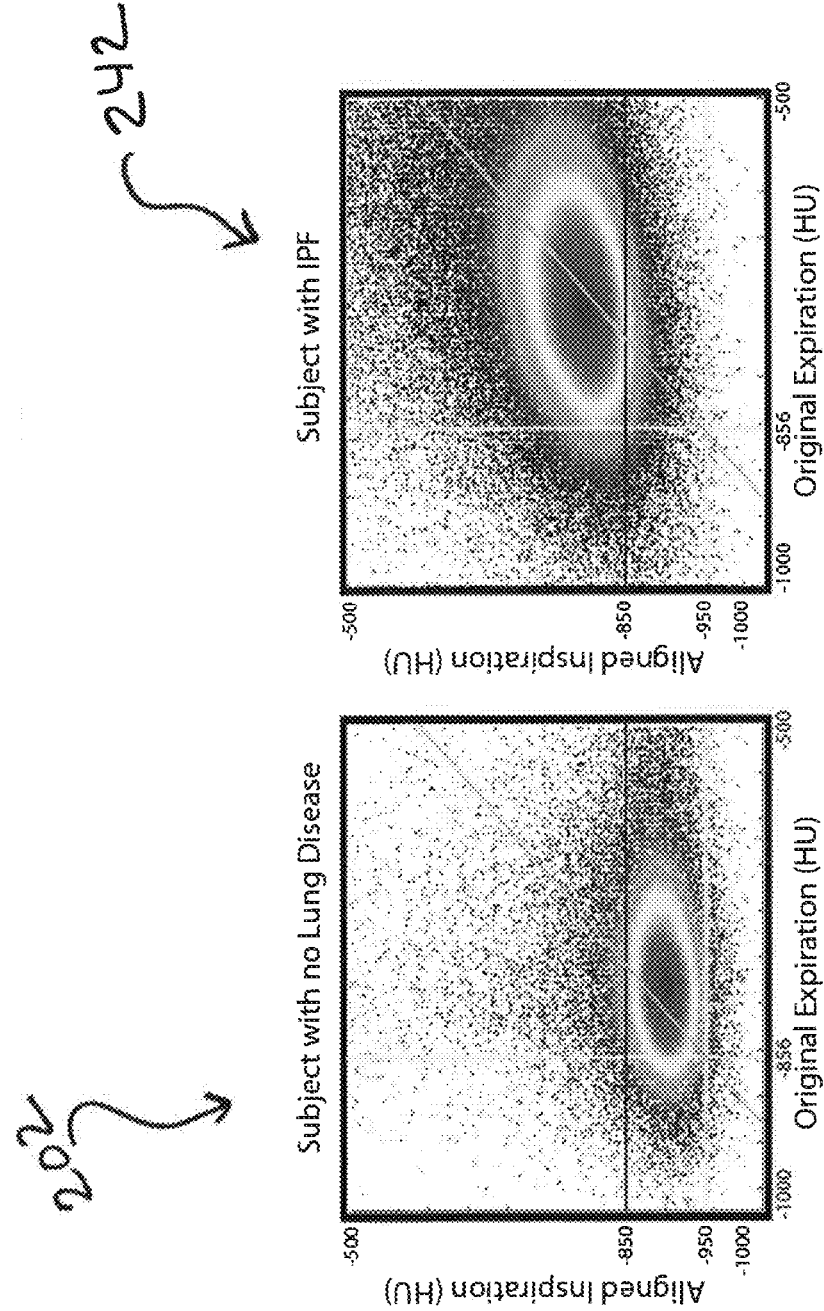
FIG. 2 illustrates a PCM scatter plot of a subject with no lung disease and a PCM scatter plot of a subject with IPF, in accordance with embodiments of the present disclosure.

In some embodiments, thresholds may be used to identify regions of lung parenchyma that increase in attenuation. An example is Idiopathic Pulmonary Fibrosis (IPF). In this case, the lung parenchyma hardens due to the presence of fibrotic tissue, which hinders breathing. A threshold can be incorporated into PCM to identify the extent of fibrotic tissue in patients with IPF. FIG. 2 shows a PCM for a subject with no lung disease 202 and a PCM for a subject with IPF 242, where original expiration is plotted on the X-axis, and aligned inspiration is plotted on the y-axis. As may be seen in the subject with no lung disease 202, the majority of the voxels are distributed between −850 HU and −950 HU on inspiration, indicating healthy tissue. In contrast, as may be seen in the PCM of the subject with IPF, the majority of the voxels are distributed above −850 HU on inspiration, indicating unhealthy fibrotic tissue. This approach can be extended to other Interstitial Lung Diseases (ILD) for diagnosis, assessment of severity and determination of disease phenotype.

In some embodiments, the voxel analysis engine is configured to perform tissue analysis on only a portion of the registered image data, for example, a particular tissue region or tissue sub-type. In such examples, the analysis engine may perform image isolation to filter out image data not corresponding to the tissue region or sub-type of interest. In examining lung tissue image data, for example, the analysis engine may initially segment out lung lobes from the registered image data to allow for threshold analysis of COPD, or small lung airways image data, to allow for threshold analysis of the bronchial system or lung vasculature.

PCM is a fundamentally distinct approach from conventional CT-based quantitative measures. As previously explained, this methodology relies on a voxel-by-voxel comparison of lung density maps through image co-registration of inhalation and exhalation images in an effort to provide a global measure as well as local severity of different lung conditions or diseases, for example, COPD. The lung parenchyma environment captured by high resolution computed tomography (HRCT) may have three local density/signal outcomes during the physiological change from exhalation to inhalation. An increase in Hounsfield Units (HU) from expiration to inspiration above a specified threshold suggests a substantial increase in the lung density from expiration to inhalation, in which case these voxels would be color-coded red, for example. Alternatively, a major reduction in lung density may occur, in which case voxels within those regions would be coded blue, for example. Voxels in regions relatively unchanged between physiologic states would be coded green, for example. The PCM analysis retains the spatial HU information as coded by a color overlay on anatomic HRCT images and also quantification of the volume fraction of lung parenchyma that showed an increase (red), decrease (blue) or unchanged (green) HU value by scatter plot analysis. This quantification of spatially altered HU values allows for the use of the PCM approach of the present disclosure to be used as a prognostic imaging biomarker for assessing the global and local severity of COPD, for example, using conventional CT scans acquired at varying physiological states of the lung. Again, as previously stated, other applications of the techniques of the present disclosure, used other than for assessment of COPD are also contemplated, including applications for the assessment of other lung conditions or diseases, or for the assessment of other conditions or diseases of other organs or areas of the body.

As has been explained, in some embodiments, PCM can be applied and analyzed over multiple imaging modalities acquired at multiple phases or multiple time points. For example, in some cases PCM can be applied separately on two modalities that are sensitive to different physiological properties of the tissue of interest. The individual PCM analyses on each modality can be combined into a single predictive metric. Another embodiment includes applying PCM on a voxel-basis over multiple modalities, phases, and time points utilizing pre-determined thresholds to generate metrics that may be in the form of a relative volume within the tissue of interest. Still yet another embodiment may combine non-PCM based metrics, examples include but are not limited to metrics from spirometry, exacerbation, quality of life and exercise capacity, with PCM-based metrics into a single model-based outcome measure of clinical relevance. Examples of model generation include, but are not limited to, statistical, neural network, genetic programming, principal component analysis and independent component analysis based models for providing measures of clinical relevance.

As has been explained, embodiments of the present disclosure include registering images during the image processing step, as shown in FIG. 1. In some embodiments, CT scans of the lungs may be registered, where separate scans may be taken at inspiration and expiration, at different phases, which may also be acquired at different time intervals (seconds, minutes, hours, days, weeks, months, years), for example. Some of the issues that need to be overcome to register lung data may be the large size of the datasets as well as the large deformations and slipping relative to the chest wall of the lungs during respiration. The registration process of the present disclosure advantageously addresses these constraints, by providing systems and methods for completing a registration in a reasonable amount of time to allow for rapid processing of significant numbers of data sets, as disclosed herein.

Figure 3:
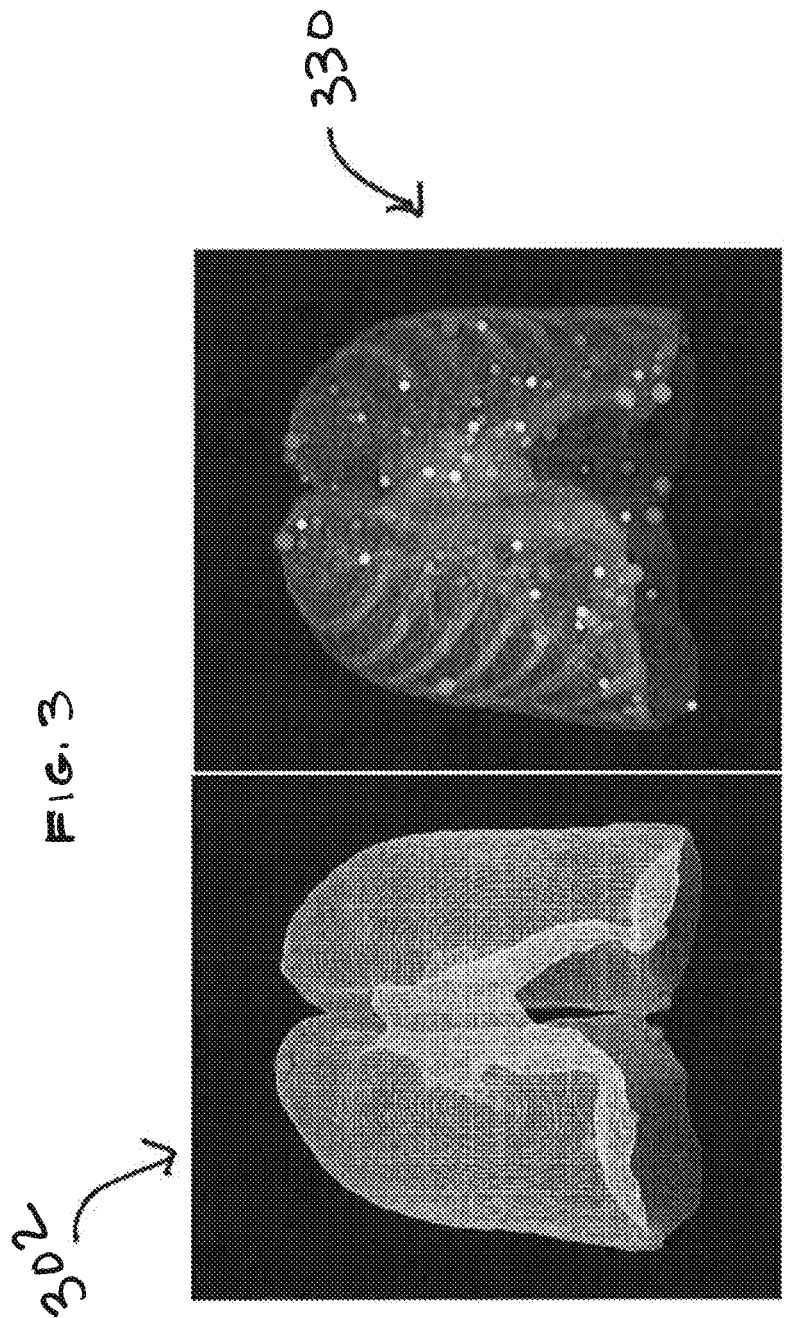
FIG. 3 illustrates an example of user selected and added automated feature points for image registration, in accordance with embodiments of the present disclosure.

The registration process of the present disclosure in some embodiments uses segmentation of each lung, and lung registration. The segmentation may be entirely automated in some embodiments, while in other embodiments segmentation may proceed via user-identification of pre-defined features in each lung, i.e. a manual process, while in still other embodiments, segmentation may be a combination of automatic and manual processes. Lung registration may be entirely automated, or may proceed through a combination of automated and manual techniques. The lungs may first be segmented on the inspiration scan using threshold-based region growing. Registration occurs only within a dilated version of this segmentation, so that the lungs can move freely relative to surrounding structures, particularly the ribs, which would otherwise cause inaccurate registration. The registration transformation may use a thin-plate spline deformation which is elastic and yet constrained and yields deformations which model typical lung parenchyma expansion and contraction. A mutual information cost function may be used to drive an optimization over a pre-defined lung feature set. Mutual information works well in this procedure because even though the image pair consists of the same image modality (i.e., CT) in some embodiments, the differences in scans due to changing lung state would require correcting for HU differences from lung function and blood flow. One embodiment of the procedure uses a predefined feature set for lung registration consisting of seven points selected by the user in each lung and an additional automatically placed 48 features, totaling 165 degrees of freedom per lung. Registration proceeds from using four levels of detail, adding transform degrees of freedom and image resolution at each level. FIG. 3 illustrates an example of user selected 302 and added 330 automated feature points. It will be appreciated that while a specific embodiment is being described as including seven points selected by a user and 48 features automatically placed, any other suitable or desired number of automatic and/or manually selected points may be used in embodiments of the present disclosure, including embodiments that only include manually selected points, and embodiments that only include automatically selected points. Further, in some examples, the processing of image data, including either or both of registration and analysis, may be performed automatically by the system.

Figure 4:
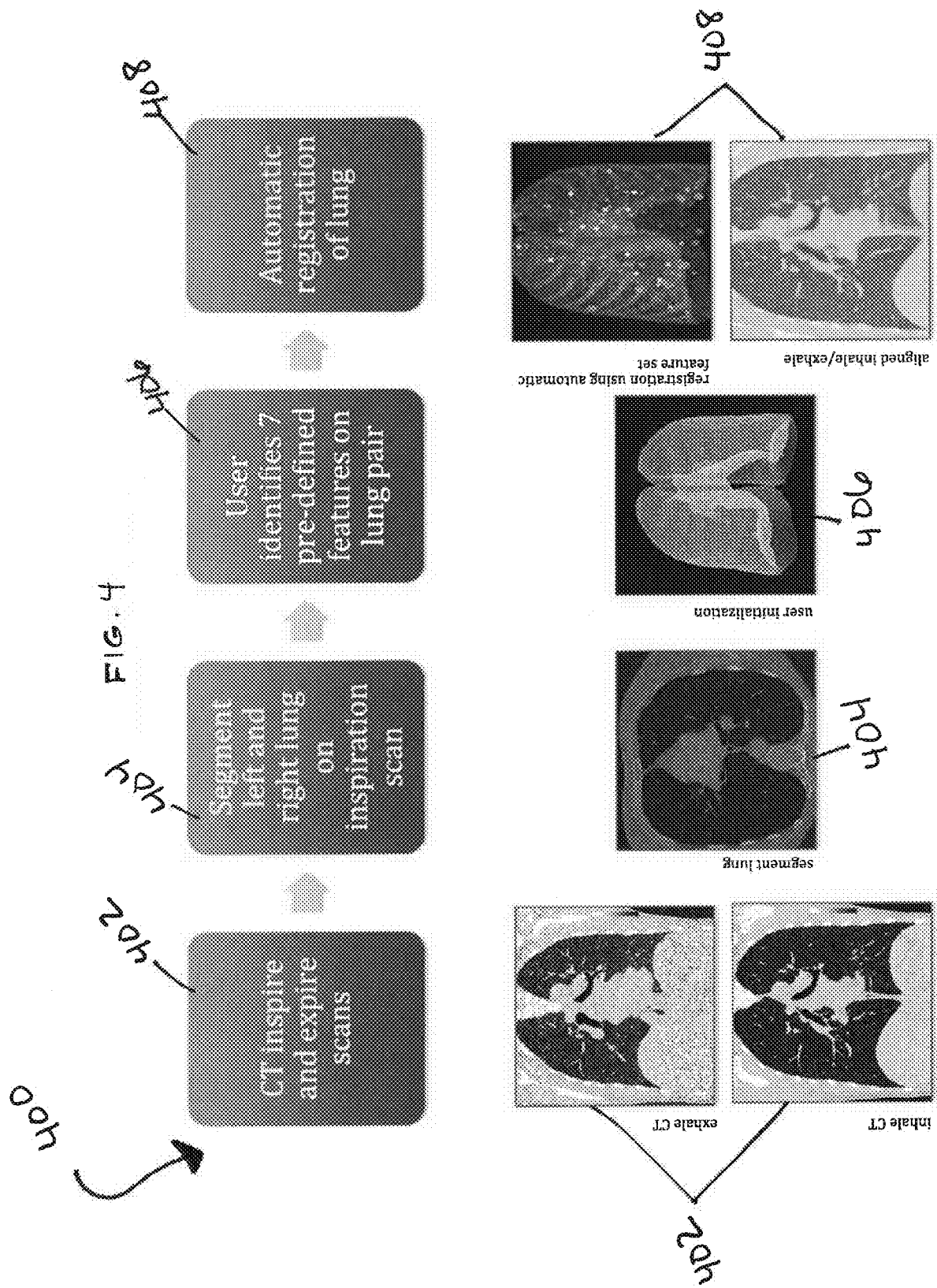
FIG. 4 illustrates an example process for image registration of CT scans acquired over different phase states (inspiration and expiration), in accordance with embodiments of the present disclosure.

FIG. 4 illustrates an example process for registration 400 in which CT scans over different phase states (inspiration and expiration) are taken 402, then the left and right lung of the inspiration scan are segmented 404, after which a user defines a pre-defined set of features on the lung 406, and automatic registration of the remainder of the lung is performed 408.

Additional registration transformation algorithms and optimizers may also be used to perform the registration procedures and are within the spirit and scope of the present disclosure. Due to the potential of registering multi-phasic image data (i.e. images can be acquired over the respiratory cycle for the lung or cardiac images from different phases of the heart cycle), voxel-by-voxel changes in signal values can be followed over the entire organ or a subset of the organ to provide for spatial determination of functional assessment using voxel signal changes. Color overlays representing signal changes within individual voxels or regions of voxels can be generated at different phases and displayed in 2D, 3D, 4D, etc. Outputs can also be made into movies for easy viewing by the end user.

The diagnosis of COPD is traditionally confirmed by spirometry, a test that measures the forced expiratory volume in one second ($FEV_1$), which is the greatest volume of air that can be breathed out in the first second of a large breath. Spirometry also measures the forced vital capacity (FVC), which is the greatest volume of air that can be breathed out in a whole large breath. Normally, at least 70% of the FVC comes out in the first second (i.e. the $FEV_1$/FVC ratio is >70%). A ratio less than normal defines the patient as having COPD. The prognostic capabilities at staging COPD severity based on forced exhalation volume at one second ($FEV_1$) for the PCM methods of the present disclosure compare quite favorably against lung relative volume of emphysema (LAA), which is currently the most widely used CT-based technique. The PCM techniques of the present disclosure are effective for assessing local severity of COPD in the lobes of the lung, as well as the tissues that comprise the small airways of the lung. The present techniques are capable of identifying a unique patient signature specific to the extent of COPD. Inclusion of additional thresholds segments the signature pattern into discrete classifications that allow for the identification of the two major components of COPD, small airways disease and emphysema, as well as healthy lung. Currently no other CT or spirometer metric exists to identify both COPD components.

The PCM technique of the present disclosure was applied to inspiratory and expiratory medical images (e.g., CT images) to assess COPD severity. The technique was found to be highly correlative to the conventional spirometry determination, $FEV_1$, and more importantly was capable of identifying spatially the presence of small airways disease and emphysema, which at present is unattainable by any other CT and spirometer measure. This relative volume change was correlated to varying states of lung tissue, including allowing identification of healthy lung tissue, which is quite unique in that the functional lung instead of diseased lung provides the strongest correlation to the pulmonary function metric $FEV_1$. The techniques resulted in improved correlation to pulmonary function of PCM metrics, by incorporating a threshold, for example the emphysema cutoff (<−950 HU on inspiratory CT), into the PCM model. The proposed techniques described herein demonstrate, for the first time, that a pre-described metric can be incorporated into another image post-processing approach to generate a unified methodology that is more correlative to $FEV_1$ than the original components of the model. This highlights the flexibility of the PCM technique in that previously validated CT-based metrics can be utilized to refine the metrics derived from PCM analysis of CT images.

Figure 5:
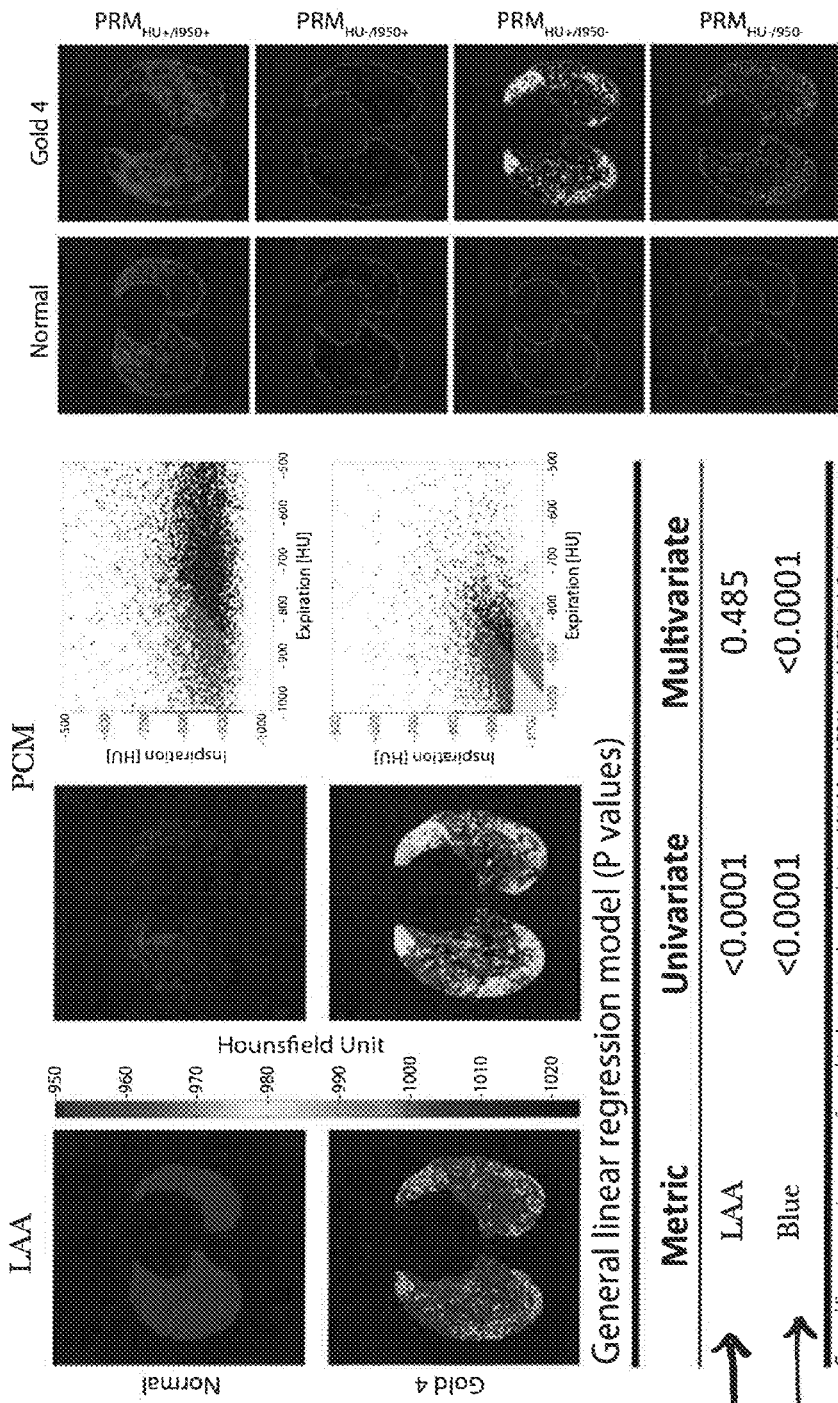
FIG. 5 illustrates a unified (or modified) PCM technique, in accordance with another example and illustrating representative images and analysis of the unified PCM technique at the optimal threshold (40 HU) and LAA cutoff (−950).

In some embodiments, a pre-defined metric is identified for use with PCM that represents a healthy or functioning lung, and correlates significantly to $FEV_1$. In fact, in a multivariate general linear regression model both PCM (blue) 504, which represents mechanically functional lung and lung relative volume of emphysema (LAA) 520, as shown in FIG. 5, contributed significantly to modeling $FEV_1$, meaning that the PCM techniques of the present disclosure provide additional information about the state of COPD beyond emphysema, allowing for the identification of image information on small airways disease or other abnormalities. This is the case, at least in part, because the inclusion of the emphysema cutoff (<−950 HU), which separates the emphysematous tissue from the remaining non-emphysematous lung, improves the sensitivity of metrics derived from the PCM method in correlating with $FEV_1$. The embodiment of this example, described as PCM(blue) generally, incorporates the following voxel color-coding scheme: blue voxels=mechanically functioning lung; green voxels=diseased lung but not so diseased as to be emphysema; and yellow voxels=emphysematous tissue. As previously explained, other color-coding schemes are possible, and in fact other color coding schemes are described herein with respect to other embodiments. The contribution of the emphysema cutoff into PCM improves the correlation of PCM(blue) with $FEV_1$ such that in a multi-variate general linear model of $FEV_1$ when the PCM(blue) technique of the present disclosure was evaluated, LAA was found to have no significant contribution to the statistical model of $FEV_1$. This result is reasonable as when a patient undergoes spirometry, they are forcing air out of their lungs and it is the mechanically functional lung, represented by PCM(blue) that is active, not the diseased portion of the lung.

In some embodiments, however, the present techniques may be used in conjunction with thresholds that define other CT-based metrics, such as LAA with −950 HU on the inspiratory scan. In fact, combining PCM as described above with −950 HU, which is used to define LAA, the modified four-color PCM model with the inclusion of the −950 HU threshold has a stronger correlation with airway obstruction measures over the previous two-color PCM model without the −950 HU threshold. Other embodiments of PCM include thresholds used to define other CT-based measures, such as gas trapping, small airways disease and interstitial lung abnormalities. It is also to be understood that the embodiments are not limited to a specific cut-off value, but that any suitable and meaningful threshold value may be used in embodiments of the present disclosure.

The remaining metrics in the PCM techniques of the present disclosure provide information on the functional and diseased state of the lungs. The analysis of image data is able to identify different tissue states. Those voxels found to have emphysema and are non-changing (generally illustrated as yellow voxels, in some embodiments) are observed to correspond to the most advanced form of COPD with extensive emphysema. This metric has a strong correlation with LAA, but is only made up of about half of the relative volume that is designated emphysema by LAA. The remaining fraction of tissue still retains its functionality, i.e., changes density upon exhalation. This tissue region (generally illustrated as green voxels, in some embodiments) is identified as diseased lung tissue that has yet to progress to a more advanced diseased state using techniques of the present disclosure.

Figure 6:
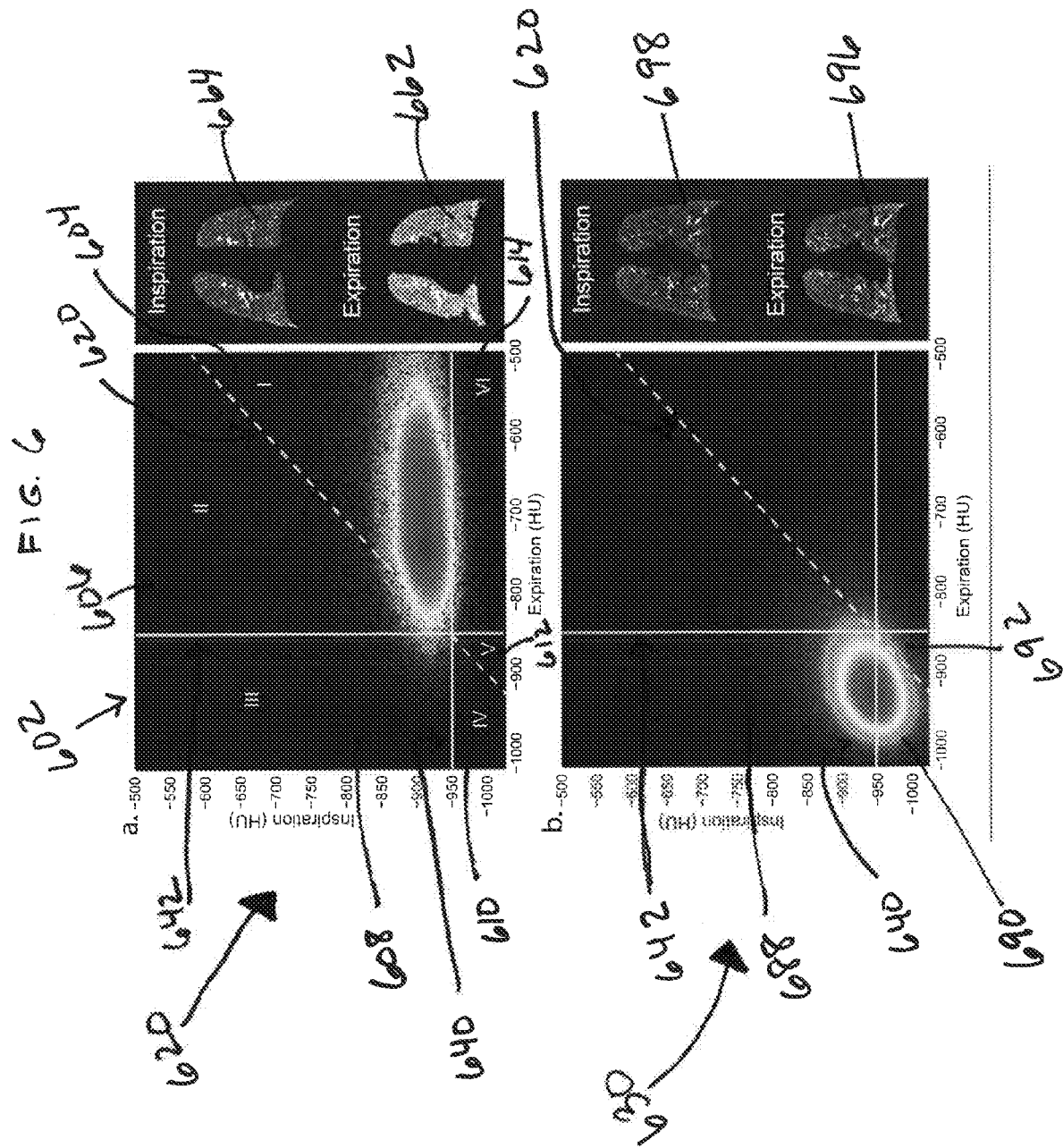
FIG. 6 illustrates a classification scheme of the physiological lung states of COPD patients, in accordance with embodiments of the present disclosure, as well as a plot of the distribution of voxels with varying values at inspiration and expiration for a patient with Normal status and a patient with GOLD 4 status, in accordance with embodiments of the present disclosure.

In some embodiments, PCM techniques of the present disclosure identify lung disease severity based on a unique signature pattern that varies with different disease states of lung tissue. This current technique, as a novel voxel-based image post-processing technique, when applied to inspiratory and expiratory CT images serves as a quantitative imaging biomarker to assess COPD phenotype and severity. Originating from six classifications generated from three thresholds, PCM can be simplified into three discrete zones that identify registered voxels as healthy lung parenchyma (both dynamic and static lung tissue), functional small airways disease (fSAD) and emphysema. For example, FIG. 6 shows a PCM 602 showing the six classification areas, denoted as areas I 604, II 606, III 608, IV 610, V 612, and VI 614. As may be seen, the three thresholds include −950 HU inspiration, plotted on the y-axis, where −950 HU or less denotes emphysema; −850 HU expiration, plotted on the x-axis, where −850 or less denotes gas trapping; and the line of unity 620, which plots the change in lung density from expiration to inspiration, all of which together provide the boundaries for the six classification areas 604, 606, 608, 610, 612, 614. Normal or non-diseased lung tissue may be represented by classification areas I 604 and II 606; diseased but non-emphysematous tissue may be represented by classification area III 608 (this may be tissue that is characterized by functional small airways disease); and emphysematous tissue may be represented by classification areas IV 610 and V 612. Note that only PCM techniques of the present disclosure can be used as a versatile imaging biomarker to diagnose disease extent and phenotype, but it also can provide detailed spatial information related to disease distribution and precise location. Moreover, PCM could potentially be used to reveal the nature of COPD progression as it pertains to small airways disease and emphysema.

In some embodiments, PCM derived metrics of the present disclosure can be used to assess the extent of functional small airways disease (fSAD). Reported techniques measure the extent of airway obstruction by measuring the mid-section cross-sectional airway on inspiratory CT scans. For these metrics various measurements are made on the airways up to the segmental, subsegmental and sub-subsegmental bronchioles. The metrics derived from these measurements have been shown to correlate with spirometry as well as providing additional information beyond LAA. Although promising, these metrics do have limitations. As a result of CT image resolution, measurements are limited to airway wall thickness >2 mm. This has prompted other investigators to point out that these are not "small airways", which are typically at the 9th to 12th segmental levels. In addition, airway measurements are performed across both lungs providing a global measure of airway obstruction. No spatial information is retained making it all but impossible to identify extent of disease locally or if these measurements were acquired in emphysematous tissue.

In contrast, the PCM techniques of the present disclosure do not suffer from these limitations. This is made possible not by directly measuring airway obstruction, but by monitoring the effect that fSAD has on the surrounding parenchyma. By utilizing image registration and the classification scheme disclosed herein, the PCM technique provides the needed sensitivity to accurately quantify the changes in tissue attenuation that are a direct result of the underlying distinct COPD phenotypes. Metrics of emphysema and fSAD generated from PCM were found to have a significant correlation to airway obstruction measures even in the presence of other CT-based airway measurements, which may generally be seen in Table 5 provided and discussed further below. This shows the strength of the approach of the present disclosure at identifying fSAD over other investigated airway obstruction metrics.

In some examples, the present technique provides a unified method for assessing emphysema and fSAD. In fact, combining multiple thresholds improves the sensitivity of the technique at identifying COPD components. PCM may require optimized threshold unique to the imaging modality, disease and tissue for accurately characterizing the underlying tissue pathophysiology phenotypes.

Figure 7:
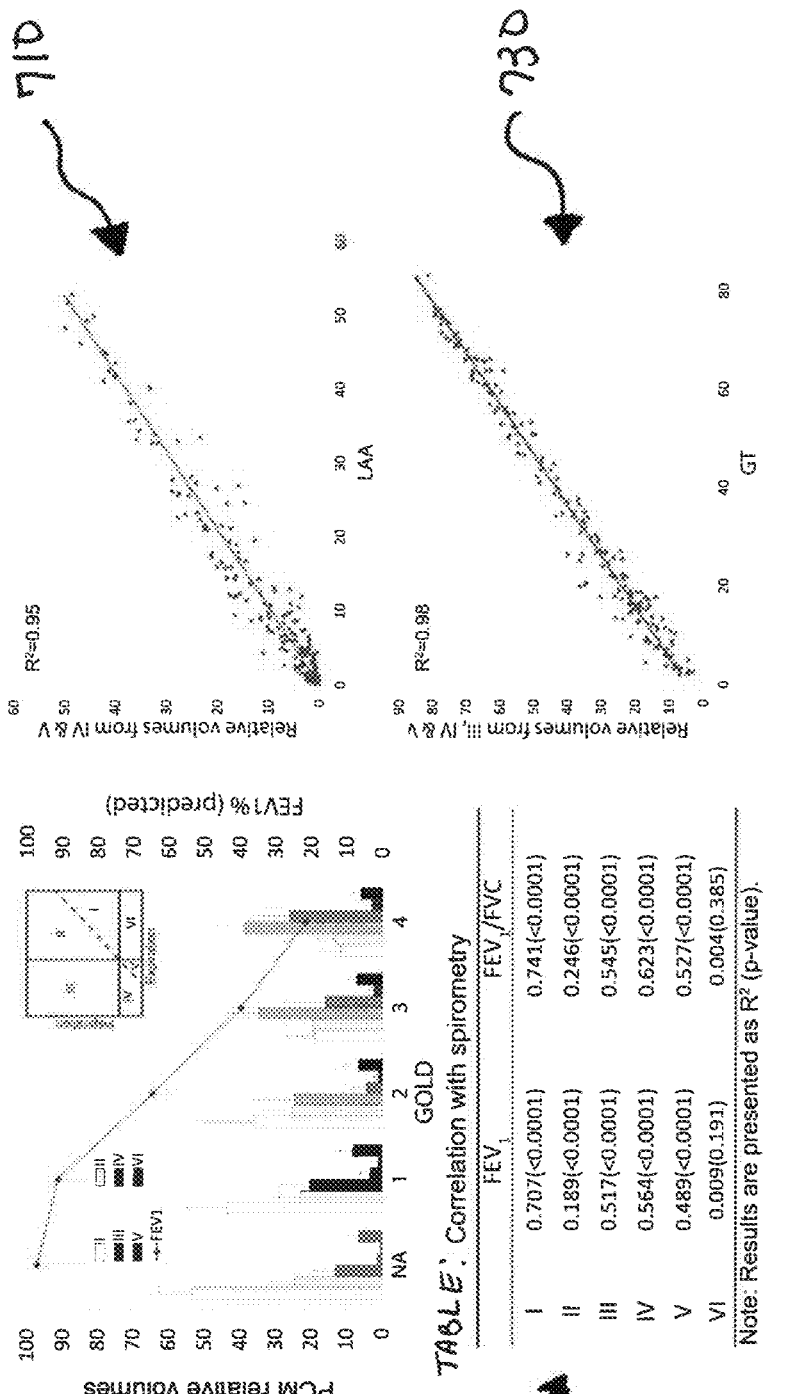
FIG. 7 illustrates a bar graph that shows the response of PCM signature to GOLD status, scatter plots, and a table correlating the techniques of the present embodiment according to one embodiment to spirometry, in accordance with embodiments of the present disclosure.
Figure 8:
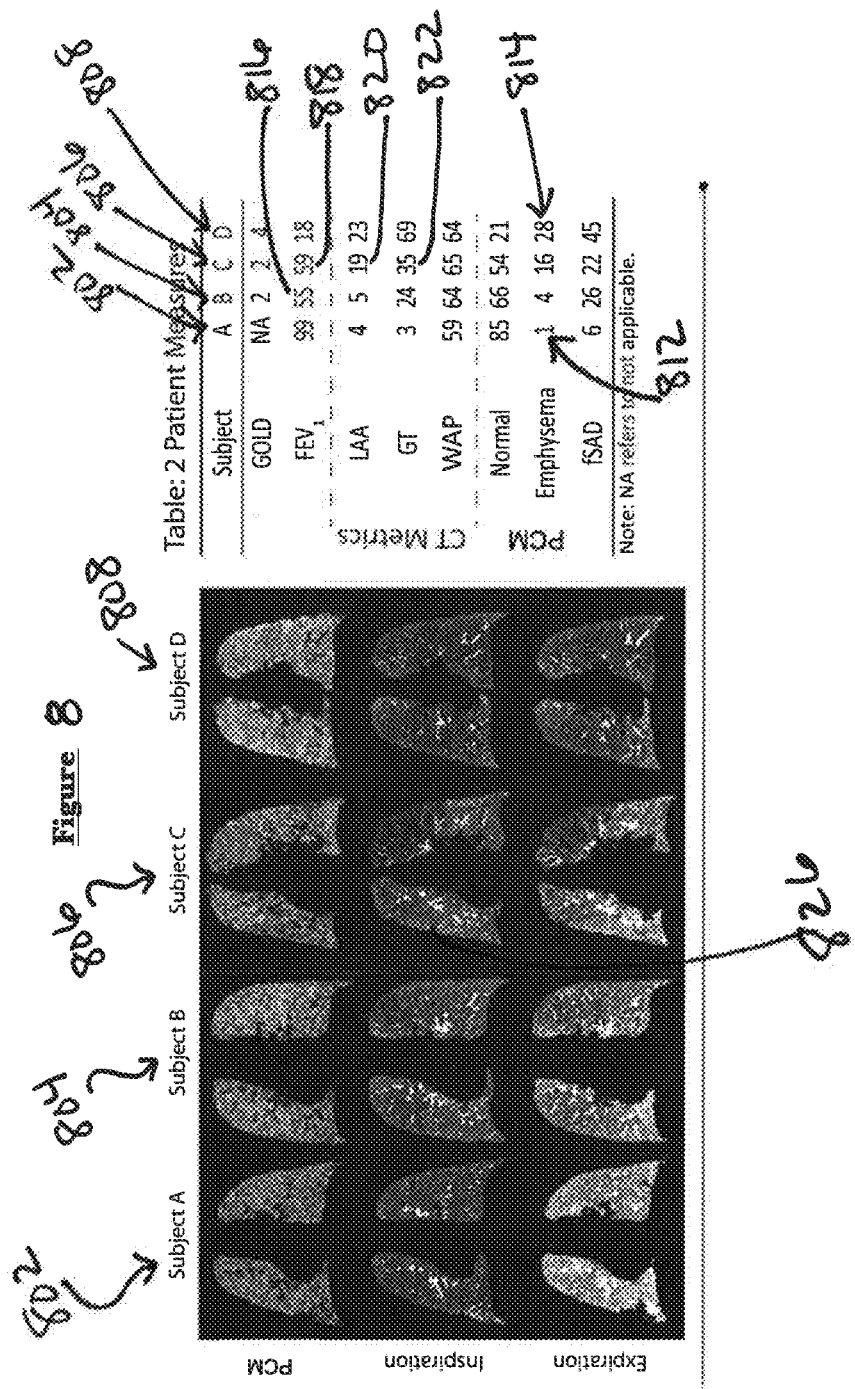
FIG. 8 provides images and data indicating the COPD phenotypes Identified by the PCM techniques, in accordance with embodiments of the present disclosure.

The strength of PCM as disclosed herein to identify patients with varying phenotypes of COPD is demonstrated in representative sagittal PCM images with corresponding inspiratory and expiratory CT scans from four patients with varying GOLD status, as defined by Global Initiative for Chronic Obstructive Lung Disease (GOLD; www.goldcopd.com). As explained above, different color-coding schemes may be employed in different embodiments. In the present embodiments (and in contrast to the embodiment previously described), voxels representing normal healthy lung residing in classifications I and II are coded green. Voxels representing fSAD tissue residing in classification III are coded yellow. Voxels representing emphysematous tissue residing in classifications IV and V are coded red. Remaining voxels residing in classification VI were not color coded and were omitted from further analysis. The Correlation with Spirometry Table 720 provided in FIG. 7 shows a comparison of PCM values to spirometry. Comparison of PCM metrics to non-PCM CT metrics is provided in the table 720 showing strong agreement between the two different measures. To illustrate the conundrum facing clinicians when diagnosing patients with COPD we have presented four patients with varying GOLD status in FIG. 8. In the extreme cases, $FEV_1$ and LAA accurately assess the severity of COPD in these patients, with Subject A 802 and D 808 consisting of low 812 and high 814 levels, respectively, of emphysema. Where PCM is most useful is in the identification of the underlying COPD phenotypes and the location of the specific disease classifications. Subjects B 804 and C 806 were found to have near identical $FEV_1$ measurements 816, 818, yet LAA 820 and GT 822 values were elevated in the Subject C 806 compared to Subject B 804. Current techniques for assessing COPD severity are unable to accurately diagnosis Subject B 804, leaving clinicians to presume based on $FEV_1$ and LAA that COPD for this patient 804 is due primarily to airways obstruction from fSAD. The PCM measurements of the present disclosure, however, revealed that 26% of the lung tissue of Subject B 804 consisted of fSAD tissue localized primarily in the upper lobes of both lungs with minimal signs of emphysema. In Subject C 806, emphysema has progressed throughout the upper left lung, identified by LAA on the inspiratory CT scan 826. Current clinical diagnostic methods such as LAA would have missed detection of fSAD expanding in the right upper lobe which was easily identified, quantified and spatially displayed using the PCM approach described herein.

EXAMPLES

Example applications of the PCM technique described herein for COPD and other lung tissue analysis are discussed below by way of example, not limitation. It will be understood that any reference to the use of specific products, including software, equipment, etc. throughout the description in the Examples is merely provided to accurately and fully describe how the study was conducted. However, such references are not in any way meant to limit embodiments of the present disclosure. Where a particular product is described as being used, it will be understood that any other suitable product may also be used with embodiments of the present disclosure.

Example 1

Lung Tissue and COPD Analysis Example

The study described in this example included subjects with a smoking history of at least 10 pack-years that were enrolled at the University of Michigan as part of the COPD-Gene Study. The subjects had no history of any active lung disease other than asthma, emphysema or COPD. Of these subjects, a total of 52 were analyzed for this retrospective study of subjects recruited at a single site, the University of Michigan. Patients underwent spirometry using the EasyOne™ spirometry system (ndd Inc. of Zurich, Switzerland) before and after the administration of short-acting bronchodilating medication (albuterol). Quality control was performed for all spirometry tests using both an automated system and manual review. Patient characteristics are summarized below in Table 1.

TABLE 1

Patient characteristics and results of pulmonary function tests in 52 patients

| Characteristic | Mean +/− SD | Median | Range |
| --- | --- | --- | --- |
| Age | 62.8 (8.6) | 63.7 | 46-80 |
| Pack-years | 52 (28.2) | 45.5 | 11-156 |
| BMI | 27.1 (5) | 26.0 | 18.6-39.8 |
| FEV1 (% predicted) | 63.1 (32.9) | 70.0 | 10-122 |
| FVC (% predicted) | 85.5 (22.8) | 88.0 | 33-127 |
| FEV1/FVC | 0.5 (0.2) | 0.6 | 0.19-0.86 |
| BODE | 2.1 (2.5) | 1.0 | 0-9 |

*Note:
BMI = body mass index (kg/m$^2$),
$FEV_1$ = forced expiratory volume in 1 second,
FVC = forced vital capacity, and
BODE = body mass index, airflow obstruction, dyspnea, and exercise capacity index.

High resolution computed tomography (HRCT) Image Acquisition and Analysis: Whole-lung volumetric multi-detector CT acquisition was performed on the lungs during full inspiration using a standardized protocol. A lower resolution smooth reconstruction algorithm was used for quantitative analysis. Quantitative analysis of emphysema severity was performed on segmented lung images using 3D modeling software, specifically, Slicer (www.Slicer.org). The total percent emphysema was defined as including all lung voxels with a CT attenuation value of less than −950 HU. The percentage of emphysematous lung was defined as the volume of lung with an HRCT attenuation value of less than −950 Hounsfield units (HU) divided by the total lung volume at full inflation, multiplied by 100. The threshold of −950 HU was validated as emphysema by histology (see, e.g., Gevenois et al., "Comparison of Computed Density and Macroscopic Morphometry in Pulmonary Emphysema," *American Journal of Respiratory and Critical Care Medicine,* 152, 653-657 (1995), and Gevenois et al., "Comparison of Computed Density and Microscopic Morphometry in Pulmonary Emphysema," *American Journal of Respiratory and Critical Care Medicine,* 154, 187-192 (1996)). The present techniques, however, are not limited to this threshold, but rather may be applied using any threshold backed by histopathology.

Phasic Classification Mapping: Subsequent to segmentation, the exhalation CT image was spatially aligned to the inhalation CT image. The alignment of the two data sets was performed using mutual information as an objective function. A deformable registration algorithm using approximately 300 control points of which 10 were manually selected was employed to account for repositioning and deformation of the lung during inhalation and exhalation.

The PCM of quantitative CT as expressed in Hounsfield units was determined by first calculating the difference between the Hounsfield Units (AHU=exhalation HU−inhalation HU) for each voxel within the lungs during inhalation and exhalation. Voxels yielding ΔHU greater than a predetermined threshold (as described below), were designated red (i.e. ΔHU>threshold). Blue voxels represent volumes whose HU decreased by more than the threshold (i.e. ΔHU<−threshold) and green voxels represent regions where the lung density remains unchanged (i.e. absolute value of ΔHU−≤threshold). The outcome measures were the volume fractions within the lung determined from PCM, which for the purposes of this example (and in contrast to the color-coding schemes provided in previous examples): increasing HU (red voxels), decreasing HU (blue voxels), and unchanged HU (green voxels). Optimization of the PCM technique was performed by correlating, using the Pearson's correlation, PCM metrics at equidistant thresholds from unity ranging from 0 to 300 in increments of 10 HU to $FEV_1$. The optimal threshold was identified as the threshold that produced the strongest correlation (i.e. smallest p-value) between a PCM metric and $FEV_1$.

The PCM technique was correlated to LAA, which has known prognostic value, to $FEV_1$ by a univariate and multivariate general linear regression model. PCM metrics were also correlated to LAA and WAP using a Pearson's correlation. Statistical computations were made with a statistical software package, and we declared results statistically significant at the two-sided 5% comparison-wise significance level (p-value <0.05).

Figure 9:
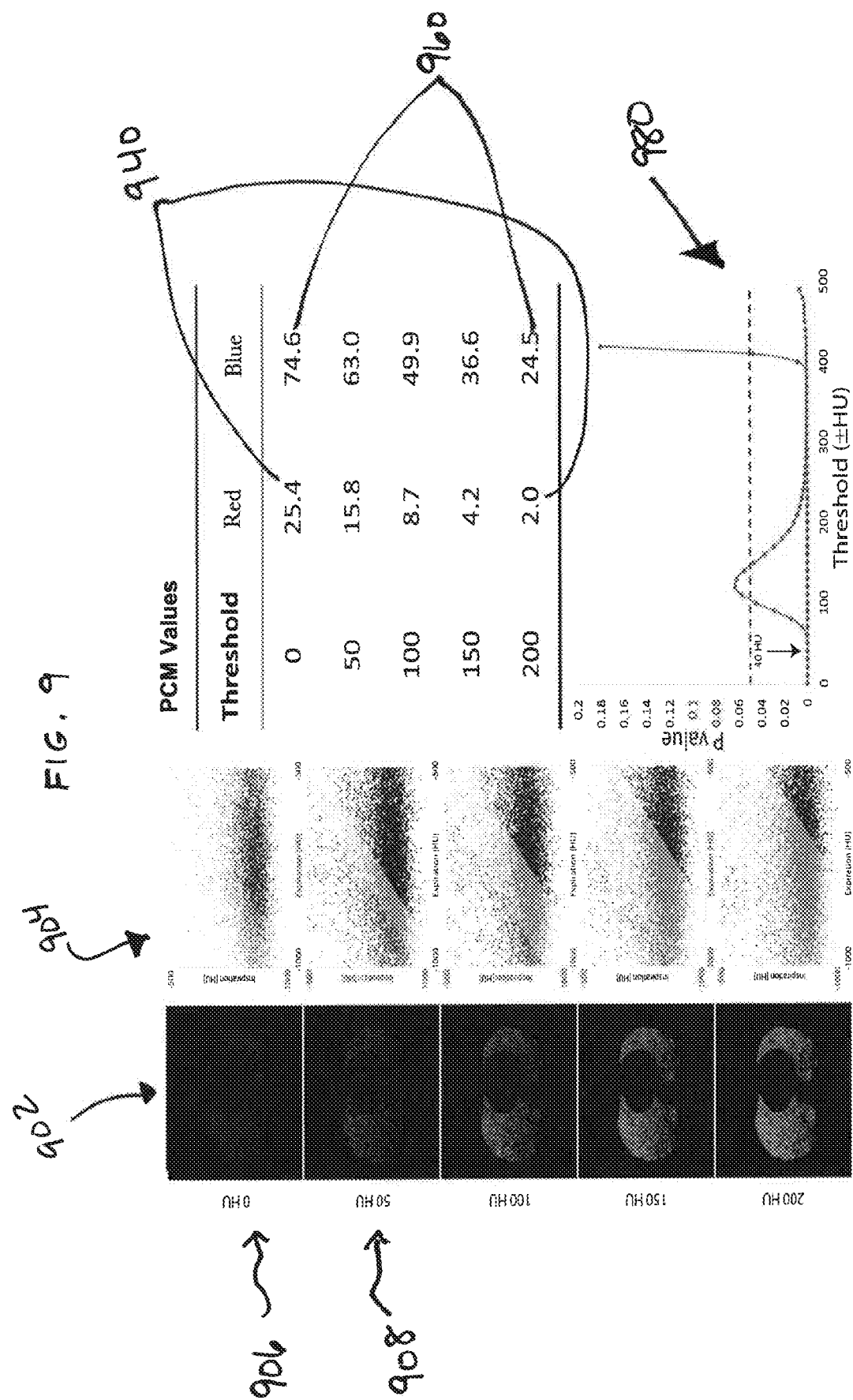
FIG. 9 generally illustrates the PCM technique of FIG. 1 analyzing different threshold points to determine an optimized region of image data analysis, including images, scatter plots, a thresholds table and a thresholds graph, in accordance with embodiments of the present disclosure.

Optimization of the PCM Technique by Applying Thresholds: In this example, the PCM technique classified image voxels into three distinct groups based on the difference in voxel HU values between inhalation and exhalation. The extent of these differences relative to user-defined thresholds determined the classification of the individual voxels. To objectively determine the thresholds, individual PCM metrics (i.e. PCM(red) and PCM(blue); PCM(green)=100−[PCM(red)+PCM(blue)]) were calculated at incremental threshold values ranging from 0 to 500 HU in increments of 10 HU for each patient. These PCM values were then correlated to $FEV_1$ using a Pearson's correlation. The threshold used in PCM was determined based on the strongest fit (i.e., lowest p-value) of any one PCM metric to $FEV_1$, Depicted in FIG. 9 are PCM color-overlays 902 of a representative slice with corresponding scatter plots of voxel distribution 904 generated using various thresholds for a normal subject as determined by GOLD ($FEV_1/FVC \geq 70\%$). The threshold is increased equidistantly about the line of unity as shown in the scatter plots. At a threshold of 0 HU 906, only two classifications exist: PCM(red) and PCM (blue). Increasing the threshold by 50 HU 908 introduces a region within the lung defined as having minor to negligible changes in lung density (PCM(green)). We found that the fraction of lung designated as PCM(red) dropped by more than 10 fold 940 from threshold 0 HU to 200 HU. In contrast, PCM(blue) decreased by a factor of 3 960 over the same range of HU thresholds and was found to make up a quarter of the lung parenchyma at a threshold of 200 HU. A Pearson's correlation using all subject data of PCM metrics to $FEV_1$ demonstrates the sensitivity of both PCM metrics to threshold value 980. PCM(red) produced weak correlations to $FEV_1$, p values >0.01, for thresholds ranging from 80 to 200 HU. In contrast, PCM(blue) produced significant fits to $FEV_1$ with p<0.01 over 80% of the threshold range evaluated with the majority of fits resulting in p<0.0001. The threshold used for all subsequent analyses as based on the fit of PCM(blue) to $FEV_1$ was set to 40 HU (p=1e-15). As inferred from FIG. 9, PCM(blue) represents the healthy lung parenchyma which is capable of altering lung tissue density from exhalation to inhalation. Unlike PCM(blue), the physiological meaning of PCM(red) is unclear and difficult to interpret. Nevertheless, PCM(red) generated a significant linear model of $FEV_1$ but was far less robust than PCM (blue). As such, this provided an opportunity to simplify the present PCM technique by redefining PCM(red) as the volume fraction of lung whose difference in HU from exhalation to inhalation does not exceed −40 HU ($\Delta HU > -40$ HU). Therefore, in some implementations, instead of a model having three classifications, two classifications where used 100%=PCM(red)+PCM(blue).

Comparison of LAA to PCM Method

Clear differences in healthy lung parenchyma as defined by PCM(blue) at a threshold of −40 HU are evident for varying COPD severity. As depicted in representative images 1006 comprising registered images on inspiration 1002 and expiration 1004 and scatter plots 1008 as provided in FIG. 10, PCM(blue) (blue voxels) comprised 66% of the lung volume in the non-COPD subject 1020 ($FEV_1=81\%$). In contrast, the representative patient with a GOLD 4 status 1030 ($FEV_1=25\%$) had a PCM(blue) value of 36%. A clear shift in the voxel distribution is observed in the PCM scatter plots 1008 between the two subjects 1020, 1030 with voxel HU values heavily dispersed during exhalation compared to inhalation for non-COPD subject 1020 and voxel HU values evenly distributed about the line of unity for the GOLD 4 subject 1030. This shift in the voxel distribution highlights the change in lung functionality between these extreme cases. Although we have demonstrated the strong correlation of PCM(blue) to $FEV_1$ for optimizing the PCM threshold, a plot of PCM(blue) at −40 HU to $FEV_1$ with a linear fit is provided to demonstrate this strong correlation between the CT-based and spirometric measures with 70% of the data being represented by the linear model 1040 R=0.834, p<0.0001).

In comparison, LAA, an established measure of emphysema and prognostic indicator of COPD severity, correlated strongly to $FEV_1$ in a univariate model 1044 with 54% of the data represented by the linear model. Analyzing PCM(blue) and LAA in a multivariate approach 1050 resulted in an improvement in the fit (76% of the data) from the individual regressions. The results from the multivariate analysis 1050 are quite intriguing because LAA and PCM(blue) are significant parameters in the general linear model of $FEV_1$, indicating that PCM(blue) contributes information about $FEV_1$ beyond what LAA can provide alone.

Modified PCM Technique

Figure 10:
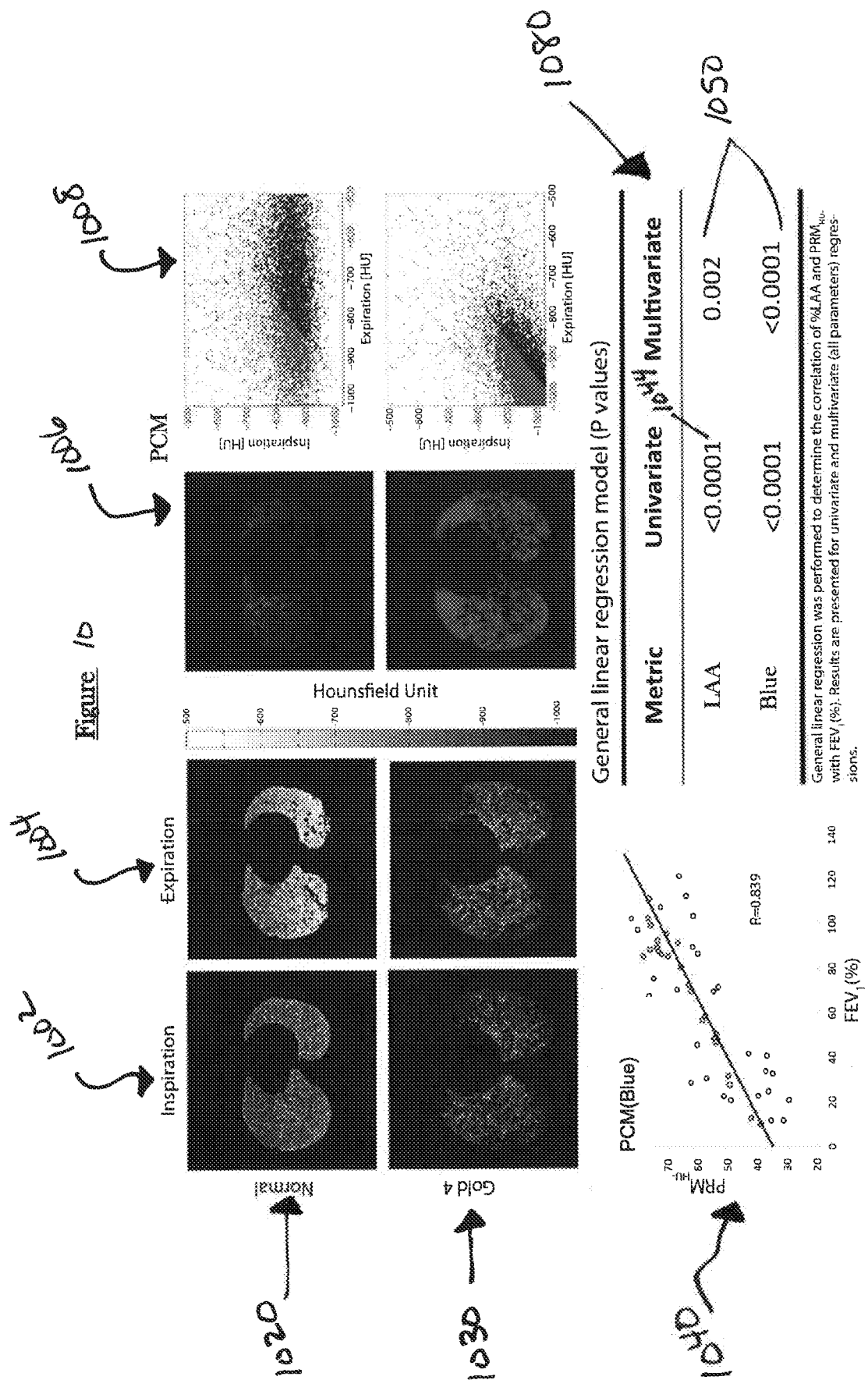
FIG. 10 shows images, PCMs, scatter plots, and a table generally comparing LAA to the PCM method, in accordance with embodiments of the present disclosure.

One could infer from the multivariate analysis in the table 1080 of FIG. 10, that LAA and PCM(blue) provide unique information when modeling $FEV_1$. Because LAA is a CT-based metric that uses a cutoff to designate voxels as emphysema based on HU values, this same cutoff can be incorporated into the PCM method. With reference back to FIG. 5, we present LAA and a modified PCM method that includes the original PCM threshold of −40 $\Delta$HU as well as the LAA cutoff of −950 HU on the inspiratory scan for the same representative slices used in FIG. 10. Inclusion of the emphysema cutoff changes the number of classifications from two to four. The nomenclature has been modified to account for the four classifications. Those voxels with inspiratory HU values >−950 HU, represented as red and blue voxels, continue to have the same color-code as the original PCM model. For those voxels designated as having emphysema (<−950 HU on inspiratory scan), voxels with $\Delta HU > -40$ HU or $\Delta HU < -40$ HU are coded yellow or green, respectively. As expected, the normal subject exhibited negligible emphysema (LAA<1%) and adequate lung function as assessed by PCM (PCM(blue)=61%; PCM(yellow) <1%; PCM(green)<1%). In contrast, emphysema was prevalent in the GOLD 4 subject with LAA measure at 37%. Inclusion of the emphysema cutoff in the PCM model resulted in a PCM(blue) for the GOLD 4 subject strikingly smaller (14%) than values observed from the original PCM (blue) (36% as shown in FIG. 10). Values of 39% and 18% were observed for PCM(yellow) and PCM(green), respectively. Individual color-coded PCM maps for each subject provide spatial information about the distribution of the different voxel classifiers throughout the lung volume.

Interestingly, regions of high emphysema (yellow color-code) appear to be bordered by high concentration of voxels found to have no emphysema but also negligible changes in lung density by PCM (red color-code). An example is observed in FIG. 5 in the anterior of both lungs of the GOLD 4 subject 502. The belief is that these regions, although not afflicted by emphysema, may suffer from a mechanical load from the emphysematous tissue making it inoperable. These red voxels may also suffer from other pulmonary disorders that accompany emphysema (e.g. small airways disease). The PCM techniques thus provide spatial information about lung function that can invariably be validated to lung pathology. As discussed previously with regard to the table 1080 of FIG. 10, modified PCM metrics and LAA were correlated in univariate and multivariate analyses to $FEV_1$. Incorporation of the −950 HU cutoff into the PCM approach improved the sensitivity of PCM metrics, most notably PCM(blue), to correlate with $FEV_1$. In fact, from all four modified PCM metrics, PCM(blue) was found to have the strongest correlation to $FEV_1$ with the model representing 81% of the data. In contrast, PCM(red) had the weakest correlation. The strength of PCM(blue) was also apparent in a multivariate general linear model of $FEV_1$ with LAA as a secondary parameter. As opposed to the previous result shown in FIG. 10, PCM(blue) is the only parameter in the multivariate linear model of $FEV_1$. In fact, inclusion of PCM(blue) from FIG. 10 (model excluding the −950 HU threshold) into the multivariate analysis performed in the table 530 in FIG. 5, had no significant contribution to the general linear model of $FEV_1$ (LAA: p=0.589; PCM(blue without −950 HU): p=0.805; PCM(blue with −950 HU): p<0.0001) with the model only slightly representing more of the data (82%).

An interesting find in our analysis of the PCM technique is its association with other CT-based attenuation and airway measurements. We evaluated by linear correlation the relationship between PCM metrics, generated from the modified approach, to LAA and percent wall area (WAP). For reference, PCM metrics were correlated to $FEV_1$, which all generated significant results as shown below in Table 2.

TABLE 2

| Model | Metric | Fev1 | LAA | WA |
|---|---|---|---|---|
| Modified | PCM (red) | −0.496** | 0.043 | 0.530** |
| | PCM (blue) | 0.902** | −0.840** | −0.403* |
| | PCM (yellow) | −0.718** | 0.937** | 0.174 |
| | PCM (green) | −0.531** | 0.666** | 0.048 |
| CT-Based | LAA | −0.734** | | 0.174 |
| | WAP | −0.605** | | |

*Indicates p < 0.01 and
**Indicates p < 0.001

As expected, PCM(blue) was found to correlate with both attenuation (LAA) and airway (WA) measurements. Most of the remaining metrics correlated strongly with LAA with the exception of PCM coded red voxels. In contrast, PCM (red) generated the strongest correlation to WAP. These results highlight the usefulness of the PCM technique at identifying the extent of disease, not only emphysema but also small airways disease, which may provide a single method for diagnosing varying COPD phenotypes.

Gas Trapping and Small Airways Example

Figure 11:
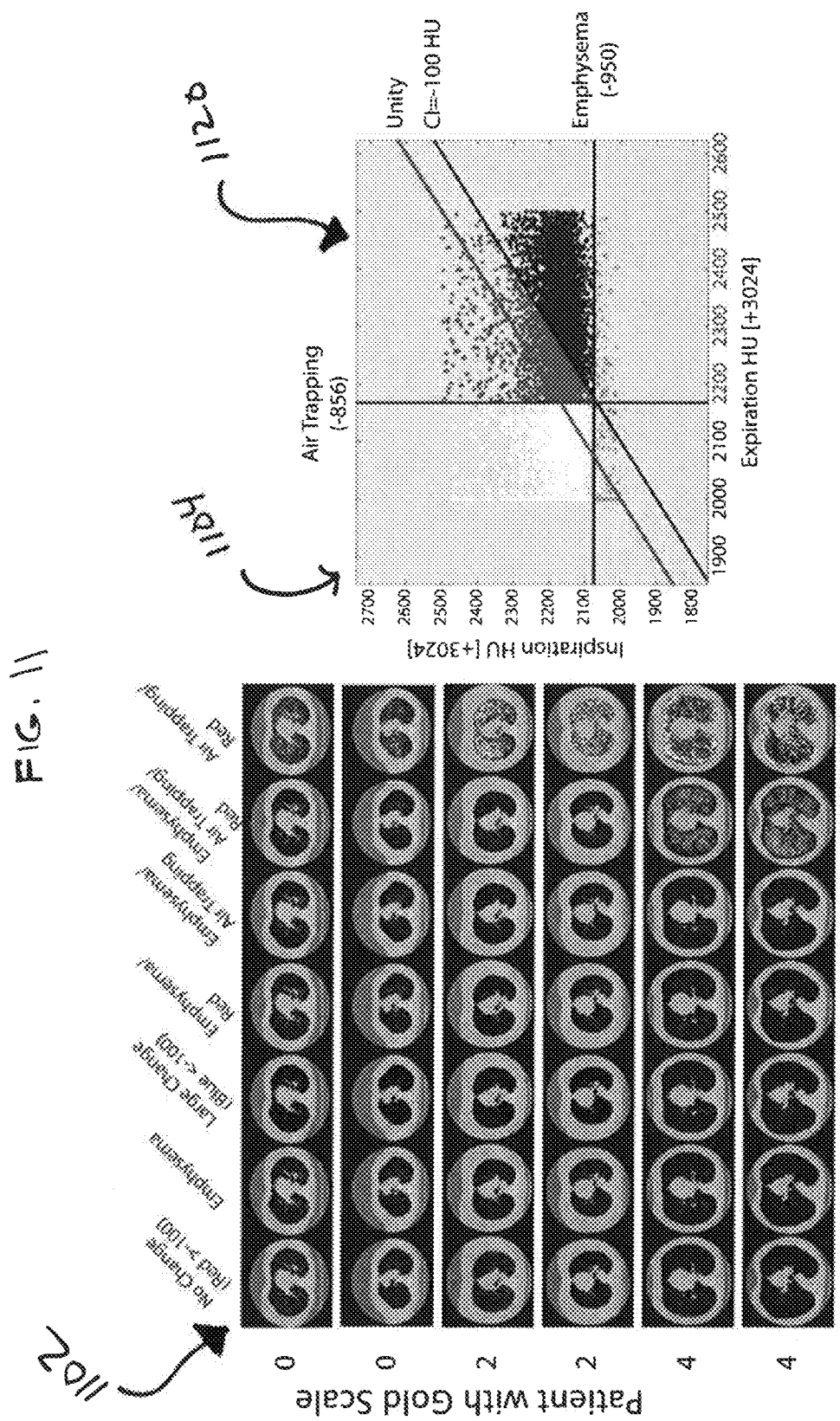
FIG. 11 includes representative PCM maps superimposed on inspiratory CT scans from patients with different GOLD status and a scatter plot, in accordance with embodiments of the present disclosure.

As discussed above, in some embodiments, the PCM technique applied to lung tissue analysis includes a cutoff on the expiratory axes, which is used for assessing gas trapping. Following the same procedure for imposing the emphysema cutoff (<−950 HU) in a PCM system, another example was performed to include a gas trapping cutoff, which has been defined as voxels on the expiratory scan <−856 HU. A representative scatter plot 1120 and PCM images 1102, with a PCM threshold of −100 HU, from patients with different GOLD status are illustrated in FIG. 11. The axes are scaled by 3024 HU, such that −950 HU is identified as 2074 HU (=−950+3024) on the inspiratory axes 1104. The inclusion of the air trapping cutoff results in 7 classifications as described in Table 3 below, which provides the color code for FIG. 11.

TABLE 3

| | PCM (>−100) | Emphysema (Ins<−950 HU) | Air Trapping (Exp<−856 HU) |
|---|---|---|---|
| Red | * | | |
| Green | | * | |
| Blue | | | |
| Yellow | * | * | |
| Purple | | * | * |
| Cyan | * | * | * |
| white | * | | * |

Note:
* denotes the color-codes defined by thresholds for PCM, emphysema and/or air trapping.

An interesting observation from the empirical testing was the presence of lung tissue that was non-changing and with no signs of emphysema. All patients recruited in the study had smoked for over 10 years. Of the 52 patients, ten had no signs of COPD as determined by $FEV_1/FVC$ yet approximately 28% of the lungs from those patients were designated by PCM techniques of the present disclosure as non-changing with no emphysema (red in FIG. 5). We believe, without being limited by the theory, that these tissue regions, generally indicated by red voxels, may constitute gas trapping as a result of small airways disease or even interstitial lung disease, caused by progressive scarring of the lung tissue. A recent report by Washko et al. (Washko et al., "Lung Volumes and Emphysema in Smokers with Interstitial Lung Abnormalities," *The New England Journal of Medicine*, 364, 897-906 (2011)) found that interstitial lung abnormalities in smokers are associated with reduced total lung capacity and a lesser amount of emphysema. Although, interstitial lung abnormalities (ILA) is observed in CT scans as being hyperintense, which could be omitted from a PCM analysis, the region of the lung described in the report as having ILA could constitute PCM(red). A general trend that we have observed in this non-emphysematous, non-changing lung tissue (red voxels) is the concentration of these voxels along the periphery of tissue associated with emphysema. Our belief is that PCM(red) may in fact identify lung tissue that is mechanically restricted or even precursors of a more progressive disease state (i.e. emphysema). An additional threshold on expiration of −856 HU can be used to further segment the red region to identify healthy static tissue from gas trapping (white in FIG. 11). In any event, the present embodiment of PCM techniques allow for not only the ability to identify tissue by different states, using identification thresholds, but to set thresholds that have location dependencies, allowing for the ability to identify tissue states generally confined to particular regions in comparison to other tissue states.

Example 2

COPD Components: Emphysema and Small Airways Disease

Inspiratory and expiratory CT scans were acquired from 10,000 patients as part of the COPDGene Study (www.copdgene.org). Of these patients, 194 (n=194) with at least a 10 pack-year history of cigarette smoking and with varying GOLD statuses, as defined by Global Initiative for Chronic Obstructive Lung Disease (GOLD; www.goldcopd.com), were assessed via embodiments of the present disclosure. Subjects included had no history of any active lung disease other than asthma, emphysema or COPD. Patients underwent spirometry using the EASYONE spirometry system (ndd Medical Technologies Inc., Zurich, Switzerland) before and after the administration of a short-acting bronchodilator (albuterol). Quality control was performed for all spirometry tests using both an automated system and manual review. The COPDGene Study research protocol was approved by the Institutional Review Board, and all participants provided written informed consent. Patient characteristics are summarized below in Table 4.

Patient characteristics and results of pulmonary function tests in 194 patients.

TABLE 4

|  | Normal | GOLD | | | |
| --- | --- | --- | --- | --- | --- |
|  |  | 1 | 2 | 3 | 4 |
| Age | 57 (8.9) | 64 (9.7) | 62 (9.3) | 64 (8.9) | 65 (9.1) |
| FEV1 | 97 (12.1) | 92 (8.2) | 66 (10.3) | 40 (5.6) | 22 (4.9) |
| FEV1/FVC | 78 (4.8) | 64 (4.3) | 57 (8.8) | 42 (8.3) | 29 (6.6) |
| LAA | 3 (2.3) | 6 (5.4) | 7 (6.2) | 19 (13.4) | 29 (13.4) |
| GT | 11 (6.8) | 21 (11.6) | 27 (15.5) | 50 (15.2) | 65 (11.7) |

*Note:
Data presented as means (standard deviations).
$FEV_1$ = forced expiratory volume in 1 second,
FVC = forced vital capacity,
LAA = low attenuation area on inspiratory CT scan and
GT = gas trapping as determined on expiratory CT scan.

High resolution computed tomography (HRCT) Image Acquisition and Analysis: Whole-lung volumetric multi-detector CT acquisition was performed at full inspiration and expiration using a standardized previously published protocol (Regan, E. A., et al. Genetic epidemiology of COPD (COPDGene) study design. COPD 7, 32-43 (2010)). Data reconstructed with the standard reconstruction kernel was used for quantitative analysis. All CT data were presented in Hounsfield Units (HU). For reference, air and water attenuation values are −1000 and 0 HU (respectively); healthy lung parenchyma is approximately −700 HU. Quantitative analysis of emphysema severity was performed on segmented lung images using Slicer (www.Slicer.org). The percentage of emphysematous lung was defined as the low attenuation area (LAA) of lung with a CT attenuation value of less than −950 Hounsfield Units (HU) divided by the total lung volume at full inflation, multiplied by 100. The total percent gas trapping (GT) was defined as the fraction of lung with a CT attenuation value of less than −856 HU divided by the total lung volume at expiration, multiplied by 100. Automated airway analysis was performed using workstation software using previously validated segmentation methods (Hu, S., Hoffman, E. A. & Reinhardt, J. M. "Automatic Lung Segmentation for Accurate Quantitation of Volumetric X-ray CT images" *IEEE transactions on medical imaging*, 20, 490-498 (2001)). Measures of morphology were made along the center line of the lumen in the middle third of the airway segment. Four metrics were determined: wall area percent (WAP; calculated as follows: 100*wall area/total bronchial area), internal perimeter of 10 mm (Pi10), inner area during inspiration (IAI) and airway wall thickness (AWT) (Nakano, Y., et al. "Computed Tomographic Measurements of Airway Dimensions and Emphysema in Smokers, Correlation with Lung Function," *Am J Respir Crit Care Med*, 162, 1102-1108 (2000); Kim, W. J., et al. "CT Metrics of Airway Disease and Emphysema in Severe COPD," *Chest* 136, 396-404 (2009)). Each parameter was measured in one segmental airway of each lung lobe, with the lingual included as a separate lobe: apical segment right upper lobe; lateral segment, right middle lobe; posterior basal segment, right lower lobe; apicoposterior segment, left upper lobe; superior lingual segment; and posterior basal segment, left lower lobe. The mean value across all six lobes was used for analysis.

Phasic classification map: Segmentation of the lung parenchyma and airways was performed to restrict the focus of the registration process to the lungs only. The expiration CT (floating) image was spatially aligned to the inspiration (reference) CT image using thin plate splines as the deformable registration interpolant. The registration algorithm was manually initialized using a 42 degree of freedom (DOF) warping of the floating dataset. The automatic algorithm then iteratively optimizes the solution using mutual information as the objective function. The DOF of the warping is roughly doubled and the scale space halved in each of 3 subsequent registration cycles automatically increasing the warping of the floating dataset ultimately to approximately 330 DOF with no folding.

The PCM of quantitative CT as expressed in Hounsfield units was determined by imposing three thresholds: 1) −950 HU on inspiration scan with values less denoted emphysema, 2) −856 HU on expiration scan with values less denoted gas trapping and 3) a change from expiration to inspiration of −94 HU where sufficient change in lung density is considered healthy functional parenchyma. The third threshold, accounting for mechanically functional parenchyma, is determined by calculating the difference between the Hounsfield Units ($\Delta HU$=expiration HU−inspiration HU) for each voxel within the lungs during inspiration and expiration. Voxels yielding $\Delta HU$ less than −94 HU, were designated as undergoing sufficient change in lung density. A value of −94 HU was chosen such that a line of unity (i,e. slope of 1) would intercept both the −950 HU and −856 HU cutoffs (−950+856=−94). These three thresholds generated six discrete classifications that were further simplified into three zones where voxels were designated as: healthy lung parenchyma color coded green, functional small airways disease color coded yellow, and emphysema color coded red. Global measures were also determined and presented as the relative volumes of each zone, which are the sum of all voxels within a zone normalized to the total lung volume. To minimize the contribution of airways and vessels in our PCM analysis of parenchyma, only voxels with HU between −500 HU to −1024 HU in both scans were considered for analysis.

As may be seen in the table 720 with reference back to FIG. 7, the percent contributions of each of the defined regions (I-VI) were correlated to $FEV_1$ and $FEV_1/FVC$ using a Pearson's correlation as a general precursor to sort out which variables play almost no role in describing FEV-related outcomes, e.g. region VI. A multivariate general linear regression model was generated separately for $FEV_1$ and $FEV_1/FVC$ to assess the contributions of the PCM metrics for emphysema and fSAD, and airway measurements WAP, IAI, Pi10 and AWT to the models as shown further below in Table 5. All statistical computations were performed with a statistical software package. Results were considered statistically significant at the two-sided 5% comparison-wise significance level ($p<0.05$). All data is presented as the mean+/−the standard error of the mean.

A PCM signature, as seen in the maps 620, 630 provided with reference back to FIG. 6, forms a distribution which can be modeled, having a distinctive center, shape, and alignment of major axis that reflects current lung function. The center of distribution (CoD) and principle eigenvector were determined for PCM signatures from individual patients. The center of the distribution was identified as the coordinate position of the median HU along the expiration (x-axis) and median HU along the inspiration (y-axis). The principle eigenvector was calculated using the principle component analysis on the PCM signature data. All calculations were performed using a mathematical programming software package.

In this example inspiratory and expiratory CT scans from all patients accrued from the COPDGene Study were digitally registered allowing for individual voxels from these scans to be plotted as a scatter plot on a Cartesian coordinate where the axes correspond to inspiratory (y-axis) and expiratory (x-axis) voxels. Resulting from spatial variations in lung pathophysiology, the voxels from the parenchyma produce a unique distribution, or signature, when plotted. Consequently, each voxel can be classified based on their location within the coordinate system as healthy lung (green), functional small airways disease (fSAD, yellow) and emphysema (red).

Acquisition of CT scans was performed using imaging protocols that emphasize high resolution with sufficient signal-to-noise on both serial CT scans as defined by the COPDGene Study. Imaging processing primarily includes lung segmentation followed by deformable volumetric registration. Deformable registration spatially aligns the expiration scan to the inspiration scan such that both share the same spatial geometry. Segmentation of the lung bronchus from the parenchyma is required for further analysis. Classification of voxels from attenuation maps into discrete zones allows for the quantification of global measures of normal parenchyma (green), functional small airways disease (yellow), and emphysema (red) that is highly sensitive to the extent of COPD as well as retaining spatial information for analysis of the distribution of disease within the lung. Again, as previously noted, the color-coding scheme used in this example embodiment may be different from the color-coding schemes used in other example embodiments. The PCM method is a sensitive prognostic imaging biomarker capable of elucidating the complexity and severity of COPD.

With reference back to FIG. 6, plots 620, 630 of the registered inspiration and expiration CT values are provided for all voxels in the parenchyma showing that the plots 620, 630 provide a signature (i.e. distribution and location of values) unique to the COPD severity in the studied patients. As presented in FIG. 6, voxels were originally segmented and allocated into discrete classification regions (I-VI 604, 606, 608, 610, 612, 614) based on three thresholds: 1) −950 HU on inspiration scan (horizontal solid line 640) with values less denoted emphysema, 2) −856 HU on expiration scan (vertical solid line 642) with values less denoted gas trapping and 3) a change from expiration to inspiration of −94 HU (diagonal dashed line 620) where sufficient change in lung density is considered healthy functional parenchyma. A plot 620 is provided showing the distribution of voxels with varying values at inspiration and expiration for a patient with Normal status as determined by spirometry ($FEV_1/FVC=83\%$, $FEV_1=81\%$). Most of the variation in lung attenuation for this unique signature is observed along the expiration axis, with voxels generally having more attenuation at expiration 662 than inspiration 664 Most voxels reside within classification I 604, suggesting that these voxels consist of bronchioles and alveoli capable of normal air uptake that result in changes in CT attenuation from expiration to inspiration. In contrast, a plot 630 of a patient with GOLD 4 status ($FEV_1/FVC=25\%$, $FEV_1=18\%$) demonstrates a PCM signature distinct from the Normal status. For this patient, the plot 630 shows that voxels reside primarily within classifications III-V 688, 690, 692. Similar attenuation on CT scans at inspiration 698 and expiration 696 and extensive emphysema as assessed using LAA (33%) was observed, which is characteristic of a patient with dyspnea (MMRC Dyspnea Scale=3).

We have demonstrated a unique signature pattern based on our PCM methodology sensitive to COPD severity. From this approach discrete COPD phenotypes can be elucidated through generation of global measures for each classification based on the co-localization of the voxels in both inspiratory and registered expiratory CT scans. Voxels within a classification are summed and normalized by the total lung volume to generate relative volumes that can be used to identify the extent and location of non-emphysematous air trapping, which we associate with functional small airways disease (fSAD) from emphysema as well as healthy lung tissue.

In an effort to simplify the PCM methodology in the embodiment shown in FIG. 1, trends of the relative volumes from the individual classifications were evaluated with varying GOLD status. Distinctly different response patterns 730 to GOLD status were observed for subsets of classified relative volumes of lung as shown with reference back to FIG. 7. In general, most PCM measures were identified statistically as shown in the table 720 as having a strong correlation with $FEV_1$. As shown in the table 720, the relative volume of classification I was found to decrease with GOLD status, resulting in the strongest correlation to $FEV_1$. Although not as strong a correlation to $FEV_1$, as classification I, the relative volume in classification II also showed a drop in value with increasing GOLD. We presume, without being limited to the theory, that voxels that reside in these two regions are associated with healthy lung parenchyma that is mechanically changing (I) or serves as a structural component of the lung parenchyma that is not actively involved with gas exchange (II). Classifications IV-VI reside within the −950 HU threshold on the inspiration axis. As observed, when summed 710, classifications IV and V generated a fit of near unity to LAA suggesting the sum of these classifications represent emphysema. Classification VI had no correlation with $FEV_1$, $FEV_1/FVC$ or LAA ($R2=0.007$, $p=0.254$) and may simply be noise attributed possibly to spatial misalignment. Similar to LAA, three classifications (III-V) reside within the −856 HU threshold on the expiration axis. The relative volume of lung with attenuation less than −856 HU on an expiration CT scan is associated with overall gas trapping (GT), which comprise both emphysema and fSAD. The sum 730 of all three classifications provided a near unity fit to GT. Based on the definition of GT and the observation that IV and V are emphysema, changes in III are associated with air trapping likely as a result of fSAD. In fact the relative volume in classification III was found to increase almost linearly as a function of GOLD status 730, which was independent to the trends observed in classifications IV and V.

We tested the PCM approach disclosed in this example as a self-sustained technique by correlating the fSAD (Yellow) and emphysematous (Red) metrics to $FEV_1$ and $FEV_1/FVC$ while considering the contribution of other airway measurements (i.e. wall area percent (WAP), internal perimeter of 10 mm (Pi10), inner area during inspiration (IAI) and airway wall thickness (AWT)). We found in the multivariate regression that fSAD and emphysema as determined by PCM were both significant contributors to the regression models. Out of all the airway measurements only WAP was found to be a minor contributor with the remaining parameters providing no statistical value for modeling $FEV_1$ or $FEV_1/FVC$ (Table 5).

TABLE 5

Multivariate linear regression to spirometry

|  | Emph | fSAD | WAP | Pi10 | IAI | AWT |
|---|---|---|---|---|---|---|
| FEV1 | <0.0001 | <0.0001 | 0.02 | 0.218 | 0.366 | 0.386 |
| FEV1/FVC | <0.0001 | <0.0001 | 0.024 | 0.991 | 0.838 | 0.107 |

Note:
P values are provided for each parameter analyzed in the linear model for outcomes FEV1 and FEV1/FVC. PCM measures are functional small airways disease (fSAD) and emphysema (Emph). The small airway measurements included in this analysis are wall area percent (WAP), internal perimeter of 10 mm (Pi10), inner area during inhalation (IAI) and airway wall thickness (AWT).

Figure 12:
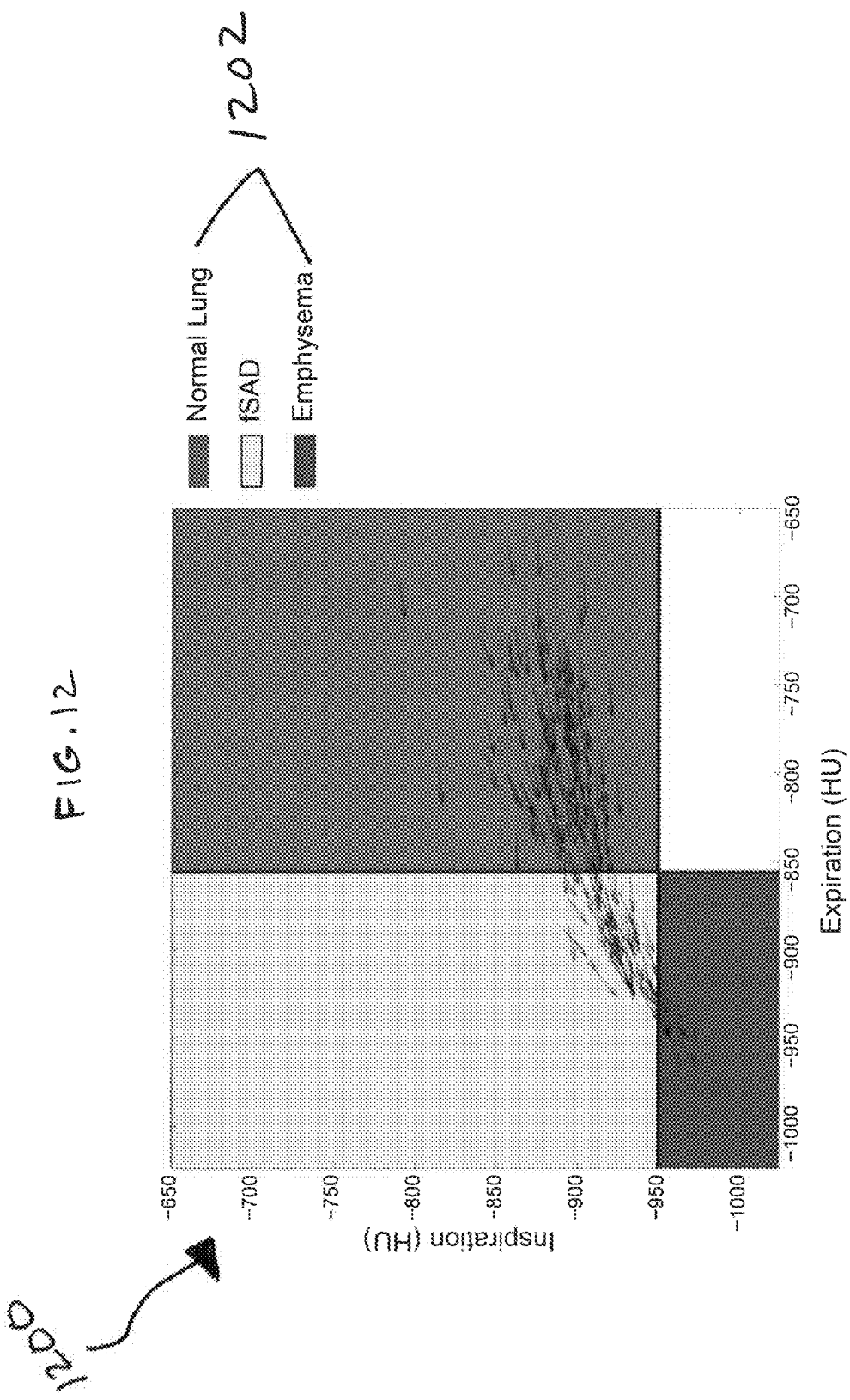
FIG. 12 is a plot indicating COPD progression as determined by PCM, in accordance with embodiments of the present disclosure.

An interesting trend was observed that involved the spatial distribution and association of fSAD tissue with emphysema, as may be seen in FIG. 12. Although airway disease is a component of COPD, little is known regarding its evolution with respect to emphysema progression, such as whether airway disease precedes emphysema or does it progress separately as a unique disease state of COPD. Answering this question would greatly affect clinical care as well as aid in directing clinical trials of agents being tested for treating airway obstruction. Applying the present techniques to the problem, individual patient PCM signatures were examined to identify a pattern of disease progression in the 194 patient test group. Based on the distribution of voxels as seen in FIG. 6, we calculated for each patient the center of distribution (CoD) that is the median values of all voxel data for both axes (position of the arrows) and the direction of largest covariance component, i.e. the principal eigenvector, of each patient's scatter plot (arrows; direction of arrowheads are arbitrarily chosen) and plotted all patients on the inspiration-expiration diagram 1200, which consists of the three PCM color-codes 1202 used for this example. What we observed is a pattern suggestive of COPD progression that has never been demonstrated previously. In fact, the data from the 194 patients studied suggests fSAD precedes emphysema in the progression of COPD. It is noted that FIG. 12 is not presenting longitudinal data, but rather snap shots of many patients at various stages of the disease. What is significant about this finding obtained from this heterogeneous patient population is that a specific trend in the data was observed and this trend suggests that airway obstruction associated with fSAD appears to be a precursor to the development of emphysema.

Example 3

Figure 13:
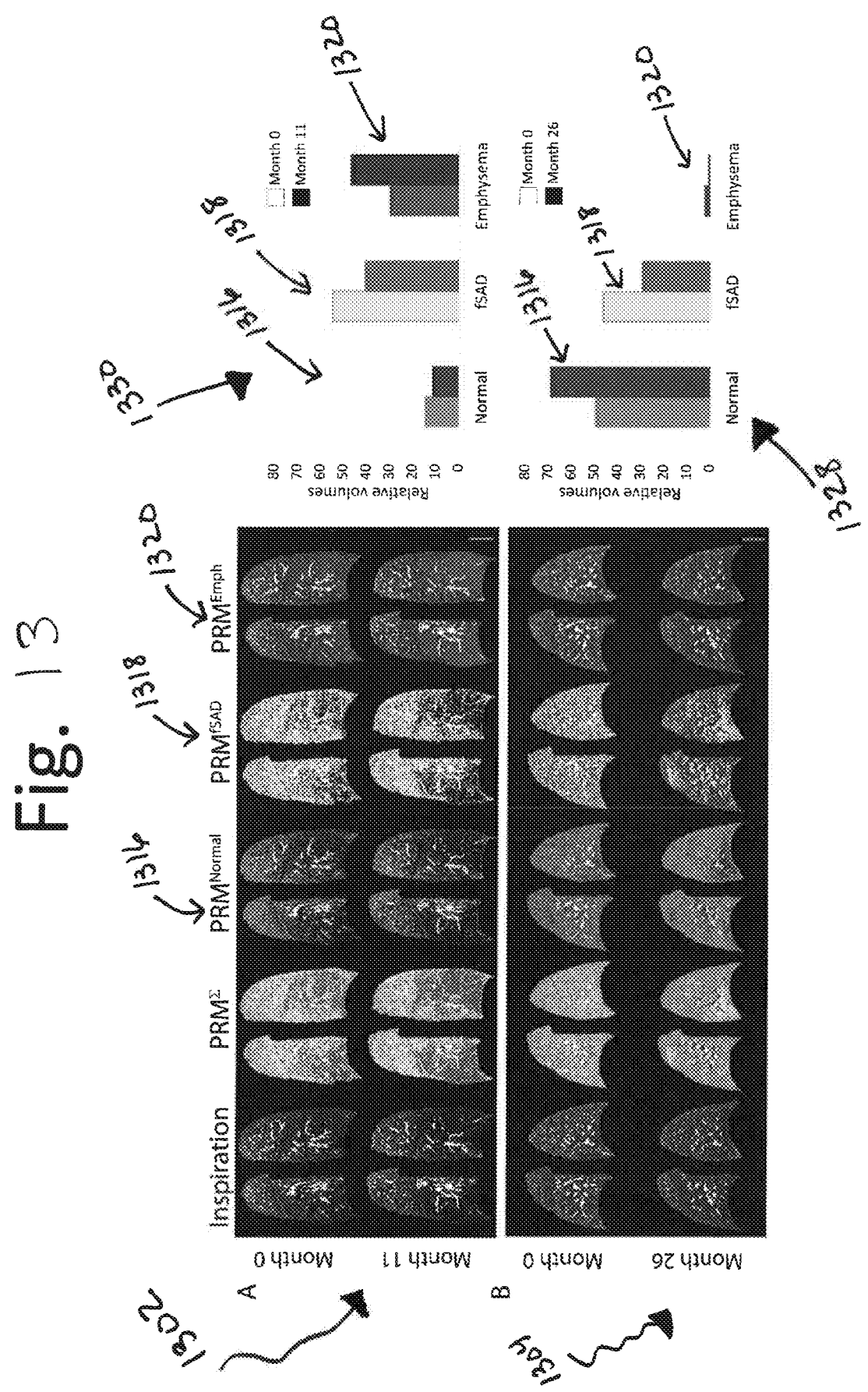
FIG. 13 provides images of CT scans of two different subjects taken at different time points and associated bar graphs, in accordance with embodiments of the present disclosure.

In order to provide some insight into the feasibility of PRM as an imaging biomarker to monitor individuals longitudinally over time, we obtained additional retrospective imaging data outside of the COPDGene Study from subjects who had previously visited the University of Michigan pulmonary clinic and underwent inspiratory/expiratory CT scanning protocol over a period of time. Shown in FIG. 13 are examples of two different subjects 1302, 1304 along with the time intervals between CT exams, PRM metrics normal (green) 1316, fSAD (yellow) 1318, and emphysema (red) 1320 provided as relative volumes 1328, 1330 along with $FEV_1$ acquired as a standard PFT. As shown 1330, the subject which had considerable emphysema 1320 and fSAD 1318 at the baseline scan (month 0), had at 11 months later progressive emphysema greater than the loss of fSAD as there was an additional loss of normal functional lung 1316 as well. $FEV_1$ was unchanged from 18% to 17% over this time interval. These two pathologies appear to co-exist in high percentages throughout the disease duration of this subject. In contrast, the relative volumes chart 1328 reveals a COPD subject with a largely asthmatic component with no emphysema 1320. Over a 26 month period, the amount of normal lung 1316 for this patient 1328 increased correspondingly with a decrease in fSAD 1318 along with an increase in $FEV_1$ from 66 to 75%. These human examples reveal the significant potential of using PRM to monitor COPD over time to provide a phenotype classification basis for patient response or progression.

We tested our PRM approach as a self-sustained technique by correlating our PRMfSAD (Yellow) and PRMEmph (Red) metrics to a variety of clinical tests that have been identified as being prognostic of COPD severity which was collected as part of the COPDGene study. As observed in Table 6 provided below, both PRMfSAD and PRMEmph contributed significantly to modeling the various metrics. Only for dyspnea (MMRC) did we see a stronger role of emphysema over fSAD in the model. We found both PRMfSAD and PRMEmph were significant independent contributors to the statistical model for severe exacerbation, defined as those requiring an emergency room visit or hospitalization. Only PRMfSAD was found to be a significant contributor when modeling exacerbation frequency.

TABLE 6

Bivariate regression of patient assessment parameters

|  | $PRM^{fSAD}$ | $PRM^{Emph}$ |
|---|---|---|
| $FEV_1$ | <0.0001 | <0.0001 |
| $FEV_1$/FVC | <0.0001 | <0.0001 |
| $TLC^a$ | 0.01 | <0.0001 |
| St. George's Respiratory Questionnaire total score | <0.0001 | <0.0001 |
| 6-min walk distance (m)$^b$ | 0.06 | <0.0001 |
| MMRC dyspnea scale score$^c$ | 0.243 | <0.0001 |
| BODE score$^c$ | <0.0001 | <0.0001 |
| Severe exacerbation$^c$ | 0.03 | 0.02 |
| Exacerbation frequency$^d$ | 0.005 | 0.103 |

Note:
Presented are the P values generated from bivariate regression models for each of the prognostic indicators when assessing the contributions of fSAD and emphysema as defined by PRM ($PRM^{fSAD}$ and $PRM^{Emph}$, respectively).
$FEV_1$ = forced expiratory volume in one second,
FVC = forced vital capacity,
MMR = Modified Medical Research Council,
BODE = body mass index, degree of airflow obstruction, dyspnea, and exercise capacity (as measured in a 6-minute walk test).
$^a$denotes CT derived metric.
$^b$denotes controlling for body mass index,
$^{c,d}$denote use of a logistic and negative binomial regressions, respectively, instead of a linear regression.

Acute exacerbations of COPD are increasingly being recognized as a major clinical and financial burden. Prediction of acute COPD exacerbations will enable health care providers to better target COPD patients for preventive therapy. Although spirometry continues to be a primary clinical endpoint for pharmaceutical trials, spirometry has been found to be inadequate as a sole procedure for risk assessment of COPD exacerbations. Imaging biomarkers, primarily CT, are presently being evaluated as surrogate biomarkers of exacerbation. The PCM technology of the present disclosure provides, using standard CT protocols, a means for differentiating the principle contributions to COPD: functional small airways disease (fSAD) and emphysema. We have evaluated the efficacy of fSAD and emphysema as measured by PCM as surrogate markers of known metrics of clinical outcomes, with exacerbation frequency being one such metric. As shown in Table 6 above, what we have found is a strong correlation between exacerbation frequency and fSAD (p=0.005), but not emphysema (p=0.103). This result suggests that fSAD, as determined by PRM, may serve as a surrogate biomarker of acute COPD exacerbations.

Although gas trapping (GT) correlates with airway obstruction as determined by $FEV_1$, it is unable to distinguish between fSAD and emphysema. PRM, with its ability to identify and track voxels in inspiratory and expiratory scans, allows for the individual components of COPD, i.e. fSAD and emphysema, to be quantified and monitored. At mild to moderate airway obstruction (GOLD<3), GT and PRMfSAD generate similar values. As seen in FIG. 14, this trend deviates for severe airway obstruction (GOLD>2) where GT generates values higher than those observed from PRMfSAD. The increase in GT is attributed to the increase in emphysema observed in GOLD 3 and 4. In contrast, PRMEmph and % Emphysema (% Emph) generated almost identical values irrespective of GOLD status.

We demonstrated the relationship of fSAD versus emphysema 1500, both determined by PRM (PRMfSAD and PRMEmph, respectively), for all 194 individuals, as shown in FIG. 15. A color legend identifies the GOLD status of each individual. As may be seen, many subjects have PRMEmph less than 10% yet some of these can have PRMfSAD that make up 10-30% of their lung parenchyma. Another interesting point is the apparent plateau in the amount of PRMfSAD that can be present in the lung. More severe lung obstruction as determined by $FEV_1$ (GOLD 3 and 4) appears to be attributed to contributions of fSAD along with emphysema, with PRMfSAD plateauing around 40-50% with an increase in the relative volume of lung with emphysema becoming more evident (PRMEmph>20%). This figure emphasizes the relationship between fSAD and emphysema similar to what is observed in FIG. 12.

Example 4

In this example, thresholds may be used to identify regions of lung parenchyma that increase in attenuation. An example is idiopathic lung disease (IPF). In this case, the lung parenchyma hardens due to the presence of fibrotic tissue which hinders breathing. FIG. 16 consists of a representative inspiratory 1602, expiratory 1604 and spatially aligned inspiratory CT slice 1606 from an IPF patient with corresponding scatter plot 1620. Fibrotic tissue is identified in CT images as highly attenuated tissue (white regions as shown in FIG. 16). Registered voxels are primarily clustered into two groups: parenchyma with the most concentrated (dark red in FIG. 16) around −700 HU and −800 HU (x,y axes, respectively) and fibrotic tissue around −50 HU and −50 HU (x,y axes, respectively). We demonstrate here how PCM provides sensitive information on the state of the parenchyma in the presence of fibrosis. A threshold can be incorporated into PCM to identify the extent of fibrotic tissue in the parenchyma from a patient with IPF 1708, as shown in FIG. 17. For comparison, a subject with no lung disease 1720 is presented in the left panel of FIG. 17. A fourth threshold at −850 HU on the inspiratory axes 1730 is included to classify voxels (i.e. lung parenchyma) as fibrotic. The subject diagnosed with IPF 1708 has a large number of voxels above this fourth threshold 1730 indicating the presence of fibrosis in lung parenchyma that would be considered healthy using conventional CT techniques for diagnosis. This approach can be extended to other interstitial lung diseases (ILD) for diagnosis, assessment of severity and determination of disease phenotype.

Example 5

PCM Applied to Individual Lobes and Bronchials of the Lung

Figure 18:
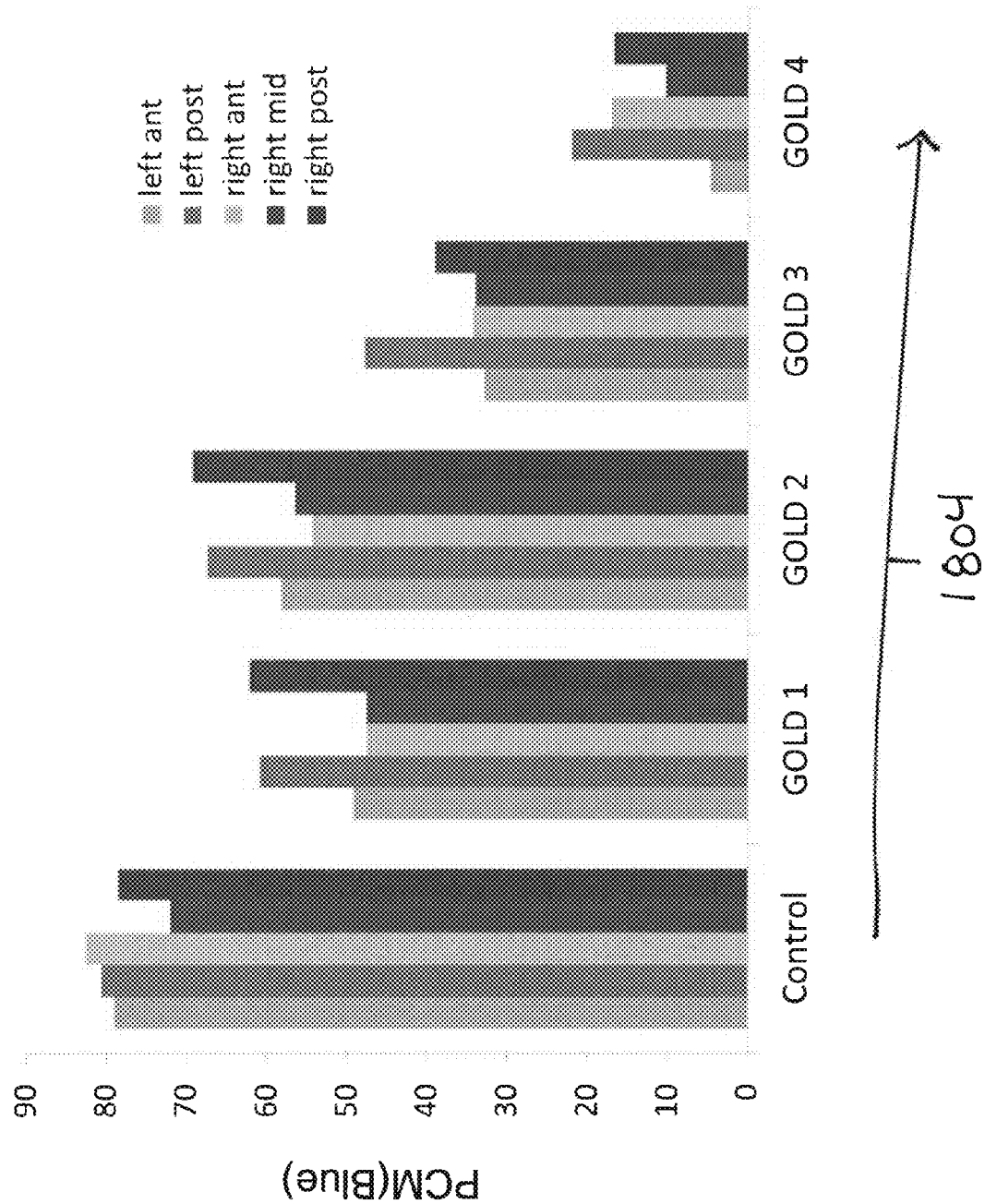
FIG. 18 is a plot of preliminary results of COPD extent in the lobes of the lung as determined by an example implementation of the PCM techniques disclosed herein, and where PCM(blue) was determined for each lobe in a representative subject of each GOLD status.

In this example, individual lobes of the lung were manually contoured along the periphery of the lungs and fissures. PCM metrics were calculated, using the above-described processes, over the individual lobe volumes-of-interest (VOI). FIG. 18 demonstrates the extent of COPD as determined by PCM(blue) from FIG. 5 in the five lobes of the lung for five subjects with different COPD severity as determined by GOLD. For the bronchi, PCM(blue) represents walls that have undergone a significant change in density from expiration to inspiration. Individually analyzed, each lobe demonstrated a decrease in PCM(blue) 1802 with increasing GOLD status 1804. This trend is consistent with results observed over the entire lung. In addition, no clear difference in PCM(blue) was observed between lungs, but within lungs, subjects with some form of COPD exhibited higher values of PCM(blue) in the lung posterior than anterior. This trend was not observed in the normal subject. These results reveal the ability to extend the PCM techniques to obtain imaging metrics from spatially distinct regions of lung tissue, which will provide information on the spatial extent of disease within individual patients. As performed on the parenchyma of the lung, other thresholds may be applied to PCM for classifying diseased or healthy bronchi.

Figure 19:
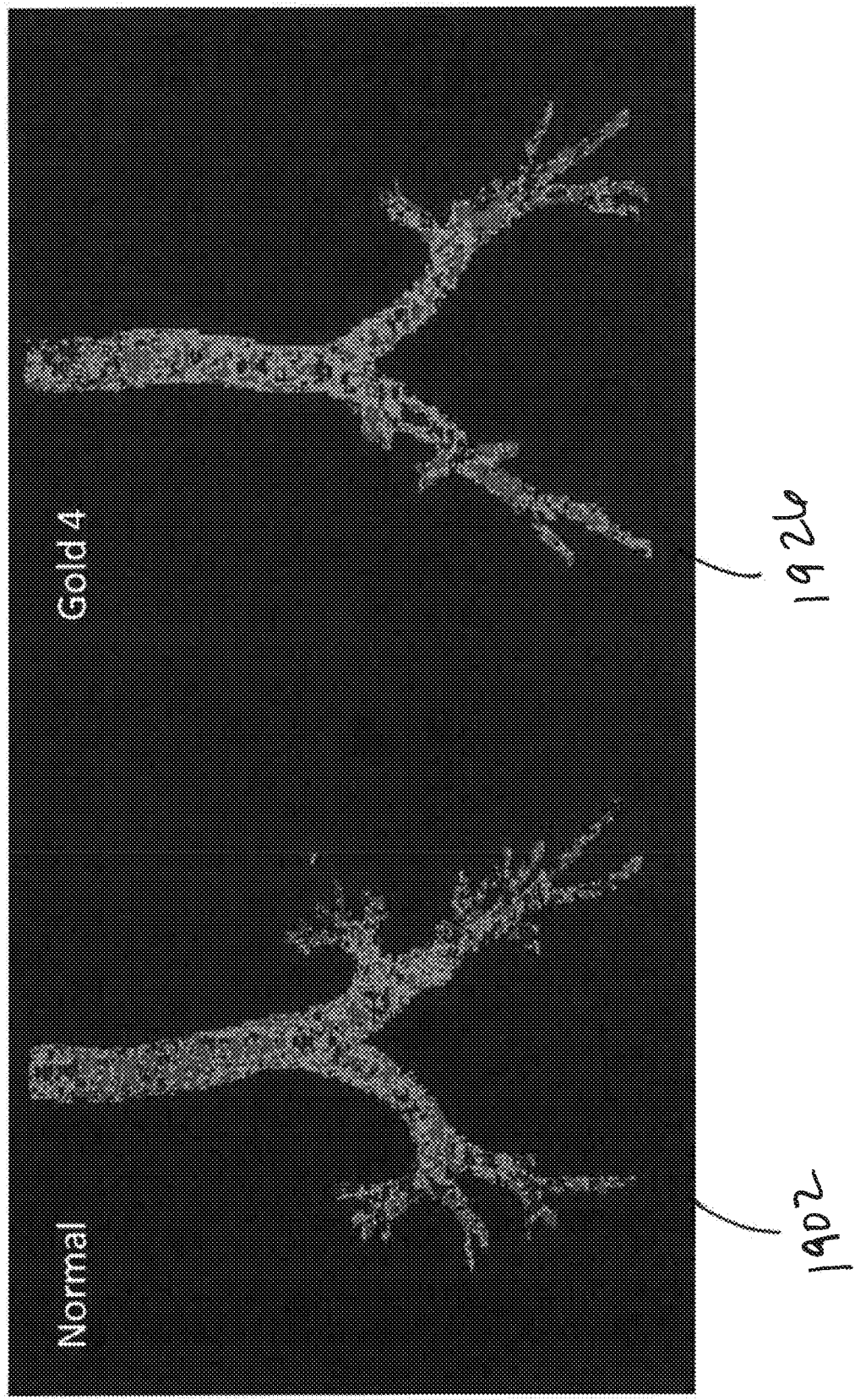
FIG. 19 illustrates PCM images of bronchial tissue in a normal patient and a GOLD 4 patient, illustrates a PCM scatter plot of a subject with no lung disease and a PCM scatter plot of a subject with IPF, in accordance with embodiments of the present disclosure.
Figure 20:
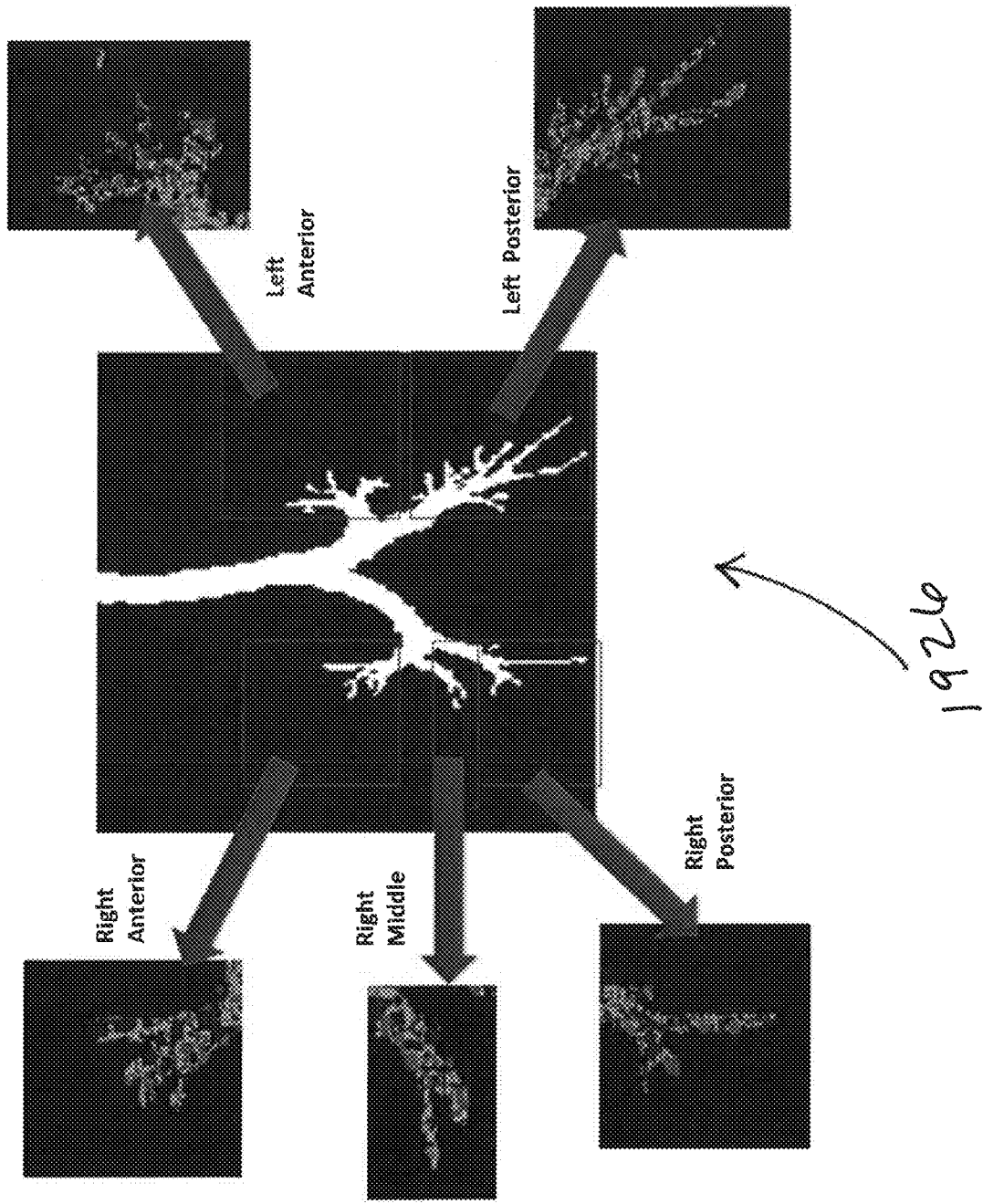
FIG. 20 illustrates different segment regions of the bronchial tissue of FIG. 19, where different branches of the bronchi are analyzed.
Figure 21:
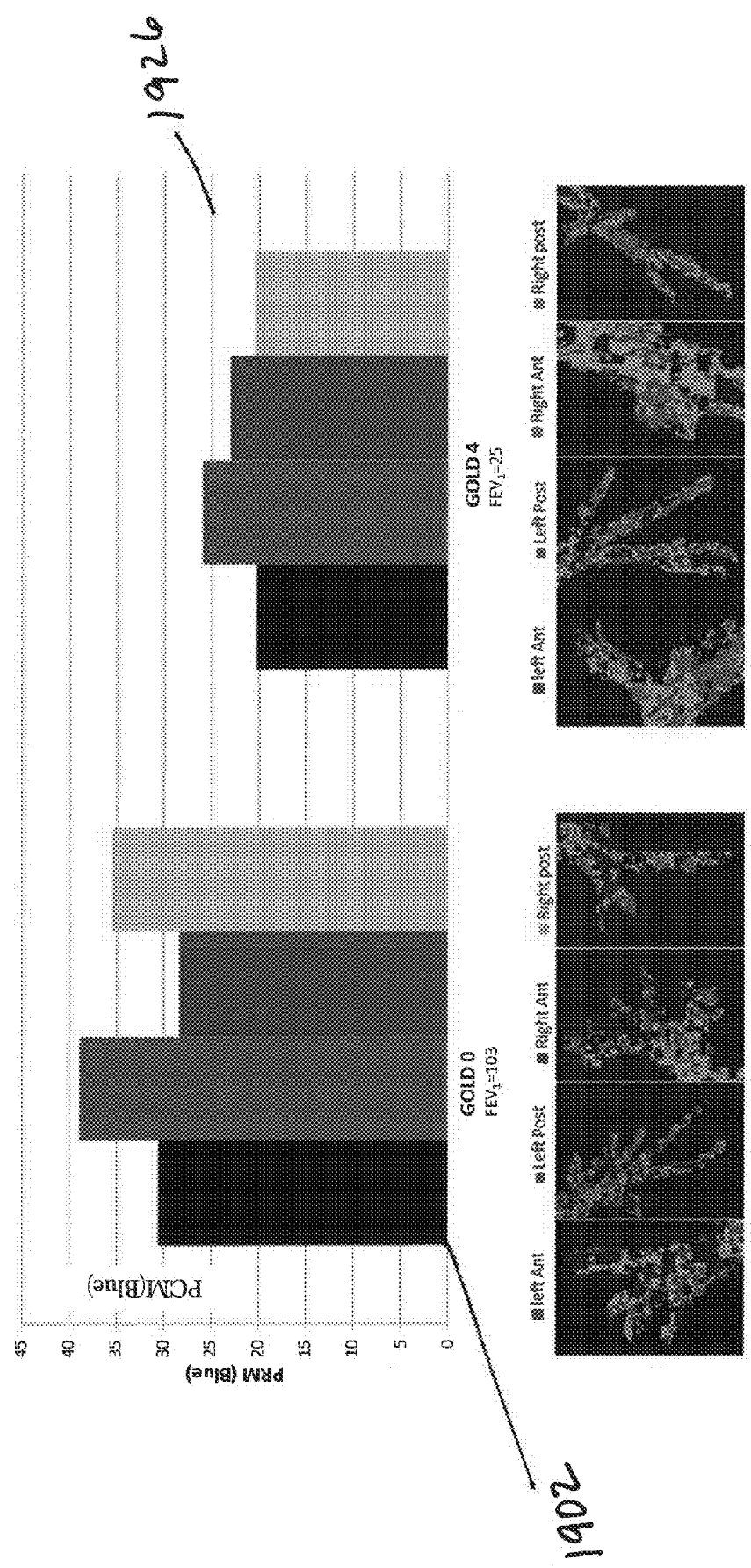
FIG. 21 is a bar graph of the relative volume of significantly decreasing HU (PCM(blue)) for the different regions identified in FIG. 7 for a representative GOLD 0 patient and GOLD 4 patient.

This spatial separation feature of the PCM system was extended to analyze the bronchi of the lungs. FIGS. 19-21 provide representative images of the bronchi from a normal patient 1902 and one with a GOLD 4 (heavily diseased) status 1926. By the 3rd bifurcation, distinct differences resulting from the PCM technique are observed. In the normal patient 1902 most of the bronchioles are blue (PCM (blue)) suggesting healthy changes in density of the bronchioles during breathing. In contrast, most of the bronchioles are red or green in the GOLD 4 patient 1926. Analogous to the lobar assessment of COPD severity, the different branches of the bronchi can be analyzed separately, as seen in FIG. 21. The approach to analyzing the bronchioles may allow for a more clear assessment of the spatial distribution of small airways disease in patients diagnosed with COPD, as illustrated in FIG. 21.

Figure 22:
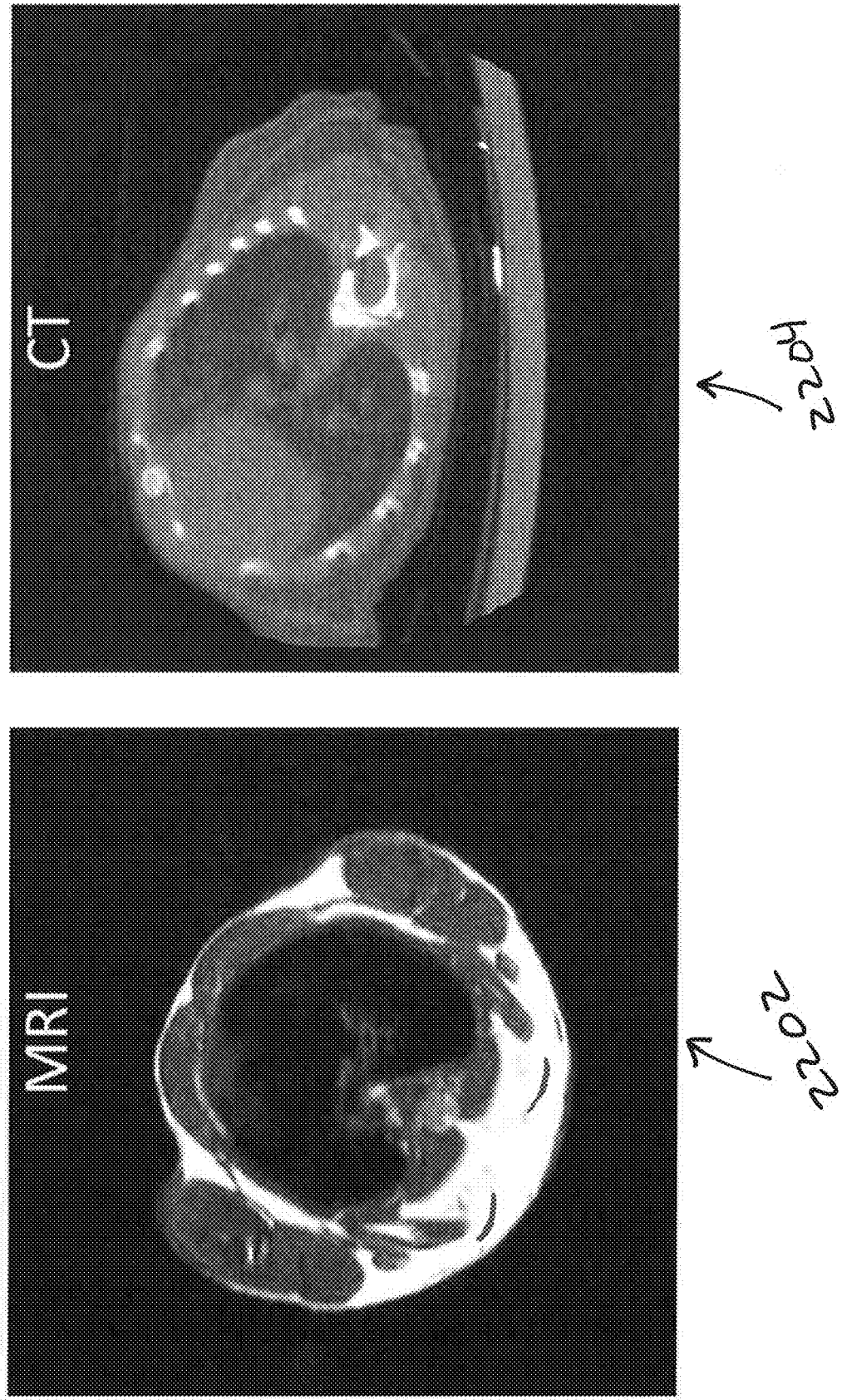
FIG. 22 provides images of lung tissue of a mouse imaged by magnetic resonance imaging RO using a proton density sequence and by computed tomography (CT), in accordance with embodiments of the present disclosure.
Figure 23:
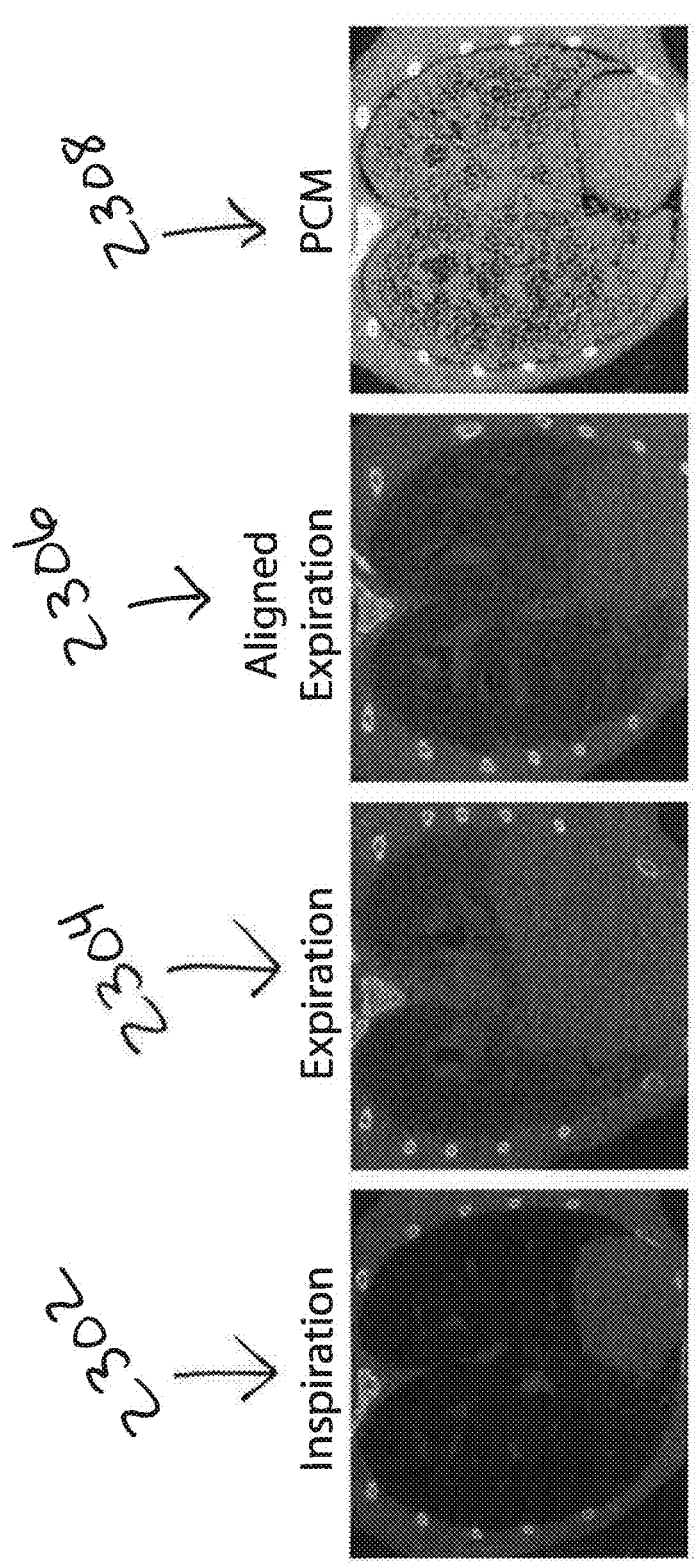
FIG. 23 illustrates images of CT scans of a mouse at inspiration, expiration, aligned expiration and PCM, in accordance with embodiments of the present disclosure.

Other example uses of the PCM technique include assessing CT status for small animal imaging. In FIG. 22, the lungs of the same mouse were imaged by magnetic resonance imaging (MRI) 2202 using a proton signal sequence and computed tomography (CT) 2204. Instruments that control the ventilation of the lungs within the animal allow for CT scans that would also be useful to facilitate imaging procedures to acquire images at full inhalation and exhalation. Animal imaging PCM of lung disease models can also be accomplished to assess disease status or treatment response similar to patients. FIG. 23 is an example of PCM in a mouse with corresponding CT scans at inspiration 2302 and expiration 2304, aligned (i.e. registered) expiration 2306 and PCM 2308.

Example PCM System

Figure 24:
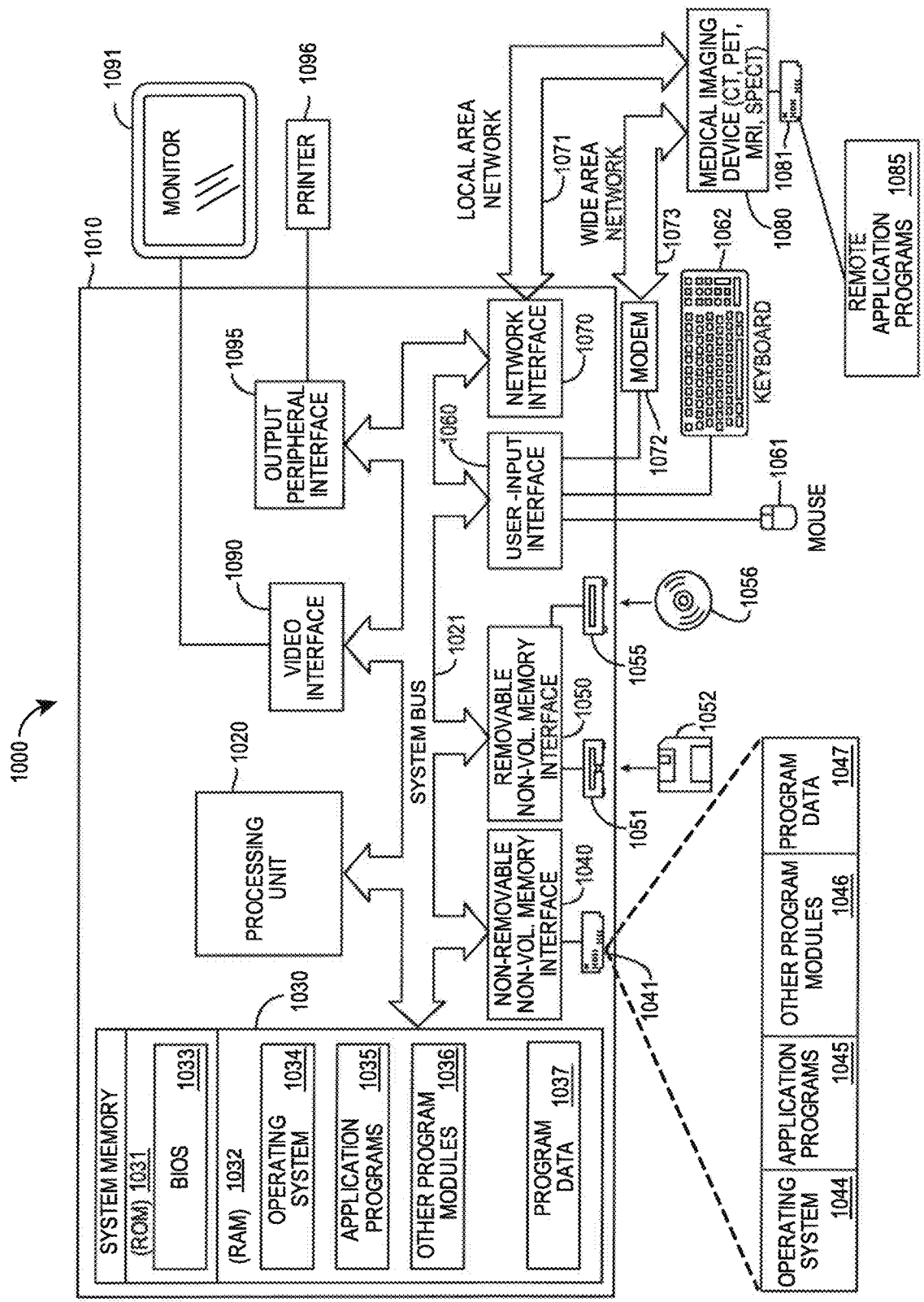
FIG. 24 is a block diagram of an example of a computer system on which a portion of a system for diagnosing voxel-based signal changes within tissues may operate in accordance with described embodiments.

FIG. 24 is a block diagram of an example computer system 1000 on which a tissue phasic classification system may operate, in accordance with the described embodiments. The computer system 1000 may be a PCM system, for example. The computer system 1000 includes a computing device in the form of a computer 1010 that may include, but is not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (Pa) bus (also known as Mezzanine bus).

Computer 1010 typically includes a variety of computer readable media. Computer readable media can be any available media that can be accessed by computer 1010 and includes both volatile and nonvolatile media, and both removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above are also included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 24 illustrates operating system 1034, application programs 1035, other program modules 1036, and program data 1037.

The computer 1010 may also include other removable/non-removable, volatile/nonvolatile computer storage media. By way of example only, FIG. 24 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 24 provide storage of computer readable instructions, data structures, program modules and other data for the computer 810. In FIG. 24, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and cursor control device 1061, commonly referred to as a mouse, trackball or touch pad. A monitor 1091 or other type of display device is also connected to the system bus 1021 via an interface, such as a graphics controller 1090. In addition to the monitor, computers may also include other peripheral output devices such as printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 24. The logical connections depicted in FIG. 24 include a local area network (LAN) 1071 and a wide area network (WAN) 1073, but may also include other networks. Such networking environments are commonplace in hospitals, offices, enterprise-wide computer networks, intranets and the Internet. In the illustrated example, the remote computer 1080 is a medical imaging device, such as a CT scanning device, PET scanning device, MRI device, SPECT device, etc. The remote computer 1080, therefore, may be used to collect various image data of a sample region of tissue at different phases of movement, as in the example of a COPD diagnosis, or at different times for a static tissue, such as a bone. The remote computer 1080, therefore, may collect image data containing a plurality of voxels each characterized by some signal value, for example, a value measured in Hounsfield values.

While a single remote computer 1080 is shown, the LAN 1071 and/or WAN 1073 may be connected to any number of remote computers. The remote computers may be independently functioning, for example, where the computer 1010 serves as a master and a plurality of different slave computers (e.g., each functioning as a different medical imaging device), are coupled thereto. In such centralized environments, the computer 1010 may provide one or both of an image processing module and a tissue classification diagnostic (including tissue phenotype classification) module for a group of remote processors, where the image processing module may include an image collector engine and a deformation registration engine and the tissue classification diagnostic module may include a voxel analysis engine. In other examples, the computer 1010 and a plurality of remote computers operate in a distributed processing manner, where imaging processing module and tissue classification diagnostic module are performed in a distributed manner across different computers. In some embodiments, the remote computers 1080 and the computer 1010 may be part of a "cloud" computing environment, over the WAN 1073, for example, in which image processing and tissue classification diagnostic services are the result of shared resources, software, and information collected from and push to each of the computers. In this way, the remote computers 1080 and the computer 1010 may operate as terminals to access and display data, including tissue classification diagnostics (tissue phasic classification), delivered to the computers through the networking infrastructure and more specifically shared network resources forming the "cloud."

It is noted that one or more of the remote computers 1080 may function as a remote database or data center sharing data to and from the computer 1010.

When used in a LAN networking environment, the computer 1010 is connected to the LAN 1071 through a network interface or adapter 1-70. When used in a WAN networking environment, the computer 1010 typically includes a modem 1072 or other means for establishing communications over the WAN 1073, such as the Internet. The modem 1072, which may be internal or external, may be connected to the system bus 1021 via the input interface 1060, or other appropriate mechanism. In a networked environment, program modules depicted relative to the computer 1010, or portions thereof, may be stored in the remote memory storage device 1081. By way of example, and not limitation, FIG. 24 illustrates remote application programs 1085 as residing on memory device 1081. The communications connections 1070, 1072 allow the device to communicate with other devices. The communications connections 1070, 1072 are an example of communication media.

The methods for analyzing a sample region of a body to determine the state of the tissue (which may include analyzing tissue for the purpose of diagnosis, assessing pathology, assessing response to treatment, etc.) described above may be implemented in part or in their entirety using one or more computer systems such as the computer system 1000 illustrated in FIG. 24.

Some or all calculations performed in the tissue characterization determination may be performed by a computer such as the computer 1010, and more specifically may be performed by a processor such as the processing unit 1020, for example. In some embodiments, some calculations may be performed by a first computer such as the computer 1010 while other calculations may be performed by one or more other computers such as the remote computer 1080, as noted above. The calculations may be performed according to instructions that are part of a program such as the application programs 1035, the application programs 1045 and/or the remote application programs 1085, for example. Such functions including, (i) collecting image data from a medical imaging device, either connected remotely to the device or formed as part of the computer system 100; (ii) rigid-body and/or deformably registering, in an image processing module, such collected image data to produce a co-registered image data comprising a plurality of voxels; (iii) determining, in the image processing module, changes in signal values for each of the plurality of voxels for the co-registered image data between a first phase state and the second phase state; (iv) forming, in a tissue state diagnostic module, a tissue classification mapping data of the changes in signal values from the co-registered image data, wherein the mapping data includes the changes in signal values segmented by the first phase state and the second phase state; (v) performing, in the tissue state diagnostic module, a threshold analysis of the mapping data to segment the mapping data into at least one region indicating the presence of the tissue state condition and at least one region indicating the non-presence of the tissue state condition; and (vi) analyzing the threshold analysis of the mapping data to determine the presence of the tissue state condition in the sample region.

Relevant data may be stored in the ROM memory 1031 and/or the RAM memory 1032, for example. In some embodiments, such data is sent over a network such as the local area network 1071 or the wide area network 1073 to another computer, such as the remote computer 1081. In some embodiments, the data is sent over a video interface such as the video interface 1090 to display information relating to the tissue state condition to an output device such as, the monitor 1091 or the printer 1096, for example. In other examples, the data is stored on a disc or disk drive, such as 856 or 852, respectively.

Extension of PCM Methods to Additional Imaging Applications

This voxel-by-voxel image analysis technique can be applied to quantify spatially resolved functional changes captured in medical images of organs or tissue that undergo movement. Examples of tissue or organs of the human body that undergo motion, which may include cyclic motion, flexing or bending, include muscle, lung, heart, neck, spine, joints, pelvic floor and TMJ (referred to as "tissue" in the present disclosure). Applications of this invention include quantitative data acquired from multi-modal image formats such as CT, MRI, Ultrasound, PET, SPECT and optical (generally referred to as "images," "image data," and "medical image data" in the present disclosure). In the present techniques, functional changes in moving or flexing tissue regions during different phases or ranges of movement are quantified from spatially aligned serial image data. Spatial alignment is performed by registration of interval images, with one image considered baseline, obtained at different phases or ranges of motion. Once registered, changes in image values on a voxel-by-voxel scale can be quantified by a predetermined threshold into categories such as for example, those voxels that have undergone a significant increase, decrease or were unchanged from baseline. These categories are segmented from the rest of the tissue to calculate volume fractions which are displayed to provide for regional assessment of disease status or overall tissue health. Other classification categories can be used to further characterize the tissue image data under interrogation.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments for purposes of illustration only. One skilled in the art will readily recognize from the discussion herein that alternative embodiments of the structures and methods illustrated herein may be employed without departing from the principles described herein.

Upon reading this disclosure, those skilled in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of assessing lung function using a first image data set obtained at lung inspiration and a second image data set obtained at lung expiration, each image data set comprising a plurality of voxels each characterized by a CT image pixel signal value, the method comprising:
co-registering the first and second image data sets to produce a co-registered image data set that comprises a plurality of co-registered voxels, wherein each of the co-registered voxels includes a CT image pixel signal value of the co-registered voxels of the first image data set and a CT image pixel signal value the second image data set, each co-registered voxel corresponding to a location;
analyzing the co-registered image data set to assess lung function by:
for each location, for each of the co-registered voxels, analyzing the CT image pixel signal value of the first image data set against a first threshold for the first image data set and the CT image pixel signal value of the second image data set against a second threshold for the second image data set;
based on the comparisons to the first threshold and to the second threshold, assessing a tissue state for each location, such that the tissue state for each location depends on comparisons to both the first threshold and the second threshold for each co-registered voxel, wherein assessing applies a different one or more of the first threshold and the second threshold depending on the tissue state and depending on the location of the co-registered voxels of the first image data set and the second image data set; and
displaying a result of the analysis, the result comprising the tissue state for each location.

2. The method of claim 1, wherein assessing a tissue state for each location comprises comparing information obtained from the first image data set to information obtained from the second image data set.

3. The method of claim 1, wherein assessing a tissue state comprises, for each location, identifying a probable disease state.

4. The method of claim 3, wherein the probable disease state for each location is one of normal tissue, emphysematous tissue, and non-emphysematous tissue with air trappings.

5. The method of claim 3, wherein the probable disease state for each location is a COPD phenotype.

6. The method of claim 1, wherein co-registering the first and second image data sets comprises applying an image segmentation, or cropping, rotation, translation and warping registration of the first image and the second image.

7. The method of claim 1, wherein displaying a result comprises forming a classification map of the lung mapping the tissue state for each location.

8. The method of claim 7, wherein the classification map is color-coded.

9. The method of claim 1, wherein the first image data set is obtained at approximately full lung inspiration and the second image data set is obtained at end lung expiration.

10. The method of claim 1, wherein displaying the result of the analysis, comprises displaying the result showing the tissue state for each location relative to the first threshold and the second threshold.

11. A system for assessing and displaying lung function using a first image data set obtained at lung inspiration and a second image data set obtained at lung expiration, the system comprising:
a display;
a processor;
instructions stored as non-transitory computer readable media, the instructions instructing the processor to:
co-register the first and second image data sets to produce a co-registered image data set that comprises a plurality of co-registered voxels, wherein each of the co-registered voxels includes a CT image pixel signal value of the co-registered voxels of the first image data set and the second image data set, each co-registered voxel corresponding to a location;
analyze the co-registered image data set to assess lung function by:
for each location, for each of the co-registered voxels, analyzing the CT image pixel signal value of the first image data set against a first threshold for the first image data set and the CT image pixel signal value of the second image data set against a second threshold for the second image data set;
based on the comparisons to the first threshold and to the second threshold, assessing a tissue state for each location, such that the tissue state for each location depends on comparisons to both the first threshold and the second threshold for each co-registered voxel, wherein assessing applies a different one or more of the first threshold and the second threshold depending on the tissue state and depending on the location of the co-registered voxels of the first image data set and the second image data set; and
display a result of the assessment, the result comprising the tissue state for each location.

12. The system of claim 11, wherein assessing a tissue state for each location comprises comparing information obtained from the first image data set to information obtained from the second image data set.

13. The system of claim 11, wherein assessing a tissue state comprises, for each location, identifying a probable disease state.

14. The system of claim 13, wherein the probable disease state for each location is one of normal tissue, emphysematous tissue, and non-emphysematous tissue with air trappings.

15. The system of claim 13, wherein the probable disease state for each location is a COPD phenotype.

16. The system of claim 11, wherein co-registering the first and second image data sets comprises applying an image segmentation, or cropping, rotation, translation and warping registration of the first image and the second image.

17. The system of claim 11 wherein displaying a result comprises forming a classification map of the lung mapping the tissue state for each location.

18. The system of claim 16, wherein the classification map is color-coded.

19. A method of analyzing a sample region of a lung to determine the condition of the sample region, the method comprising:
  receiving a first image data set of the sample region of the lung during inspiration, the first image data comprising a plurality of voxels each characterized by a CT image pixel signal value in the first image data set;
  receiving a second image data set of the sample region of the lung during expiration, the second image data comprising a second plurality of voxels each characterized by a CT image pixel signal value in the second image data set;
  co-registering the first image data set and the second image data set to produce a co-registered image data set that comprises a plurality of co-registered voxels, wherein each of the co-registered voxels includes the CT image pixel value of the voxel associated with the first image data set, and the CT image pixel value of the voxel from the second image data set;
  determining the CT image pixel values for each of the plurality of co-registered voxels comprises determining density values for each of the plurality of co-registered voxels, and analyzing the CT image pixel value of the first image data set by comparing the CT image pixel values to a first threshold for the first image data set and wherein analyzing the CT image pixel value of the second image data set comprises comparing the CT image pixel values to a second threshold for the second image data set, such that a tissue classification for each co-registered voxel depends on comparisons to both the first threshold and the second threshold for each co-registered voxel, and such that one or more of the first threshold and the second threshold vary with tissue classification and vary with location of the co-registered voxels of the first image data set and the second image data set; and
  identifying co-registered voxels indicating locations having air-trapping, non-emphysematous tissue;
  identifying co-registered voxels indicating locations having emphysematous tissue;
  identifying co-registered voxels indicating locations having normal tissue; and
  displaying, as a classification map, regions of the lung having air-trapping, non-emphysematous tissue, emphysematous tissue, and normal tissue.

* * * * *

UNITED STATES PATENT AND TRADEMARK OFFICE
CERTIFICATE OF CORRECTION

PATENT NO. : 12,020,432 B2
APPLICATION NO. : 15/698376
DATED : June 25, 2024
INVENTOR(S) : Brian D. Ross et al.

It is certified that error appears in the above-identified patent and that said Letters Patent is hereby corrected as shown below:

In the Claims

Column 35, Line 34, Claim 1 "value the" should be -- value of the --.

Column 37, Line 14, Claim 19 "data" should be -- data set --.

Column 37, Line 18, Claim 19 "data" should be -- data set --.

Signed and Sealed this
Third Day of December, 2024

Katherine Kelly Vidal
*Director of the United States Patent and Trademark Office*